US005747177A

United States Patent [19]

Torimoto et al.

[11] Patent Number: 5,747,177

[45] Date of Patent: May 5, 1998

[54] COLLECTED LUMBER, PROCESS FOR PRODUCING COLLECTED LUMBER AND COLLECTED LUMBER PRODUCING DEVICE

[75] Inventors: Tadashi Torimoto; Yasuhiro Asano; Tsunehiro Kohara; Tetsuya Nishimura, all of Ogaki, Japan

[73] Assignee: Ibiden Co., Ltd., Japan

[21] Appl. No.: 397,212

[22] PCT Filed: Apr. 21, 1994

[86] PCT No.: PCT/JP94/00669

§ 371 Date: Jun. 1, 1995

§ 102(e) Date: Jun. 1, 1995

[87] PCT Pub. No.: WO95/02492

PCT Pub. Date: Jan. 26, 1995

[30] Foreign Application Priority Data

Jul. 12, 1993 [JP] Japan .................................... 5-195548

[51] Int. Cl.$^6$ ........................................ B32B 9/00

[52] U.S. Cl. ........................ 428/537.1; 428/57; 428/105; 428/106; 428/192; 428/245; 428/246; 428/248; 428/249; 428/326; 428/332; 428/342; 428/528; 428/535; 264/304.5; 264/304.6; 264/109; 264/122; 264/131

[58] Field of Search .................................... 428/245, 249, 428/246, 248, 332, 535, 326, 342, 537.1, 192, 57, 105, 528, 106; 156/304.5, 304.6; 264/109, 122, 131, 297.4

[56] References Cited

U.S. PATENT DOCUMENTS

| | | | |
|---|---|---|---|
| 3,107,708 | 10/1963 | Savage . | |
| 3,493,021 | 2/1970 | Champigny | 144/317 |
| 4,351,680 | 9/1982 | Kohn | 156/79 |
| 4,963,398 | 10/1990 | Deno | 427/366 |
| 4,994,138 | 2/1991 | Prihoda | 156/580 |
| 5,343,913 | 9/1994 | Tanahashi et al. | 144/380 |

FOREIGN PATENT DOCUMENTS

| | | |
|---|---|---|
| 48-26904 | 4/1973 | Japan . |
| 50-31008 | 3/1975 | Japan . |
| 57-23130 | 5/1982 | Japan . |
| 55-44683 | 11/1982 | Japan . |
| 50-89508 | 3/1983 | Japan . |
| 2-151402 | 6/1990 | Japan . |
| 3-97503 | 4/1991 | Japan . |
| 3-231802 | 10/1991 | Japan . |
| 4-286601 | 10/1992 | Japan . |
| 5-9122 | 3/1993 | Japan . |

*Primary Examiner*—Patrick Ryan
*Assistant Examiner*—Abraham Bahta
*Attorney, Agent, or Firm*—Rossi & Associates

[57] ABSTRACT

The collected lumber of the present invention is formed by heating and softening a plurality of woods, applying adhesive on the woods, pressing and compressing the wood with adhesive thereon to mold the integral body in a prescribed shape, and by fixation treating the integral body using a heating device. The method for manufacturing collected lumber of this invention comprises the first process for softening woods by heat treating a plurality of woods, the second process for applying adhesive on the softened woods, the third process for forming integral body by pressing and compressing the woods applied with the adhesive to mold in a prescribed shape, and the fourth process for fixation treating the integral body using a heating device.

By collecting and fixing a plurality of woods comprising thinned-out woods which is not worth using, the wood products which exhibits various excellent grain pattern and is used for wide range of building materials are manufactured, and the enhanced productivity is attained by shortening of curing time of collected wood to realize low cost collected lumber and process for manufacturing the collected lumber.

37 Claims, 31 Drawing Sheets

COLLECTED LUMBER, PROCESS FOR PRODUCING COLLECTED LUMBER AND COLLECTED LUMBER PRODUCING DEVICE

FIELD OF THE INVENTION

This invention relates to a collected lumber capable of performing an effective utilization of thinned-out woods with a small diameter or a short length and scrap material cut and removed during a growing stage of Sugi (Cryptmeria japonica D. Don), Japanese cypress and the like, a process for producing the collected lumber and, more particularly, to a collected lumber and a process for producing the collected lumber of inexpensive cost which can be used in a wide range of building materials, can shorten an aging period of the collected lumber after the woods are collected, and further improve its productivity.

In addition, the present invention relates to a process for producing collected lumbers or the like having various shapes such as a curved shape, a linear shape and the like in which they can be collected from each other into a predetermined shape without being influenced by each of the shapes and without producing any gaps between each of the thinned-out woods.

In addition, the present invention relates to a collected lumber having a high strength which can be used in a wide range of building materials and has a low cost, and to a process for producing the collected lumber.

Further, the present invention relates to wood building materials with fine straight grain and of low cost which can be highly valued as floor material, wall material or the like, and to a process for producing the wood building materials.

Still further, the present invention relates to a collected lumber of low cost, capable of maintaining the annual rings stored in each of the thinned-out woods at an end surface of the collected lumber while being molded into various shapes, realizing a specific effect in design, being used in various wide ranges of applications and concurrently applying various superior characteristics of the collected lumber after collecting the woods to each of the applications and thus improving its productivity by shortening the aging period.

In addition, the present invention relates to woods, bamboos and their collected lumbers in which the annual rings in each of the thinned-out woods can be left at the end of the collected lumbers while being molded, whereby a specific design effect can be realized, a surface with high hardness and high abrasion resistance can be attained and they can be applied over various wide ranges.

Additionally, the present invention relates to a device for producing a collected lumber capable of performing an effective utilization of thinned-out wood of small diameter or short length material and scrap material removed during a growing step of Sugi (Cryptmeria japonica D.Don) or Japanese cypress or the like and, more particularly, to a vehicle-carried type apparatus for manufacturing a collected lumber which can move up to a producing center of wood at a destination of carrying out of the thinned-out wood, produce the collected lumber from the thinned-out woods at the destination of carrying out so as to ship the collected lumber.

DESCRIPTION OF THE PRIOR ART (1) In general, although Sugi (Cryptmeria japonica D. Don) or Japanese cypress or the like are frequently utilized as building materials, they are inherently soft materials to show a low rigidity, whereby their applicable range has been limited by themselves. In particular, thinned-out woods removed during a growing step of Sugi (Cryptmeria japonica D. Don) or Japanese cypress or the like were of small diameter, and additionally, they were frequently soft and curved, so that such thinned-out woods could hardly be used as building materials, for example, pillars or the like.

In order to perform the effective utilization of such thinned-out woods, various processes have been proposed in the prior art. For example, in Japanese Patent Laid-Open No. Hei 3-231802 is disclosed a process for improving a quality of wood by a process wherein the woods are spread within water vapor and softened, thereafter they are compressively molded under a condition of high pressure and the molding of the woods is fixed. In addition, Japanese Patent Laid-Open No. Hei 3-97503 provides a description of a process for processing the woods in which when the woods are softened, they are softened under a high-frequency heating, thereafter the woods are applied with pressure. In addition, Japanese Patent Laid-Open No. Hei 5-116112 provides a description of a compound wood pillar material in which a plurality of thinned-out woods are chamfered in advance to make wedge-shaped square wood pillar materials and each of the square wood pillar materials is assembled while being bonded through an adhesive.

However, the process for processing woods described in each of Japanese Patent Laid-Open Nos. Hei 3-231802 and Hei 3-97503 is carried out in such a manner that the thinned-out woods are softened, thereafter they are compressed to improve their quality, although this processing process is merely applied for processing every thinned-out wood. Accordingly, these prior arts can improve the quality of thinned-out woods having a low value of use and perform an effective utilization of building materials, although a scope of utilization as thinned-out woods, quality of which is improved cannot be applied to a wide range of building materials in view of the fact that the thinned-out woods are short diameter logs. In addition, a plurality of thinned-out woods cannot be processed concurrently in their quality improvement (so-called batch treatment).

In addition, although the compound wood pillar material described in the aforesaid Japanese Patent Laid-Open No. Hei 5-116112 is constructed such that a plurality of thinned-out woods are assembled while adhering to each other through an adhesive, it is necessary to chamfer each of the thinned-out woods in advance to make them as wedge-shaped square wood pillar material so as to form a shape of the compound wood pillar material into a predetermined shape (for example, a square shape). As described above, it was a quite troublesome operation to perform a chamfering in advance for each of the thinned-out woods and there was a problem that its cost was high as this work was performed.

(2) In addition, in the prior art, there were present various kinds of laminated lumbers, and for example, the laminated lumber for non-structural members, the glued laminated lumber for structural members or the like are widely utilized as materials for wood architecture such as residential building and the like. This type of laminated lumber is produced by piling up the lamina or piling up the abutted members through various vertical joint processes (for example, there are vertical joint processes such as scarf joint and a finger joint). In addition, after a plurality of veneers are formed from a relative large log, the laminated lumber which can be obtained by piling up each of the veneers through a hot press or the like is also widely utilized in various applications.

The aforesaid laminated lumber requires as its raw material a relative large log, and it is necessary to produce the laminated lumber through a series of steps such as a step for forming a plurality of laminas or veneers from such woods as above, a vertical relative joint step for each of the laminas and a piling-up step for piling up each of laminas or veneers. In this case, it is frequently found that the large log can be utilized in other applications and the aforesaid plurality of steps are required, so that productivity for the laminated lumber is low, resulting in that this lumber causes a high manufacturing cost. Under such a condition as above, it is desired to utilize the short diameter log such as thinned-out woods removed during growing step, e.g., Sugi (Cryptmeria japonica D. Don) and Japanese cypress or the like having less value in utilization.

In view of this fact, although various kinds of processes are proposed as described above in order to perform an effective utilization of the thinned-out woods as building materials which are quite soft and frequently curved, the thinned-out woods, quality of which is improved through the processing methods described in the aforesaid Japanese Patent Laid-Open Nos. Hei 3-231802 and 3-97503 cannot be utilized over a wide range as the building materials such as laminated lumbers. In addition, as described above, the compound wood pillar material described in the aforesaid Japanese Patent Laid-Open No. Hei 5-116112 needed a complex troublesome work in which each of the thinned-out woods is chamfered in advance, so that there remained a problem that its cost becomes high.

In addition, it was difficult to make a mutually vertical joint between the thinned-out woods (to abut the thinned-out woods in their longitudinal direction) and so there was a problem that the laminated lumber more than a length of the thinned-out wood cannot be obtained.

(3) In addition, in general, the plate material having a fine straight grain is used as a high class interior finishing material such as floor and wall materials. The straight grain in such a plate material as above appears due to the annual rings stored in the wood, the cut wood is further cut along its longitudinal direction and can be attained on the surface of the plate material. In order to get the plate material having such a straight grain as above, it is generally necessary to use the wood having a relatively large diameter.

In such a case as above, the wood having a large diameter is quite expensive and accordingly the plate material having a straight grain is necessarily expensive to cause a high cost. Since the plate material having a straight grain is utilized by cutting the most suitable portion in the large diameter log, resulting in that there occurs a problem in getting an effective utilization of the log and so this state is opposite to the trend of saving natural resources in recent years.

In addition, in general, although conifer such as Sugi (Cryptimeria japonica D. Don) or Japanese cypress or the like is frequently utilized as building material, they are naturally soft woods and have low rigidity, they are not sufficiently hard as flooring material on which a person walks on bare foot, for example, and so a certain limitation has been applied by themselves to their applicable scope in use. In particular, the thinned-out woods removed during the process of growing of Sugi (Cryptmeria japonica D. Don), Japanese cypress and the like are short diameter woods, a depth of abrasion in an abrasion A test with the flooring defined by JAS (Japanese Agricultural and Forestry Standards) is 220 μm or more, they are frequently quite soft and curved, resulting in that such thinned-out woods as above could not almost be utilized as building materials.

In addition, bamboo shows a faster growing rate as compared with that of woods and irrespective of the fact that the bamboo is full in its volume as latent natural resources, there still remain some problems in its strength, machining characteristics and design and so it was difficult to apply it as building material.

Under such a situation as above, it is desired to utilize the short diameter woods removed during the process of growing of Sugi (Cryptmeria japonica D. Don), Japanese cypress and the like and various processes have been proposed as described above in order to perform effective utilization of the thinned-out woods in the prior art. However, the process for processing log described in each of the aforesaid Japanese Patent Laid-Open Nos. Hei 3-231802 and 3-97503 is carried out such that the thinned-out woods are softened, thereafter pressed and its quality improving processing is carried out for every thinned-out wood, and in particular, these prior-art processes do not intend to produce a plate material having a straight grain and the process for performing this operation is not suggested or disclosed.

Also in the case of the compound wood pillar material described in the aforesaid Japanese Patent Laid-Open No. Hei 5-116112, it does not aim at getting the plate material having a straight grain in the same manner as the processing process described in each of the aforesaid gazettes, and the process for getting such a plate material is not suggested or disclosed at all. In addition, the compound wood pillar material as described above is constructed such that a plurality of thinned-out woods are assembled to each other through the adhesive, although each of the thinned-out woods is not pressed or compressed into its predetermined shape during assembling operation, resulting in that the annual rings of each of the thinned-out woods are merely left in the state of concentric circles at the end surface (end of lumber) of the assembled compound wood pillar material. In view of the fact above, this kind of compound wood pillar material does not realize a specific design effect in particular, also still remains as a soft material, merely has a low hardness only and there is no change at all in its characteristic. As a result, such a wood pillar material as above except the building material such as pillar material cannot be utilized in a wide scope of application.

(4) In addition, in general, the thinned-out short diameter woods removed during a process of growing of Sugi (Cryptmeria japonica D. Don) or Japanese cypress have a low value in their application and are low value-added products, so that an economic value corresponding to their transportation and shipping costs cannot be attained and they are left at present in mountains or forests while not being utilized.

Accordingly, if various kinds of products such as collected woods are produced or provided by utilizing these short diameter thinned-out woods under the application of the aforesaid prior art, it would be necessary to construct a producing factory for the collected lumber at a producing center of wood where short diameter thinned-out woods are left, to make them into a product and then to ship it or it would be necessary to transport the thinned-out woods from the producing center of wood to a producing factory having a producing facility installed, to make it into a product at the producing factory and to ship it.

In view of the fact above, if the producing factory for the collected lumbers utilizing the thinned-out woods is constructed near a destination site, unrecovered transportation cost produced by transporting the thinned-out woods of low added value can be substantially reduced and concurrently the collected lumber of high added value can be directly shipped from the destination site in place of the thinned-out woods of low value-added product. In turn, there remain problems that it is actually and technically hard to construct the producing factory near the destination site where the woods are cut, it takes a high construction cost and the existing producing factory cannot be used for this operation.

In turn, if after the thinned-out woods are transported from the destination site to a far distance producing factory completely installed with a producing facility, the collected lumbers or the like are produced at the producing factory and shipped from it, although the existing producing factory can be used for the operation, the thinned-out woods left in the mountain or forest due to their low value-added material must be transported, resulting in that a surplus transportation cost caused by transporting the thinned-out woods to the producing factory and so it cannot be avoided to replace the transportation cost with the product cost and recover it. Accordingly, there remains a problem that an inexpensive collected lumber cannot be provided even if low cost thinned-out woods are utilized as raw materials.

Further, the prior art looking at only the fact of inexpensive thinned-out woods applied as raw material and trying to produce a high value-added product with the thinned-out woods still had a problem that a matter of transportation cost generated when the thinned-out woods are actually used as raw material is not yet solved.

(5) This invention has been completed in order to solve each of the problems found in the prior art and it is a first object of the present invention to provide a low cost collected lumber and a process for producing the collected lumber in which a plurality of woods composed of thinned-out woods or the like are collected and fixed to each other as required, whereby they can be used over a wide scope of building materials, an aging of the collected lumber can be shortened and then their productivity can be improved.

It is a second object of the present invention to provide a process for producing a collected lumber, capable of producing a low cost collected lumber in which some thinned-out woods having various shapes such as curved shape and straight shape can be collected together in a predetermined shape without being influenced by each of the shapes and without producing any clearance between each of the thinned-out woods, they can be used over a wide range of building materials and concurrently an aging of the collected lumber after the woods are collected is shortened to improve productivity.

It is a third object of the present invention to provide a collected lumber and a process for producing the collected lumber having a high strength and stability in size and capable of being used over a wide range of building materials by a process wherein a plurality of logs composed of thinned-out woods or the like are collected and each of the logs is rigidly fixed in any of a diametrical direction and a longitudinal direction of the thinned-out woods.

In addition, it is a fourth object of the present invention to provide a wood building material having a straight grain of low cost and capable of being used as various high-class building materials and a process for producing the wood building material while precious resources are being effectively utilized by using the thinned-out woods having low utilization value.

In addition, it is a fifth object of the present invention to provide a collected lumber of low cost in which annual rings found in each of the thinned-out woods are left at the end surface of the collected lumber while being molded into various shapes, whereby a specific design effect can be realized, it can be used over various wide ranges of applications, and the logs having a low utilization value by themselves are collected to improve various characteristics tremendously and concurrently an aging of the collected lumber is shortened so as to improve its productivity.

It is a sixth object of the present invention to provide a low cost collected lumber in which annual rings found in each of the thinned-out woods are left at the end of the collected lumber while being molded into various shapes, whereby a specific design effect can be realized, it can be used over various wide ranges of applications, conifer logs of low utilization value by themselves are collected to cause the surface characteristic to be remarkably improved to have a high hardness and concurrently an aging of the collected lumber can be shortened to improve its productivity.

It is a seventh object of the present invention to provide a low cost collected lumber in which annual rings found in each of the thinned-out woods are left at the end of the collected lumber while being molded into various shapes, thereby a specific design effect can be realized, it can be used over various wide ranges of applications, conifer logs of low utilization value by themselves are collected to cause the surface characteristic to be remarkably improved to have high abrasion resistance and concurrently an aging of the collected lumber can be shortened to improve its productivity.

In addition, it is an eighth object of the present invention to provide an apparatus for manufacturing a collected lumber, which can manufacture a collected lumber without transporting the thinned-out woods, eliminate installation cost and can be moved, and to provide a low cost collected lumber in which the thinned-out woods of low added value can be directly shipped as collected lumber of high value-added product and utilization of the thinned-out woods is promoted.

DISCLOSURE OF THE INVENTION (1) A collected lumber of the present invention for accomplishing the the aforesaid first object comprises a plurality of plasticized woods which has been compressively molded in a predetermined shape with an adhesive layer on surfaces of the woods. A process for producing a collected lumber, comprises: a first step of treating a plurality of woods with water vapor under high-temperature and high-pressure conditions to soften the woods; a second step of spreading an adhesive on surfaces of the softened woods; and a third step of compressing the adhesive-spread woods to form the woods into a predetermined shape. Otherwise, a process for producing a collected lumber, comprises: a first step of treating a plurality of woods with water vapor under high-temperature and high-pressure conditions to soften the woods, the woods having preliminarily been spread with an adhesive; and a second step of compressing the adhesive-spread woods to form the woods into a predetermined shape.

The collected lumber of the present invention having the aforesaid configuration is softened with water vapor under high-temperature and high-pressure and thus can be easily plasticized and molded under a specified pressure. Accordingly, it is possible to increase a contact surface between the short diameter logs during the compressing step and to form an integrated collected lumber. This collected lumber has a feature that a residual stress generated during the compressing step is scarcely left in the collected lumber by rearranging cellulose molecules or the adhesive in atmosphere of water vapor.

In the former producing process, a plurality of woods are treated with water vapor under high-temperature and high-pressure during the first step. Each of the woods is softened with water vapor processing. After this operation, adhesive is sprayed onto the surface of each of the woods softened at the second step. In this case, the adhesive is used for connecting the woods to each other. In addition, after completion of the second step, each of the woods sprayed with the adhesive in the third step is compressed into a predetermined shape. With such an arrangement as above, the collected lumber is produced.

In addition, in the case of latter producing method, the plurality of woods spread with the adhesive in advance in the first step are processed with water vapor under high-temperature and high-pressure so as to soften each of the woods. In the subsequent second step, each of the woods spread with the aforesaid adhesive is compressed to form into a predetermined shape. In this way, the adhesive is spread to the woods before plasticization with water vapor processing, resulting in that an amount of the adhesive to be spread can be easily monitored.

In case of the collected lumber produced as described above, the plurality of woods adhere to each other through the adhesive, the number of woods to be used is properly selected to enable the collected lumber which can be produced over a wide range of building materials to be produced. In addition, since the woods are connected with the adhesive, the adhesive is dried and after this drying state, the woods can be used as the building materials at an early time, thereby a residual stress in the collected lumber can be taken, and an aging of the collected lumber can be shortened to improve its productivity. In addition, each of the woods to be used in the collected lumber does not need any pretreatment such as chamfering in particular, so that it becomes possible to restrict the collected lumber and its producing cost.

A collected lumber of the present invention fork accomplishing the first object in the same manner as that above is produced by heating a plurality of woods to soften the woods, compressing the softened woods in the presence of an adhesive on surfaces of the woods to form a collected body having a predetermined shape, and subjecting the collected body to a fixation treatment using a heating device.

A process for producing a collected lumber, comprises: a first step of treating a plurality of woods with water vapor under high-temperature and high-pressure conditions to soften the woods; a second step of spreading an adhesive on surfaces of the softened woods; and a third step of compressing the adhesive-spread woods to form the woods into a predetermined shape. A process for producing a collected lumber, comprises: a first step of treating a plurality of woods with water vapor under high-temperature and high-pressure conditions to soften the woods, the woods having preliminarily been spread with an adhesive; and a second step of compressing the adhesive-spread woods to form the woods into a predetermined shape. A process for producing a collected lumber, comprises: a first step of heating a plurality of woods to soften the woods; a second step of spreading an adhesive on surfaces of the softened woods; a third step of compressing the adhesive-spread woods to form a collected body having a predetermined shape; and a fourth step of subjecting the collected body to a fixation treatment using a heating device. At this time, the heating treatment for softening each of the woods is carried out with water vapor heating, heating water or high-frequency heating. In addition, the fixation treatment by the heating device is carried out such that the collected lumber is heated by heating water vapor or a heater.

The collected lumber of the present invention having the aforesaid configuration is treated with a fixation treatment through the heating device to the collected body in which each of the plurality of woods softened with a heating treatment is compressed into a predetermined shape while an adhesive being spread to the surfaces of each of the woods, so that a contact area between the woods is increased during the compressing step while the woods are easily plasticized when softened so as to obtain the integral collected body. Since the collected lumber described above is constructed such that the plurality of woods are fixed to each other through the adhesive and fixed and then it becomes possible to use them over a wide range of building materials. In addition, since the collected lumber is further treated with a fixation treatment under high-temperature for the collected body formed into a predetermined shape through compressing, stability in size can be improved, and concurrently an aging of the collected lumber can be shortened, its productivity is also improved and then the collected lumber of inexpensive cost can be obtained.

In addition, in the process for producing the collected lumber of the present invention, the plurality of woods are heat-treated at the first step. Each of the woods is softened through this heating treatment and then the wood becomes easily plasticized and molded. At this time, as a process for heating each of the woods, various kinds of processes can be applied, wherein a heat treatment with the water vapor heating, a heating treatment in heating water and also a heating treatment with high-frequency heating can be applied. According to each of these heating processes, a relative large amount of woods can be heat-treated at a time.

After the first step, the adhesive is spread on the surface of each of the softened woods at the second step. In this case, the adhesive is used for fixing the woods to each other. In addition, after completion of the second step, each of the woods spread with the adhesive as described above is compressed into a predetermined shape at the third step so as to form a collected body having a plurality of woods integrally assembled. In addition, at the fourth step, the collected body formed in this way is fixed at a temperature higher than that at the first step through the heating device for use in heating the collected body with heating water vapor or a heater,whereby the collected lumber is produced.

The collected lumber produced as above is constructed such that the plurality of woods are fixed to each other through the adhesive, so that a proper selection of the number of woods to be used enables the collected lumber applicable to a wide range of building materials to be produced. Additionally, each of the woods is fixed through the adhesive, thereafter the fixation treatment is applied through the heating device, so that the collected lumber can become a state in which the lumber can be used at an early stage as a building material excellent in stability in size, whereby the residual stress in the collected lumber can be eliminated, its aging can be shortened and its productivity can be improved. In addition, each of the woods used in the collected lumber is sufficiently adapted by a log by itself, and in particular, a machining operation of chamfering or the like is not required, so that it becomes possible to restrict the cost of the collected lumber and its producing cost to a quite low value, respectively.

Accordingly, in accordance with the present invention, the plurality of woods comprised of thinned-out woods or the like are collected and fixed while their barks being left on the woods or being barked, whereby a free design showing a variation in the grain can be realized, the woods can be used in a wide range of building materials, and concurrently an aging of the collected lumber can be shortened to improve its productivity, resulting in that the collected lumber and the process for producing the collected lumber can be provided.

(2) In addition, a process for producing a collected lumber according to the present invention for accomplishing the aforesaid second object, comprises: a first step of softening a plurality of woods one by one or more than one wood at a time and compressing the softened woods to form the woods into a predetermined shape; a second step of spreading an adhesive on surfaces of the woods; and a third step of laminating the adhesive-spread woods and subjecting the resulting laminate to a fixation treatment using a heating device. In addition, a process for producing a collected lumber according to the present invention, comprises: a first step of softening a plurality of woods one by one or more than one wood at a time and compressing the softened woods to form the woods into a predetermined shape; a second step of subjecting the woods to a fixation treatment using a heating device; a third step of spreading an adhesive on surfaces of the woods; and a fourth step of laminating the adhesive-spread woods and forming the resulting laminate while curing the adhesive.

According to the former producing process of the present invention having the aforesaid configuration, the woods are softened one by one or more than one wood, thereafter pressed, and each of the woods is formed into a predetermined shape. At this time, as the process for softening the woods, various processes can be applied, wherein the heating treatment with water vapor heating, the heating treatment in the heating water and the heating treatment with high-frequency heating can be applied. According to each of these softening treatment processes, a relative large amount of woods can be softened at a time. Each of the woods is softened through such a softening process as above into easily plasticizable and deformable state, each of the woods is compressed into a predetermined shape. As described above, each of the woods is formed into a predetermined shape and the plurality of woods can be collected together into a predetermined shape without being influenced by the shape of each of the woods before its compressing and without producing any gap between the woods.

After the first step, and at the second step, the adhesive is spread on the surface of each of the softened woods. In this case, the adhesive is used for connecting the logs to each other.

In addition, after completion of the second step and at the third step, each of the woods spread with the adhesive is laminated on each other and the fixation treatment is carried out at a temperature higher than that of the first step through the heating device for performing the heating treatment by heating water vapor or a heater. With such a process as above, the collected lumber is produced.

According to the producing process of the aforesaid latter invention, the woods are softened one by one or more than one woods in the first step, then they are compressed and each of the woods is formed into a predetermined shape. At this time, as a process for softening treatment, the heating treatment with heating water vapor, heating treatment in heated water and heating treatment with high frequency can be applied in the same manner as that of the aforesaid former invention, and so, a relative large amount of woods can be softened at a time. Each of the woods is softened through such a softening treatment, it can easily become a plasticizable and deformable state, each of the woods is compressed into a predetermined shape. At this time, when each of the woods is collected into a predetermined shape, it is not influenced by the shape of each of the woods before its compressing treatment in the same manner as that of the aforesaid former invention and no clearance is generated between each of the woods.

In the subsequent second step, each of the woods softened as described above is fixed at the temperature higher than that of the first step through heating water vapor, a high-frequency heating device, or a heater. In addition, at the third step, the adhesive is spread on the surface of each of the woods fixed. In this case, the adhesive is used for fixing each of the woods to each other. In addition, at the fourth step, each of the woods spread with the adhesive is laminated on each other and they are formed while the adhesive being cured. With such an arrangement as above, the collected lumber is produced.

As described above, the collected lumber produced by the aforesaid former invention is constructed such that each of the plurality of woods is fixed to each other through the adhesive, thereafter fixed, and in the case of the collected lumber produced by the latter invention, each of the plurality of woods is fixed and then connected to each other through the adhesive, so that a proper selection of the number of woods to be used enables the collected lumber to be used for a wide range of building materials of various sizes. In addition, since a fixation treatment is applied through the heating device in any one of the aforesaid producing processes, the collected lumber can be used at early stage as a building material having stability in size, whereby a residual stress in the collected lumber can be eliminated, an aging can be shortened and its productivity can be improved. In addition, each of the woods used in the collected lumber may well be adapted by log itself and it does not require any particular machining such as chamfering, so that it becomes possible to restrict the collected lumber and its production cost to a remarkable low value.

Accordingly, in accordance with the present invention, it is possible to provide a process for producing a collected lumber in which the thinned-out woods having various shapes such as a curved shape, a straight linear line or can be collected together into a predetermined shape under their specific condition without being influenced by the shapes and without producing any gap between the thinned-out woods, whereby they can be used over a wide range of building materials, an aging of the collected lumber after collecting the woods can be shortened to improve productivity so as to obtain a collected lumber at a low cost.

(3) Further, a collected lumber of the present invention for accomplishing the aforesaid third object is produced by heating a plurality of woods to soften the woods, compressing the softened woods in the presence therebetween of a reinforcing member for interconnection of the woods and an adhesive to thereby form the woods into a predetermined shape, and subjecting the formed wood body to a fixation treatment using a heating device. A process for producing a collected lumber according to the present invention, comprises: a first step of heating a plurality of woods to soften the woods; a second step of placing a reinforcing member for interconnection of the woods between the woods and spreading an adhesive on surfaces of the woods; a third step of compressing the adhesive-spread woods together with the reinforcing member for interconnection to form the woods into a predetermined shape; and a fourth step of subjecting the compressed woods to a fixation treatment using a heating device. In this case, the heating device for fixation treatment uses heating water vapor for heating the woods.

The collected lumber of the present invention having the aforesaid configuration is produced such that when the plurality of woods are compressed, the woods is compressed into a predetermined shape while the reinforcing members for reinforcing the woods and the adhesive are being spread between the woods softened through heating treatment. At this time, since the reinforcing members and the adhesive are spread between the woods, the woods themselves can be rigidly fixed not only in the radial direction but also in the longitudinal direction, respectively. Then, the fixation treatment is carried out using the heating device and the woods are permanently held at the predetermined shape.

In addition, the producing process of the collected lumber of the present invention is carried out such that each of the plurality of woods is heated and then softened. After this treatment, at the second step, the reinforcing members for reinforcing the woods are spread between the softened woods and further the adhesive is spread on the surface of the woods. Then, at the third step, each of the woods spread with the adhesive and having a plurality of reinforcing members therebetween is compressed into a predetermined shape, and in addition, at the fourth step, the fixation treatment is applied at a temperature higher than that of the first step to the woods after being compressed, using heating water vapor or a heating device for heating the woods through its heater.

In the case of the collected lumber obtained producing method as described above, the woods are rigidly fixed to each other in any of the radial direction and the longitudinal direction, whereby according to the present producing method, it is possible to obtain the collected lumber having a high strength and capable of being used over a wide range of building materials at a low cost.

Accordingly, in accordance with the present invention, it is possible to provide the collected lumber at a low cost, capable of realizing a free design showing variation in grain, having a high strength and being used over a wide range of building materials and to provide a process for producing the collected lumber by a process wherein the plurality of woods composed of thinned-out woods or the like are collected and the woods are rigidly fixed in any one of the radial direction and the longitudinal direction of the thinned-out woods.

(4) In addition, a wood building material of the present invention to accomplish the aforesaid fourth object is produced such that a straight grain in a compressively molded shape is exposed on at least one face of the piece of wood by a process where wood pieces cut at a plurality of positions of the wood in its longitudinal direction are softened through heating treatment, compressed into a predetermined shape, thereafter a fixation treatment is applied to cause them to be processed at high temperatures to fix their shapes and to prevent them from being recovered back to their original shapes. In addition, the plurality of wood pieces processed by the aforesaid fixation treatment may be laminated using the adhesive, and then, clamped to each other under pressing.

In addition, a process for producing a wood building material according to the present invention, comprises: a first step of cutting a wood longitudinally at a plurality of positions to obtain a piece of wood; a second step of heating the piece of wood to soften the piece of wood; a third step of compressively molding the softened piece of wood into a predetermined shape; and a fourth step of subjecting the compressively molded piece of wood to a fixation treatment, with a straight grain exposed on at least one face of the piece of wood. Furthermore, the process may comprise a step of laminating the plurality of pieces of wood after fixation treatment in the presence of an adhesive, and clamping the laminated pieces of wood under pressing.

At this time, the heating treatment for softening each of the woods is carried out with water vapor heating, heating water or high-frequency heating. In addition, the fixation treatment for permanently forming each of the woods is carried out by heating each of the formed woods by heating water vapor, high-frequency heating, or a heater.

The wood building materials of the present invention having the aforesaid configuration can be obtained by softening through the heat treatment of the wood pieces cut at the plurality of positions in the wood in the longitudinal direction of it, by compressing it into a predetermined shape and further by applying the fixation treatment to it. Such a wood as described above is constructed such that a straight grain is exposed at least at one face of the wood pieces, thereby it becomes possible to use the wood in various applications such as a flooring material, a wall material and a ceiling material.

In addition, the wood is constructed such that a plurality of wood pieces processed with the fixation treatment as described above are laminated on each other through the adhesive, clamped to each other under pressing, wherein a straight grain in each of the wood pieces is exposed. In this way, the plurality of wood pieces are collected to each other through the adhesive and fixed to each other, whereby the straight grain is entirely exposed there, resulting in that the collected lumber can be used as a high-class building material over a wide range of application. In addition, in accordance with a process for producing the wood building material of the present invention, the wood is cut at a plurality of positions thereof in a longitudinal direction at the first step so as to obtain the wood pieces. At the second step, the wood pieces are softened by performing a heating treatment for the wood pieces. Various processes can be applied for such a heating treatment as above, wherein some heating processes such as a heating treatment with water vapor heating, a heating treatment in heated water and high-frequency heating can be applied. The wood pieces are softened through heating treatment and the wood pieces may easily be plasticized and molded.

In addition, at the third step, the softened wood pieces are compressed into a predetermined shape. Subsequently to the third step, the fixation treatment is carried out at the fourth step with a straight grain being exposed at least at one end face of the compressed wood pieces through heating water vapor or a heater. With such an arrangement as above, the wood pieces can be held permanently with their fixed state.

In the process for producing the wood building materials of the present invention, the plurality of wood pieces processed with fixation treatment as described above are laminated on each other through the adhesive, to be clamped under pressing. With such an arrangement as above, the wood building materials having a plurality of wood pieces are produced while each of the straight grains in each of the wood pieces is being exposed.

Accordingly, in accordance with the present invention, it is possible to provide the wood building materials having a straight grain in which a low cost, mechanical characteristic, thermal characteristic, abrasion resistance, chemical resistance, corrosion resistance, a stability in size can be improved, and further short diameter logs can be used as various kinds of high-class building materials while the thinned-out woods having a low utilization value are being used to promote an effective utilization of precious resources of forest, and the process for producing the wood building materials.

(5) In addition, the collected lumber of the present invention for accomplishing the aforesaid fifth object discloses that a plurality of woods are compressed into a predetermined shape while the surface of each of the plurality of woods softened through a heating treatment as one means is being spread with an adhesive, wherein a collected body having a material formed into a predetermined shape being processed with fixation treatment is the most preferable one in particular, and the annual rings of each of the woods are being left at the end faces of these collected bodies in various molded states of shape.

The collected body of the present invention having the aforesaid configuration is constructed such that a plurality of woods are compressed into a predetermined shape while the adhesive being spread at the surfaces of the plurality of woods softened by a heating treatment, and more preferably a fixation treatment is applied to cause the shape of the woods to be fixed under high-temperature treatment and not to return back to their original shape, the annual rings of each of the woods are left at an end face of the collected body while being molded into various shapes. Accordingly, since the annual rings of each of the woods are left at the end face of the collected lumber while being molded into various shapes, a specific design effect can be realized by combining a diameter of the wood to be used with the kind of wood such as a broad-leafed tree or conifer or the like. With such an arrangement as above, such a collected lumber as described above can be utilized over various wide ranges under utilization of its design effect.

In addition, when each of the woods is softened, a contact surface area between the woods is increased while each of the woods is being plastically and easily molded so as to get an integral collected lumber. Various characteristics can be freely changed during this compressing stage by varying a percentage of compression set. In such a collected lumber, a plurality of woods adhere to each other and fixed through the adhesive, so that they show a higher density and a higher strength as compared with those of non-processed woods, resulting in that their abrasion resistance, chemical resistance, corrosion resistance and stability in size and the like can be improved, and they can be used over a wide range of building materials, for example. In addition, since the collected lumber compressed into a predetermined shape is treated with a fixation treatment, an aging of the collected lumber can be shortened to improve its productivity and then a collected lumber of low cost can be obtained.

Accordingly, in accordance with the present invention, the annual rings found in each of the thinned-out woods or the like are left at an end face of the collected lumber or the like while being molded into various shapes, thereby a specific design effect can be realized and they can be used over various wide ranges of applications and concurrently various superior characteristics of the collected lumber can be applied to each of the applications after the woods are collected. In addition, the aging can be shortened to improve productivity and thus it is possible to provide the collected lumber of low cost.

(6) In addition, a collected lumber of the present invention for accomplishing the aforesaid sixth object discloses that each of a plurality of conifers is compressed into a specific shape while an adhesive is being spread at the surface of each of the conifers softened through a heating treatment applied as one means, and in particular, a collected body in which the wood formed into a predetermined shape is fixed is the most preferable one, wherein the collected body has annular rings of the woods left in complicatedly molded state at its ends, and the ends having a hardness of 4.6 to 9.0 kgf/mm$^2$, as measured according to JIS Z 2117.

Additionally, as another means, the present invention teaches that a plurality of bamboos are compressed into a predetermined shape while an adhesive is being spread to the surfaces of the bamboos softened through heating treatment and cut in a longitudinal direction, wherein a collected body compressed into a predetermined shape through a fixation treatment in particular is the most preferable one, wherein the collected body at its ends having a hardness of 5.2 to 8.5 kgf/mm$^2$, as measured according to JIS Z 2117.

In addition, another means discloses that a plurality of bamboos and a plurality of broad-leafed trees are compressed into a predetermined shape while an adhesive is being spread to the surfaces of the bamboos softened through a heating treatment and the broad-leafed trees, wherein the collected body formed into a predetermined shape and processed with fixation treatment is the most preferable one.

The collected lumber of the present invention having the aforesaid configuration is compressed into a predetermined shape while an adhesive is being spread at the surfaces of each of the plurality of woods softened through heat treatment, wherein the lumber is preferably composed of the collected body in which a fixation treatment is applied to prevent the shape from being returned to its original shape even if the lumber is processed at high temperatures and its shape is fixed, and further the annual rings of each of the woods are left at the end face of the collected body while being molded into various shapes. Accordingly, since the annual rings of each of the woods are left at the end face of the collected body while being molded into various shapes, it becomes possible to realize a specific design effect by changing a diameter of the woods to be used. With such an arrangement as above, the aforesaid collected lumber can be used over various wide ranges under utilization of its design effect and its high surface hardness.

In addition, when each of the woods is softened, each of the woods enters a relative small gap, a contact area between each of the woods is increased during its compressing step while the woods are being easily plasticized and molded so as to obtain the integral collected lumber. Various characteristics can be freely changed by changing a percentage of compression set during its pressing step.

The percentage of compression set called here is defined by the following equation.

$$\text{Percentage of compression set}=(So-Sc)/So\times 100(\%)$$

wherein, So designates a sum of areas at the end faces of each of the woods spread in a mold of press before its compressing treatment, and Sc designates an area at the end face of the integral woods after compressing treatment.

In such a collected lumber as above, since a plurality of woods are bonded and fixed to each other through an adhesive, so they show a higher density and a higher strength as compared with those of non-processed woods, resulting in that a surface hardness is increased and abrasion resistance and the like is also increased. In this case, a surface hardness as measured according to JIS Z 2117 at the end face of the collected lumber can be of 4.6 kgf/mm$^2$ to 9.0 kgf/mm$^2$ by adjusting a percentage of compression set to 30 to 60%. If this value is set to 4.6 kgf/mm$^2$ or less, there is no substantial difference in view of an abrasion resistance as compared with that of non-processed broad-leafed tree when the collected lumber is applied in a flooring material, a table or the like, and in turn, if the value is set to have 9.0 kgf/mm$^2$ or more, mechanical machining characteristics are remarkably deteriorated. In view of a design characteristic, a stability in size and a cost influenced by surface hardness, it is further preferable that the surface hardness as measured according to JIS Z 2117 is within a range of 5.0 kgf/mm$^2$ to 7.5 kgf/mm$^2$.

In addition, as the collected lumber of the present invention described above, bamboos can be used in the same manner as that of the conifer. A basic organization or a grain of fibrovacular bundles of bamboo can be left while being compressed in the same manner as that of the conifer. As the kind of bamboos, although Phyllostachys pubescens Mazel, Phyllostachys reticulata Koch, Phyllostachys nigra Munro, Phyllostachys nigra var. Henoris Staaf, Pleioblastus Simonii Nakai, Pseudosasa japonica Makino, or the like are applicable for their use, Phyllostachys pubescens Mazel, Phyllostachys reticulata Koch, Phyllostachys nigra Munro have a wide range of application in view of their strength and resiliency or the like. In addition, it is most preferable that a softening of the bamboo is carried out in hot water. The reason for it consists in the fact that deoiling can be effectively performed, resulting in that adhesiveness with the adhesive is improved and its hardness and strength are also increased. In case of the bamboo, although the bamboo cut into pieces is used and the collected bamboo lumber can be produced by the producing method for the wood collected lumber strictly as described in the preferred embodiment below, a maximum effect can be realized in view of machining and application by adjusting a surface hardness at an end face to have 5.2 $kgf/mm^2$ to 8.5 $kgf/mm^2$.

In addition, in case of the collected lumber of the present invention, a compound collected lumber in which a wood and a bamboo are mixed and integrally compressed via an adhesive. A filling density before compressing treatment may also be increased by assembling the bamboo cut into pieces between the log-like woods. In view of design, a specific grain or pattern in which the annual rings and the fibrovascular bundles are combined to each other can be realized at the end face of the lumber and also its side surface can be formed with a specific pattern in which a cross grain, straight grain and bamboo fibers are mixed to each other.

As described above, it becomes possible to use the conifer of short diameter log which is originally soft material over a wide range of building materials by changing the conifer into the collected lumber of the present invention. In addition, since the collected lumber is subjected to the fixation treatment for the collected body compressed into a predetermined shape, an aging of the collected lumber can be shortened to improve productivity, and thus a collected lumber of low cost can be obtained.

Accordingly, in accordance with the present invention, the annual rings found in each of the thinned-out woods are left at the end face of the collected lumber while being molded into various shapes, thereby a specific design effect can be realized and concurrently a soft characteristic of the conifer thinned-out woods is changed into a hard one and the present invention can be used over various wide ranges. In addition, an aging can be shortened to improve productivity and then a collected lumber of low cost can be provided.

(7) In addition, a collected lumber of the present invention for accomplishing the aforesaid seventh object discloses a construction as one means that the collected lumber is compressed into a predetermined shape while an adhesive is being spread to the surfaces of each of various kinds of woods softened through a heating treatment, and a collected body having the collected lumber formed into a predetermined shape through a fixation treatment is the most preferable one, wherein the collected body has annular rings of the woods left in complicatedly molded state at its ends, and the collected body has a depth of abrasion of 25 to 170 μm after 500 revolutions, as measured for side faces having a longitudinal straight grain or cross grain of wood according to the Abrasion Test A of JAS.

As another means, the present invention discloses that a collected body is compressed into a predetermined shape while an adhesive is being spread to the surfaces of a plurality of bamboos softened with a heating treatment and cut in a longitudinal direction, wherein in particular the collected body having the collected bamboos formed into a predetermined shape and processed with fixation treatment is the most preferable one, and the collected body has a depth of abrasion of 30 to 145 μm after 500 revolutions, as measured for its side face having a longitudinal fiber pattern of bamboo according to the Abrasion Test A of JAS.

The collected lumber of the present invention having the aforesaid configuration is compressed into a predetermined shape while the adhesive is being spread at the surfaces of each of a plurality of woods softened through heating treatment, and preferably this is composed of the collected body having a fixation treatment applied to prevent the woods from being returned back to their original shapes even after fixing their shapes under high-temperature treatment, wherein the annular rings of each of the woods are left at the end face of the collected body while being entered and molded into various shapes. Accordingly, since the annular rings of each of the woods are left at the end face of the collected body while being left and molded into various shapes, it becomes possible to realize a specific design effect by changing a diameter of the woods to be used or the kind of tree or the like. With such an arrangement as above, the collected lumber can be used over various wide ranges under utilization of its design effect and its abrasion resistance.

Although as the practical kinds of the woods, conifers such as Japanese red wood, Japanese cypress, Japanese red pine, Japanese black pine, Japanese larch, Japanese white pine, Yezo spruce, White fir, Umbrella tree, Sawara ceder, Momi fir, False arbor-vitae, Standish arbor-vitae, Yew podocarpus, Southern Japanese hemlock, Japanese torreya, Japanese Douglas fir, and Japanese yew, and broad-leafed trees such as Zelkovas, White oak, Japanese chestnut, Ash, Camphor tree, Panlownia, Red oak, White oak, Quercus acutissima CARRUTHERS, Japanese ebony, Siebold's beech, Castanopsis cuspidata SCHOTTKY var. Sielboldii Nakai, Swamp ash, Bass wood, Japanese wingnut, Fraxinus lanuginosa Koidz, Painted maple, Mountain cherry, Japanese alder, Heliotrope tree, Buckeye, Poplar, Japanese hop hornbeam, Laurel, Japanese elm, Japanese walnut, Katsura tree, Silver magnolia, Japanese cherry birch, Birch, Witch hazel, Morus bombycis Koidz, Maakia amurensis var. buergeri, Sen, Phellodendron amurense RUPR var. sachalinense FR SCHM, Shiwari CHERRY, Birch, and Kenbo pier tree are suitable, Japanese red wood, Japanese cypress, pines or the like, Zelkova, Quercus acutissima, White oak and Siebold's beech are preferable as the material of the present invention in view of design and abrasion resistance.

As foreign woods, the followings are preferable: Teak, Red lauan, Nyato, Champala, Manggasinoro, Pekurru, Dao, Rose wood, Black ebony, Durian, Kamerere, Mersawa, Ramin, Bagtikan, Kapur, Meranti, Palosapis, Radiata pine, Taiwan cypress, Agathis, Apitong, Pradoo wood, New Guinea walnut, Qweensland walnut, Monkey pot, Silky oak, Tamakra, Bradirian rose, MORADO, Mahogany, Kobaril, Primavella, Aku-sugi, Black walnut, Spruce, Claro walnut, Western red cedar, Port Orford cedar, Douglas fir, Zebra wood, Wenge, Mansonia, Iroko, Makore, Satinwood, Afara, Abura, Idigbo, Sapele, Omu, Ilomba, Wawabima, Bubinga, Danta, Ovangkol, Black bean, Yakal, Jelutong, Asam, Jongkong, Sepetir, Matoa, and Hevea brasiliensis.

In the present invention, pine, Japanese cypress, Japanese red wood, Zelkova, Quercus acutissima CHARRUTHERS, White oak and Siebold's beech are preferable as woods. The reason for the above consists in the fact that these trees may easily be heated and softened.

In addition, when each of the woods is softened, each of the woods mutually enters their fine gaps more than expected and is easily plasticized, so that a contact area between the woods is increased during compressing step so as to obtain an integral collected lumber. Various characteristics can be freely changed by varying a percentage of compressduring this compressing step.

In addition, strength, heat resistance and the like can be freely adjusted by making compound materials by metallic materials such as aluminum and iron; ceramic materials such as alumina, silicon nitride, carbon fiber, fibrous silicon carbide and fibrous alumina-silica; and plastic materials such as nylon and Tetron.

Since the plurality of woods in the collected lumber are connected and fixed to each other through the adhesive, they show a higher density and a higher strength as compared with those of non-processed woods, resulting in that its surface hardness is increased and abrasion resistance or the like are improved. In this case, a depth of abrasion at the side surface of grain or straight grain after 500 revolutions with the Abrasion A Test of JAS appearing in the longitudinal direction of the collected lumber is necessary to have a value of 25 to 170 μm with a percentage of compression set of 20 to 70%.

In the case where the depth of abrasion exceeds 170 μm, a substantial difference is not found in a degree of abrasion as compared with that of non-processed wood when the collected lumber is applied in a flooring material or the like in view of the effect against the footwear, and in turn, when the depth is 2.5 μm or lower, its machining characteristics are remarkably deteriorated. In view of a design characteristic influenced by abrasion resistance, stability in size and cost, a depth of abrasion under the Abrasion A test under JAS (flooring) is most preferably in a range of 65 to 125 μm.

In addition, even if the collected lumber is of a plate member within the aforesaid range of depth of abrasion, a warp is scarcely found in it. Normal woods, in particular, a plate having cross grain generates an outward directed warp against a core of the plate without fail, although the material of the present invention does not generate any warp in the case where the plate-like material is applied. The reason for the above is not so clear, but it is supposed that the collected lumber is formed by short diameter logs, resulting in that there is no directional indication such as annular rings found in the cross grain and the range of the depth of abrasion in the present invention corresponds to a strength and a hardness which can resist against the residual stress of the warp found in each of the woods constituting the collected lumber.

In addition, a hardness at the end face of the present invention as measured according to JIS Z 2117 can be set to 4.6 kgf/mm$^2$ to 9.0 kgf/mm$^2$ by adjusting a percentage of compression set to 30% to 60%. If this hardness value is set to 4.6 kgf/mm$^2$ or lower, there is no substantial difference in abrasion resistance as compared with that of non-processed conifer when the collected lumber is applied to a flooring plate, a table or the like, and in turn if the value exceeds 9.0 kgf/mm$^2$, its machining characteristics are remarkably deteriorated. In view of the design characteristic influenced by hardness, stability in size and cost, the hardness value as measured in accordance with JIS Z 2117 is preferably within a range of 5.0 kgf/mm$^2$ to 7.5 kgf/mm$^2$.

In the present invention, bamboos may also be used in the same manner as that of the woods. Basic structure or grain of fibrovascular bundle can be left in the same manner as that of the annular rings of the woods while being compressively molded. As the kinds of bamboos, Phyllostachys pubescens Mazel, Phyllostachys reticulate Koch, Phyllostachys nigra Munro, Phyllostachys nigra var Henonis Staaf, Pleioblastus Simonii Nakai, Pseudosasa japonica Makino, Phyllostachys vaginatus Nakai, Iyo Take, Chimonobambusa marmorea Makino and the like are suitably applied, Phyllostachys pubescens Mazel, Phyllostachys reticulata Koch, Phyllostachys nigra Munro are preferable due to their wide range of application in view of strength, resiliency and the like. In addition, softening of the bamboos is most preferably carried out in hot water. A reason for it consists in the fact that deoiling can be effectively arried out, with a result of adhesiveness of the adhesive is improved, its hardness and strength may also be increased. In case of the bamboos, the bamboos cut into pieces can be applied and the collected body of bamboos can be made by the producing process of the wood collected lumber described in detail in the first embodiment.

In case of the collected body of the bamboos in the present invention, it is necessary that a depth of abrasion at the Abrasion A Test in accordance with JAS (flooring) at the side surface in the longitudinal direction of the bamboo is within a range of 30 to 145 μm. The reasons for this state consist in the facts that if the value exceeds 145 μm, there is no substantial difference in a degree of abrasion as compared with that of non-processed bamboos when the collected body is applied to the flooring material or the like, and in particular, there is no effect against footwear, and in turn in case of the value of 30 μm or lower, its machining characteristics are tremendously deteriorated. Its most preferable range is 70 to 120 μm.

In addition, the hardness at the end face of the collected body of the aforesaid bamboos can produce the most preferable effect in view of its machining characteristics and application by adjusting it in reference to a percentage of compression set in such a manner that it shows 5.2 kgf/mm$^2$ to 8.5 kgf/mm$^2$.

As described above, the short diameter soft woods by themselves can be used over a wide range of building materials and the like by changing them into the collected lumbers of the present invention. Additionally, since the collected lumbers are treated in fixation for the collected lumbers compressed into a predetermined shape, an aging of the collected lumbers can be shortened to improve productivity, resulting in that it is possible to obtain the collected lumber of a low cost, a superior abrasion resistance and having no warp even if they are machined into a plate-like member.

Accordingly, in accordance with the present invention, the annual rings found in each of the thinned-out woods are left at the end face of the collected lumber, thereby a specific design effect can be realized, concurrently softness of the thinned-out woods is changed into hard one, resulting in that their abrasion resistance can be improved and they can be used over various wide ranges. In addition, the aging can be shortened to improve productivity and the collected lumber of low cost can be provided, and additionally even if the lumber is machined into the plate-like member, there occurs no warp at all.

(8) In addition, a collected lumber producing apparatus according to the present invention for accomplishing the above eighth object comprises on a self-running vehicle one or more devices for heating a plurality of woods to soften the woods, compressing the softened woods with an adhesive therebetween to form a collected body, and subjecting the collected body to a fixation treatment.

In this case, the aforesaid heating treatment is carried out with water vapor heating and the aforesaid fixation treatment is carried out by heating the collected body by heating water vapor or a heater. In addition, as the self-running vehicle, either a trailer type vehicle or a plurality of vehicles can be used. In addition, it is desirable that the self-running vehicle has a saw for cutting the woods to a predetermined length and a barker for barking of the woods.

The vehicle-carried type apparatus for manufacturing a collected lumber of the present invention having the aforesaid configuration is operated such that at first thinned-out woods used as raw materials is cut by the saw into a predetermined length. Since the thinned-out woods left at the site are different in length from each other, if the precise alignment in cutting of the lengths of the thinned-out woods in advance which are used as raw materials is not provided, the lengths of the collected lumbers obtained through the cutting operation cannot be aligned to each other. The thinned-out woods cut and aligned by the saw are transported to the barker. The barker peels off the barks present at the outer circumferential surfaces of the thinned-out woods.

In this way, the thinned-out woods, lengths of which are aligned from each other and barks of which are peeled off, are transported to the compressively molding apparatus through conveyors. At the compressively molding apparatus, heating treatment for softening the thinned-out woods is performed for improving a forming characteristic of the thinned-out woods in the pressing and compressing treatment to be carried out at its subsequent stage. As one of the heating treatments, this can be carried out by heating the thinned-out woods with water vapor heating and the thinned-out woods are left within the water vapor heating for a specified period of time. Each of the softened thinned-out woods is spread with adhesive entirely over the full range of the thinned-out woods in order to allow the plurality of thinned-out woods to adhere to each other.

The plurality of thinned-out woods spread with the adhesive are collected and further a pressing and compressing treatment is carried out for changing the plurality of thinned-out woods into one collected lumber. The plurality of thinned-out woods already pressed and compressed are turned into a collected lumber having a predetermined shape. In this way, the fixation treatment for fixing each of the thinned-out woods is carried out for the collected lumber in which the plurality of thinned-out woods are pressed and compressed. The fixation treatment is carried out by heating the integral body left at the pressed and compressed state to a temperature higher than that at the pressing and compressing time with heating water vapor or a heater, and during this treatment, a specified constant pressure is being applied. The adhesive present in the plurality of thinned-out woods constituting the collected body is solidified through heating and pressing, and then the thinned-out woods are permanently formed as the collected lumber. Then, the produced collected lumbers are transported out of the vehicle by conveyors or transferred to a collected lumber transporting vehicle.

Since the saw, barker and compressively molding apparatus are installed on the self-running vehicle, after the thinned-out woods are moved to the producing center of wood, for example, the collected lumber can be produced with the raw material of the thinned-out woods and directly shipped as the collected lumber.

Accordingly, in accordance with the present invention, since the compressively molding apparatus capable of producing the collected lumber from the thinned-out woods is installed on the self-running vehicle, the collected lumber having a high density, a high strength, a superior abrasion resistance and a superior stability in size can be produced through the pressing and fixation treatment without transporting the thinned-out woods, and at the same time the collected lumber manufacturing apparatus utilizing the thinned-out woods can be easily moved, and further its mounting cost can be eliminated. In addition, the thinned-out woods of low added value can be directly shipped as the high value-added product, and this direct shipping enables utilization of thinned-out woods to be promoted and the low cost collected woods can be provided.

BRIEF DESCRIPTION OF THE DRAWINGS

FIG. 1 is an end view of the collected lumber in which a plurality of thinned-out woods having a relatively uniform diameter to each other; FIG. 2 is an end view for showing the collected lumber in which a plurality of thinned-out woods having an irregular diameter to each other are pressed and collected; FIG. 3 is an illustrative view for schematically showing the state in which the thinned-out woods are heat treated with a water vapor heating device; FIG. 4 is an illustrative view for schematically showing the state in which the thinned-out woods are heat treated in a water tank filed with hot water; FIG. 5 is an illustrative view for schematically showing the state in which the thinned-out woods are heat treated by a high-frequency heating device; FIG. 6 is a sectional view for schematically showing the compressively molding apparatus; FIG. 7 is a sectional view for schematically showing the state of the compressively molding apparatus at the time when the pressing step is completed; and FIG. 8 is a sectional view for showing the state in which the fixation treatment is carried out through a heater arranged in the compressively molding apparatus.

FIG. 9 is an illustrative view for schematically showing the state before the heating treatment of the thinned-out woods is carried out by the compressively molding apparatus; FIG. 10 is an illustrative view for schematically showing the state after compressively molding each thinned-out wood by the compressively molding apparatus; FIG. 11 is a sectional view for schematically showing the compressively molding apparatus; FIG. 12 is a sectional view for showing the compressively molding apparatus for schematically illustrating the state of performing the fixation treatment while each thinned-out wood being further compressed; FIG. 13 is a sectional view for showing the state in which the fixation processing is carried out through the heater arranged in the compressively molding apparatus; FIG. 14 is an illustrative view for schematically showing the state for performing a fixation treatment through the heating water vapor after performing a compressively molding each thinned-out wood by the compressively molding apparatus; FIG. 15 is an illustrative view for schematically showing the state for performing a fixation treatment through the heater after compressively molding each thinned-out wood by the compressively molding apparatus; and FIG. 16 is an illustrative view for schematically showing the state for forming the collected lumber by laminating each thinned-out wood spread with adhesive and pressing it through a clamping device.

FIG. 17 is an end view of the collected lumber in which a plurality of thinned-out woods having a relatively uniform diameter to each other are pressed and collected; FIG. 18 is an end view for showing the collected lumber in which a plurality of thinned-out woods having irregular diameters are pressed and collected from each other; FIG. 19 is an illustrative view for indicating a sectional view and a side elevational view of reinforcing members P; FIG. 20 is a view of concept for showing the state in which each of the thinned-out woods in the collected lumber is connected and fixed through each of the reinforcing members; FIG. 21 is a sectional view for schematically showing the compressively molding apparatus; FIG. 22 is a sectional view for schematically showing the state of the compressively molding apparatus at the time of completion of the pressing step; FIG. 23 is an illustrative view for showing the first modification of the reinforcing member; FIG. 24 is an illustrative view for showing the second modification of the reinforcing member; FIG. 25 is an illustrative view for showing the third modification of the reinforcing member; FIG. 26 is an illustrative view for showing the fourth modification of the reinforcing member; FIG. 27 is an illustrative view for showing the fifth and sixth preferred embodiments of the reinforcing member, respectively; and FIG. 28 is a sectional view for showing the state in which the fixing treatment is carried out through the heater arranged in the compressively molding apparatus.

FIG. 29 is an illustrative view for schematically illustrating the side surface of the wood building material pressed, formed and fixed; FIG. 30 is an illustrative view for schematically showing the side surface of the collected wood building material which can be attained by pressing, forming and fixing operations; FIG. 31 is a sectional view for schematically showing the part to be cut during a standardization process; FIG. 32 is an illustrative view for schematically showing the side surface of the thinned-out woods cut by the standardization process; FIG. 33 is a sectional view for schematically illustrating the state in which the softening process is applied by using the compressively molding apparatus; FIG. 34 is a sectional view for schematically showing the state in which the compressively molding treatment and the fixation treatment are applied through the compressively molding apparatus; FIG. 35 is a sectional view for showing the state in which the fixation is carried out through a heater arranged at the compressively molding apparatus; and FIG. 36 is a sectional view for schematically showing the state in which the collected wood building materials are formed by collecting each wood building material and fastening it through the clamping device.

FIG. 41 is a perspective view for schematically showing the collected lumber in the case of using the bamboos; FIG. 42 is a perspective view for schematically showing the complex collected lumber in the case of using the wood and the bamboo; and FIG. 43 is a schematic illustration for showing the test machine for the abrasion Test A in accordance with JAS.

BEST MODE FOR CARRYING OUT THE INVENTION

Embodiments in which the present invention is specified will be described hereinafter with reference to the drawings.

(First Embodiment)

Figure 1:
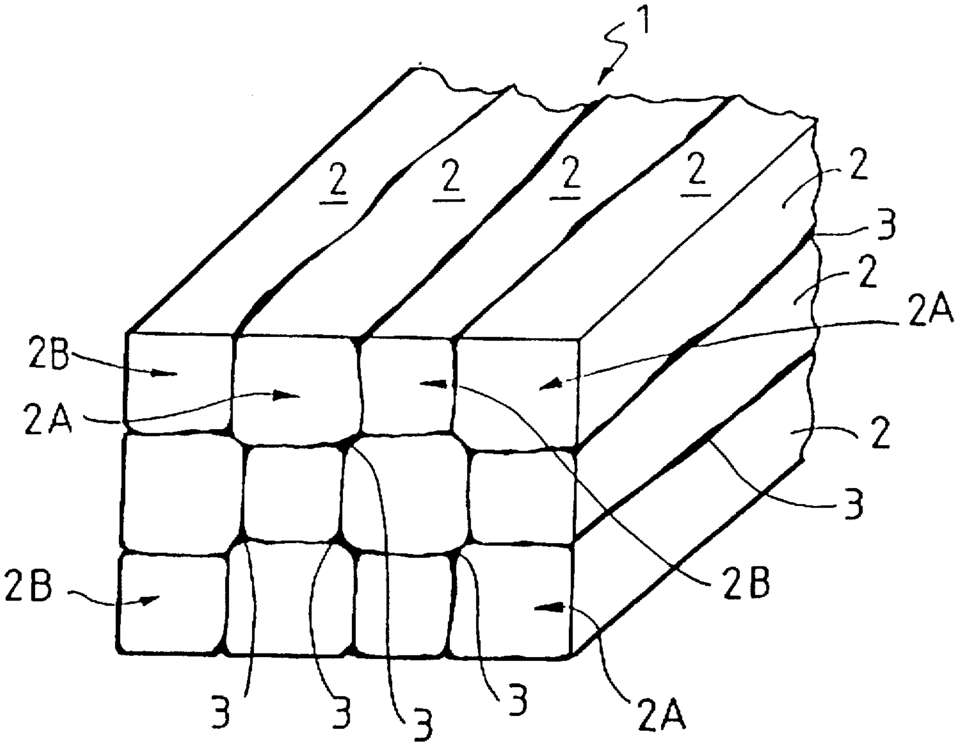
FIGS. 1 to 8 are views for illustrating the collected lumber and the process for producing the collected lumber in the first preferred embodiment.

The first embodiment according to the present invention will be described in detail with reference to FIGS. 1 to 8. First, the construction of a collected lumber according to the first embodiment will be described with reference to FIGS. 1 and 2. In FIG. 1, a collected lumber 1 comprises a plurality of thinned-out woods 2 (12 in the collected lumber 1 shown in FIG. 1) and an adhesive 3 interposed between the thinned-out woods 2, which are then mutually compressed and collected and are then subjected to a fixation treatment through heating water vapor or a heater. The thinned-out woods 2 used herein are those removed during the process of growing of Sugi (Cryptmeria japonica D. Don), a Japanese cypress, and the like. As the thinned-out wood 2, a log is used, of which diameter is relatively arranged in order having a bottom end 2A of approximately 15 cm and a tip end 2B of approximately 10 cm.

It is to be noted that the aforementioned fixation treatment is not always required, but the collected lumber 1 having the thinned-out woods 2 compressed and collected without subjecting the fixation treatment can be applied to various products.

As shown in FIG. 1, the bottom ends 2A and the tip ends 2B of the thinned-out woods 2 in the longitudinal row and lateral row in the collected lumber 1 are alternately disposed. For example, taking the lateral row of the thinned-out wood 2 located at the uppermost position in the collected lumber 1 as an example, when the thinned-out wood 2 is disposed with the bottom end 2A located on the end side (the thinned-out wood 2 at the rightmost position in the lateral row), the thinned-out wood 2 adjacent to the first mentioned thinned-out wood 2 is disposed so that the tip end 2B is located on the end side of the collected lumber 1. In the next thinned-out wood 2, the bottom end 2A thereof is disposed on the end side of the collected lumber 1, and in the further thinned-out wood 2, the tip end 2B is disposed on the end side of the collected lumber 1. The mutual relationship between the thinned-out woods 2 as described is maintained in the longitudinal row and lateral row of the collected lumber 1. When the thinned-out woods 2 are disposed as described above, it is hard to form a clearance between the thinned-out woods 2 when carrying out the compressive molding and fixation treatment which will be described later, and in addition, the using quantity of the adhesive 3 can be saved.

Further, the adhesive 3 is used to mutually bond the thinned-out woods 2, and various kinds of adhesives can be used in the present embodiment. Preferable adhesives include, for example, heat curing adhesives such as, a phenolic resin adhesive mainly composed of a phenolic resin, a resorcinol resin adhesive mainly composed of a resorcinol resin. Further, use can be made of other heat curing adhesives such as a melamine-formaldehyde resin adhesive mainly composed of a melamine-formaldehyde resin, a urea resin adhesive mainly composed of a urea resin, and an epoxy resin adhesive mainly composed of an epoxy resin. In addition to these heat curing adhesives, a water based polymer-isocyanate adhesive mainly composed of isocyanate and a water based polymer, and a polyvinyl acetate resin adhesive can be also used. In selecting adhesives to be used, it is preferable to select them in consideration of kinds of solvents, uses of collected lumber, and the like.

Next, a collected lumber 4 shown in FIG. 2 will be described. This collected lumber 4 basically has the construction similar to the collected lumber 1 shown in FIG. 1, except that thinned-out wood 5 is irregular in diameter. The collected lumber comprises a plurality of thinned-out woods 5 (20 in the collected lumber 4 shown in FIG. 2) and an adhesive 3 interposed between the thinned-out woods 5, which are then mutually compressed and collected and are then subjected to a fixation treatment through heating water vapor or a heater.

It is to be noted that the aforementioned fixation treatment is not always required, but the collected lumber 4 having the thinned-out woods 5 compressed and collected without subjecting the fixation treatment can be applied to various products, similarly to the collected lumber 4 described above.

As the thinned-out wood 5, there is used a log having an average diameter in the range of from approximately 6 cm to 20 cm. In the case where these thinned-out woods 5 are arranged so that they are mutually collected, the thinned-out wood 5 is selected depending on the average diameter falls within the aforementioned predetermined range in consideration of the diameter of the bottom end and the diameter of the tip end. Therefore, it is not particularly necessary that the bottom ends and the tip ends of the thinned-out woods 5 are alternately disposed. However, preferably, the thinned-out woods 5 are suitably disposed in consideration of the entire configuration of the collected lumber 4. Here, the thinned-out wood which is irregular in diameter is generally reduced to half in the using value, which is difficult to use. However, the collected lumber 4 as mentioned above has a value enough to use.

Since the adhesive 3 is identical with that used in the collected lumber 1 shown in FIG. 1, an explanation thereof is omitted.

Next, the process for producing the collected lumbers 1 and 4 constructed as above will be explained. The collected lumbers 1 and 4 are produced via the steps of softening the thinned-out woods 2 and 5 by subjecting a plurality of thinned-out woods 2 and 5 to a heating treatment, coating an adhesive on the surface of the softened thinned-out woods 2 and 5, pressing and compressing the thinned-out woods 2 and 5 having their surfaces coated with the adhesive to form a collected lumber having a predetermined shape, and applying a fixation treatment to the collected lumber through heating water vapor or a heater as necessary.

Figure 3:
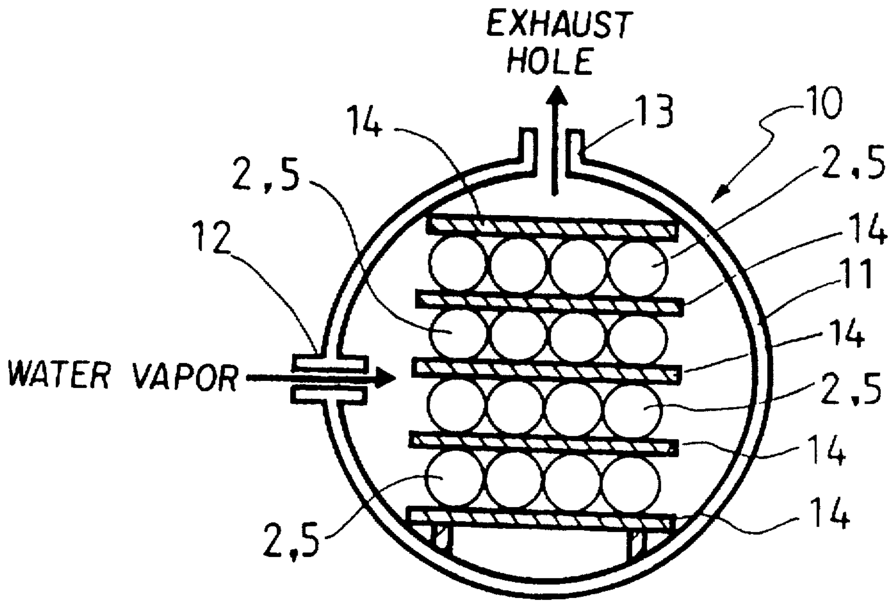
Figure 4:
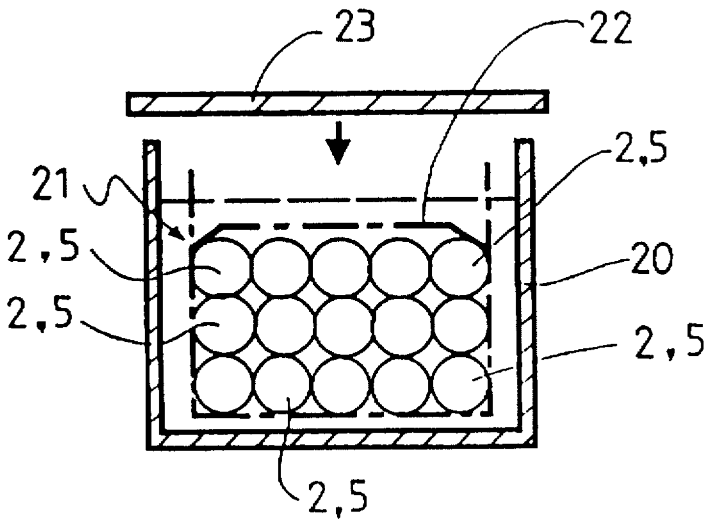
Figure 5:
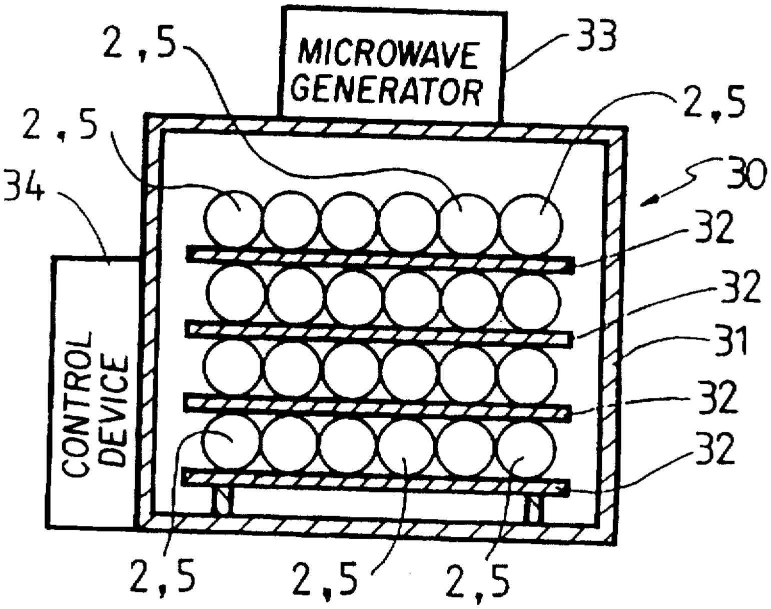

First, the heating treatment carried out in the softening step will be first explained with reference to FIGS. 3 to 5. FIG. 3 schematically shows the state where the heating treatment of the thinned-out woods 2 and 5 is carried out by a water vapor heating device; FIG. 4 schematically shows the state where the heating treatment of the thinned-out woods 2 and 5 is carried out in a water tank filled with hot water; and FIG. 5 schematically shows the state where the heating treatment of the thinned-out woods 2 and 5 is carried out by a high-frequency heating device.

First, the method for the heating treatment using the water vapor heating device shown in FIG. 3 will be explained. The water vapor heating device 10 has a heating vessel 11, which is provided with a steam nozzle 12 (on the right side in FIG. 3) for jetting heating water vapor into the interior, and an exhaust port 13 (on the upper side in FIG. 3) for discharging the interior heating water vapor outwardly of the water vapor heating device 10. In the water vapor heating device 10 as described, the interior of the apparatus 10 is communicated with the atmosphere through the exhaust port 13. Within the water vapor heating device 10, a plurality of thinned-out woods 2 and 5 are laminated through partition plates 14. Each partition plate 14 has a function to locate the thinned-out woods 2 and 5 so that they are not moved within the apparatus 10.

The interior of the apparatus 10 is increased in temperature to 70°–160° C. by the heating water vapor jetted into the apparatus 10 from the steam nozzle 12. Preferably, the heating water vapor is intermittently jetted under a water vapor pressure of approximately 1 kgf/cm$^2$ to maintain the temperature within the apparatus 10 at approximately 80° C. The heating time is set to approximately 6 hours.

The heating treatment of the thinned-out woods 2 and 5 are carried out by the water vapor heating device 10 in such a manner that the barked thinned-out woods 2 and 5 are laminated within the apparatus through the partition plates 14, after which the heating water vapor is intermittently jetted through the steam nozzle 12. The thinned-out woods 2 and 5 are evenly softened during the jetting of the heating water vapor.

Next, the process for heat-treating the thinned-out woods 2 and 5 in hot water will be described with reference to FIG. 4. In FIG. 4, a water tank 20 is filled with hot water 21, into which a net 22 such as a wire net receiving a plurality of thinned-out woods 2 and 5 therein is soaked into the hot water 21. A lid 23 is placed on the water tank 20. This lid 23 is provided to close the upper portion of the water tank 20 when the thinned-out woods 2 and 5 are subjected to a heating treatment so that a temperature of the hot water 21 within the water tank 20 does not lower.

The hot water 21 filled in the water tank 20 is preferably boiling water at a temperature of 60° C. or more. More preferably, the hot water is set to a temperature in the range of 90°±5° C. in consideration of the treatment for a long period of time. A heater may be installed within the water tank 20 to control temperatures, if necessary. It is necessary to heat the thinned-out woods 2 and 5 for about 6 hours.

The heating treatment of the thinned-out woods 2 and 5 is carried out using the water tank 20 as described above in the following procedure. The hot water 21 heated to 90°±5° C. is filled into the water tank 20, and thereafter, the net 22 receiving the plurality of thinned-out woods 2 and 5 therein in advance is introduced into the water tank 20 through a crane or the like and soaked into the hot water 21. The upper portion of the water tank 20 is closed by the lid 23, after which the heating treatment is carried out for about 6 hours. Thereby, the thinned-out woods 2 and 5 are evenly softened.

Further, the process for carrying out a heating treatment of thinned-out woods 2 and 5 by a high-frequency heating device will be explained with reference to FIG. 5. In FIG. 5, the high-frequency heating device 30 has electrodes 32 disposed in plural stages within an apparatus body 31, and the plurality of thinned-out woods 2 and 5 are placed on each of the electrodes 32. A microwave induction heater 33 is provided at the upper part of the apparatus body 31, and a controller 34 for controlling the microwave induction heater 33 is installed on the side (on the right side in FIG. 5) of the apparatus body 31.

High frequency oscillated from the microwave induction heater 33 is set to 2450±50 MHz, and an output thereof is set to 600 W. The time for high-frequency heating carried out by the microwave induction heater 33 is set to about one hour.

The heating treatment of the thinned-out woods 2 and 5 is carried out by the high-frequency heating device 30 in the procedure as follows. The barked thinned-out woods 2 and 5 are placed on each of the electrodes 32 disposed within the apparatus body 31, after which the microwave induction heater 33 is driven under the aforementioned conditions through the controller 34. Consequently, the thinned-out woods 2 and 5 are heated with the high frequency generated by the microwave induction heater 33, to be thus softened uniformly.

The heating treatment for softening the thinned-out woods 2 and 5 can be also carried out by jetting the heating water vapor to the thinned-out woods 2 and 5 through a water vapor jetting apparatus installed on a compressively molding apparatus 40, described later, and used at the time of fixation treatment.

There will be explained hereinafter the adhesive spreading step for spreading an adhesive to the surfaces of the thinned-out woods 2 and 5 subjected to the heating treatment and softened by the above-described heating treatment, the pressing and compressing step for pressing and compressing the thinned-out woods 2 and 5 coated with the adhesive to form a collected lumber having a predetermined shape, and the fixation treatment step for subjecting the collected lumber to a fixation treatment through heating water vapor or a heater.

Figure 6:
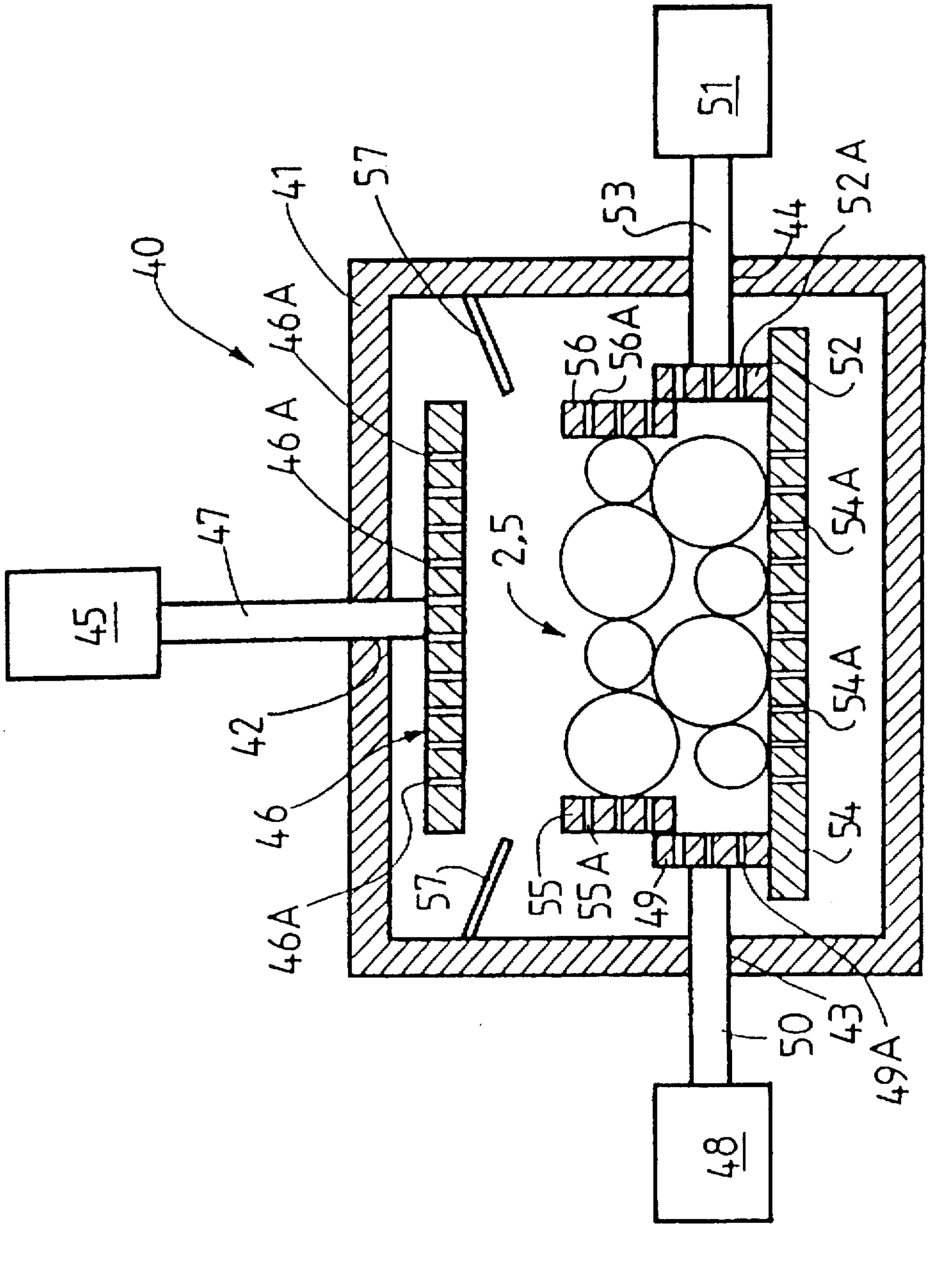

The aforementioned adhesive spreading step, pressing and compressing step and fixation treatment step are carried out through a compressively molding apparatus which will be described hereinafter. The compressively molding apparatus will be described with reference to FIG. 6. FIG. 6 is a sectional view schematically showing the compressively molding apparatus. In FIG. 6, the compressively molding apparatus 40 is provided with a pressure vessel 41 which is formed to be a lengthwise tubular configuration having a square section (which is formed to be long in a direction vertical to paper surface), and rod holes 42, 43 and 44 are bored in an upper wall and both left and right walls of the pressure vessel 41.

A hydraulic cylinder 45 is connected to the rod hole 42 at one end outside of the pressure vessel 41, and a press rod 47 having a mold of press 46 mounted thereon is slidably inserted on the other end into the pressure vessel 41. With this, in the pressing and compression of the thinned-out woods 2 and 5 described later, the press rod 47 is moved downward through the hydraulic cylinder 45, and as the press rod 47 moves, the mold of press 46 presses the thinned-out woods 2 and 5 from the top. The mold of press 46 is formed with a number of water vapor holes 46A, and water vapor passes through each of the water vapor holes 46A during the fixation treatment, described later, to jet the water vapor against the thinned-out woods 2 and 5.

Similarly to the press rod 47, a hydraulic cylinder 48 is connected at one end, outside of the pressure vessel 41, to the rod hole 43 bored in the left wall of the pressure vessel 41, and a press rod 50 having a mold of press 49 mounted thereon is slidably inserted at the other end into the pressure vessel 41. The mold of press 49 is formed with a number of water vapor holes 49A, similarly to the mold of press 46, and water vapor passes through each of the water vapor holes 49A during the fixation treatment, described later, to jet the water vapor against the thinned-out woods 2 and 5.

Similarly to the press rods 47 and 50, a hydraulic cylinder 51 is connected at one end, outside of the pressure vessel 41, to the rod hole 44 bored in the right wall of the pressure vessel 41, and a press rod 53 having a mold of press 52 mounted thereon is slidably inserted at the other end into the pressure vessel 41. The mold of press 52 is formed with a number of water vapor holes 52A, similarly to the molds of press 46 and 49, and water vapor passes through each of the water vapor holes 52A during the fixation treatment, described later, to jet the water vapor against the thinned-out woods 2 and 5.

Within the pressure vessel 41, a mold of press 54 is fixedly mounted at a lower position, and a plurality of thinned-out woods 2 and 5 to be pressed and compressed are placed on the mold of press 54. The mold of press 54 is formed with a number of water vapor holes 54A, similarly to the molds of press 46, 49 and 52, and water vapor passes through each of the water vapor holes 54A during the fixation treatment to jet the water vapor against the thinned-out woods 2 and 5.

The mold of press 49 is internally provided with a mold of slide-press 55 which is slidable vertically along the inner wall of the mold of press 49 and laterally together with the mold of press 49 through a slide mechanism (not shown), and the mold of press 52 is likewise internally provided with a mold of slide-press 56 which is slidable vertically along the inner wall of the mold of press 52 and laterally together with the mold of press 52 through a slide mechanism. The molds of slide-press 55 and 56 are formed with a number of water vapor holes 55A and 56A, similarly to the mold of press 46 or the like. The molds of slide-press 55 and 56 have a function to prevent the thinned-out woods 2 and 5 from falling down, when the plurality of thinned-out woods 2 and 5 are placed on the mold of press 54, to keep the laminated state of the thinned-out woods 2 and 5.

At upper positions of the left and right walls of the pressure vessel 41, a number of nozzles 57 (only two nozzles 57 are shown in FIG. 3) are provided lengthwise of the pressure vessel 41. The adhesive 3 is jetted through each nozzle 57 against the surfaces of the thinned-out woods 2 and 5 in the adhesive spreading step.

The pressure applied from the hydraulic cylinders 45, 48 and 51, constructed as described above, to the press rods 47, 50 and 53 varies with the percentage of compression set. For example, in case of the percentage of compression set of 50%, the pressure is set to 15 $kgf/cm^2$, and in case of the percentage of compression set of 30%, the pressure is set to 10 $kgf/cm^2$.

The compressively molding apparatus 40 constructed as described above is provided with a water vapor jetting apparatus for jetting the heating water vapor from all walls of the pressure vessel 41 against the thinned-out woods 2 and 5 held in the laminated state by the molds of press 49, 52 and 54 and the molds of slide-press 55 and 56. The water vapor pressure of the water vapor jetted out of the water vapor jetting apparatus is set to 5 to 16 $kgf/cm^2$ or more. A heating temperature is set in the range of from 130° C. to 200° C., preferably, 150° C. to 180° C.

Next, the process for producing collected lumbers 1 and 4 by carrying out the adhesive spreading step, pressing and compressing step and fixation treatment step of the plurality of thinned-out woods 2 and 5 softened by the above-described heating treatment using the compressively molding apparatus 40 constructed as described above will be explained. It is assumed that prior to carrying out the aforementioned steps, the molds of press 46, 49, 52 and 54 are held in the state shown in FIG. 6.

First, the plurality of thinned-out woods 2 and 5 softened through the above-described steps are laminated and placed within the pressure vessel 41 to keep the laminated state of the thinned-out woods 2 and 5 by cooperation with the molds of slide-press 55 and 56 (see FIG. 6). The thinned-out woods 2 having a substantially regular diameter are laminated so that the bottom end and tip end of a log are alternately arranged as previously mentioned, and the thinned-out woods 5 having an irregular diameter are laminated in consideration of the shape of a collected lumber as previously mentioned.

Thereafter, the adhesive is jetted against the surfaces of the thinned-out woods 2 and 5 from each of the nozzles 57. The jetted adhesive passes through the water vapor holes 46A, 49A, 52A and 54A of the molds of press 46, 49, 52 and 54, and the water vapor holes 55A and 56A of the molds of slide-press 55 and 56, and are jetted against the thinned-out woods 2 and 5. After the adhesive in a fixed amount has been jetted, the atmosphere stays still for about 5 minutes in order that the adhesive is evenly spread over the surfaces of the thinned-out woods 2 and 5. Then, the adhesive spreading step is terminated.

After the adhesive has been jetted against the thinned-out woods 2 and 5, the pressing and compression step is carried out in accordance with the percentage of compression set. In this pressing and compression step, the press rod 47 is first pressed and moved through the upper hydraulic cylinder 45 whereby the mold of press 46 presses and compresses the thinned-out woods 2 and 5 from the top under a predetermined pressure. Since at this time the thinned-out woods 2 and 5 are in the softened state, they are compressed through the mold of press 46 by cooperation of the molds of press 49, 52 and 54 with the molds of slide-press 55 and 56. The molds of slide-press 55 and 56 are moved downward in synchronism with the pressing state of the mold of press 46 and finally placed in contact with the inner surface of the molds of press 49 and 52. The mold of press 46 completes its vertical compression and stops when moved by a predetermined amount in accordance with the percentage of compression set.

Figure 7:
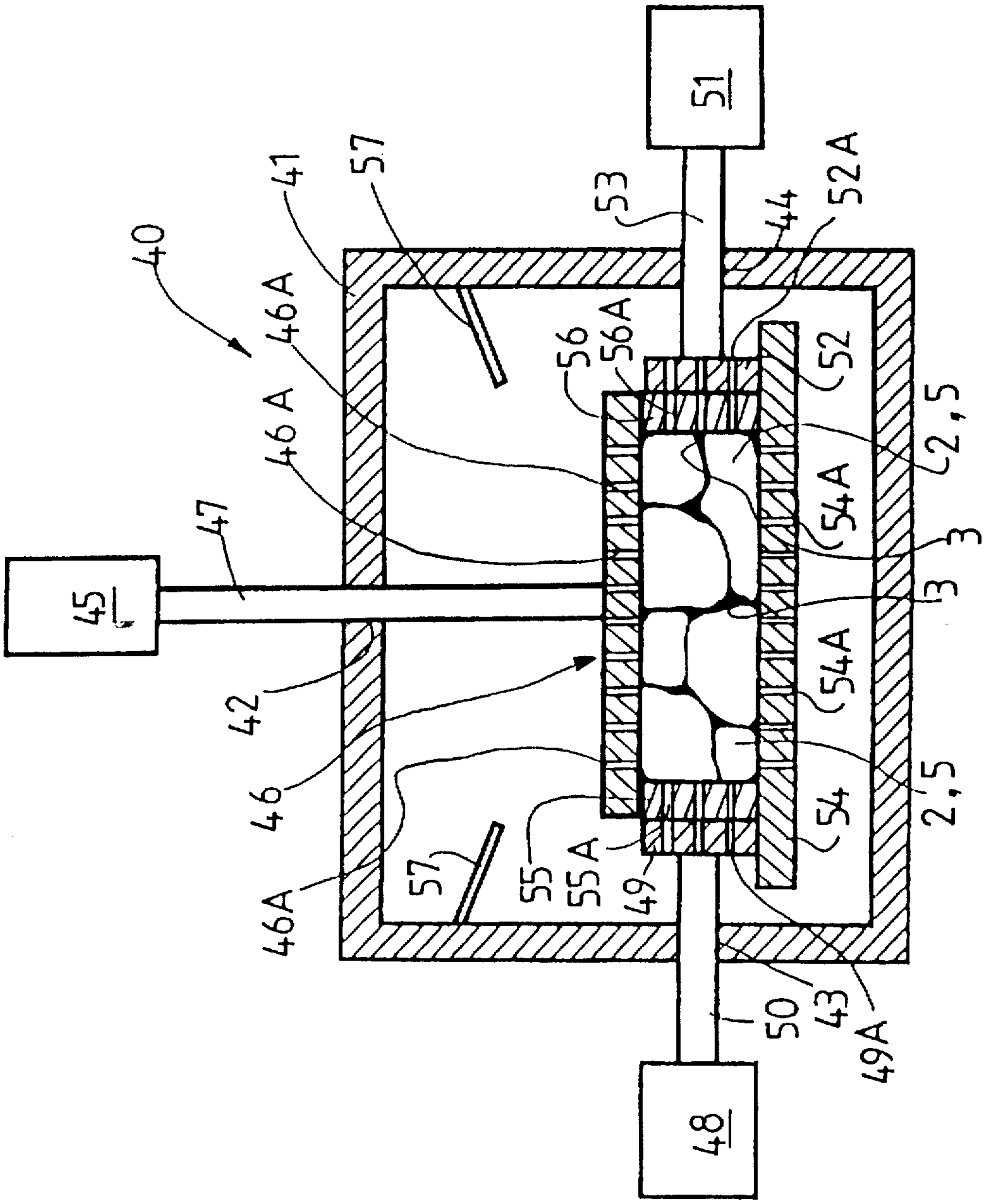

Next, the pressing and compression of the thinned-out woods 2 and 5 in the lateral direction is carried out through the hydraulic cylinders 48 and 51, the press rods 50 and 53, the molds of press 49 and 52, and the molds of slide-press 55 and 56. By the pressing and compression, the thinned-out woods 2 and 5 receive the pressure in the lateral direction in FIG. 6 and are compressively molded. The pressing and compression step terminates when the molds of press 49 and 52 have been moved by a predetermined amount in accordance with the percentage of compression set. This termination state is shown in FIG. 7. FIG. 7 is a sectional view schematically showing the state of the compressively molding apparatus when the pressing and compression step is terminated.

The time of the pressing and compression step depends on the kind of adhesives since the adhesion time varies according to the kind of adhesives to be used. The thinned-out woods 2 and 5 adhere to each other by carrying out the pressing and compression step for about 30 minutes. Thereby, the thinned-out woods 2 and 5 are compressed and collected as shown in FIGS. 1 and 2, to form a collected body. At this time, the adhesive remains in the collected body as the solidified adhesive 3 (see FIGS. 1 and 2).

Next, the collected body having the thus obtained thinned-out woods 2 and 5 adhering to each other through the adhesive 3 is subjected to the fixation treatment. The fixation treatment will be described with reference to FIG. 7. The fixation treatment is carried out by jetting the heating water vapor against the thinned-out woods 2 and 5 from the water vapor jetting apparatus while holding the collected body in the state as shown in FIG. 7. The heating water vapor jetted out of the water vapor jetting apparatus passes through the water vapor holes 46A, 49A, 52A and 54A of the molds of press 46, 49, 52 and 54, and the water vapor holes 55A and 56A of the molds of slide-press 55 and 56, and are jetted against the thinned-out woods 2 and 5. Thereby, the fixation treatment of the thinned-out woods 2 and 5 in the collected body is carried out so that the thinned-out woods 2 and 5 are fixed so as to permanently hold their shapes.

As the conditions for carrying out the fixation treatment, a temperature of the heating water vapor jetted into the pressure vessel 41 from the water vapor jetting apparatus is preferably 180° C., a water vapor pressure is set to 10 kgf/cm$^2$ and a time for the fixation treatment is set to about one hour.

Figure 8:
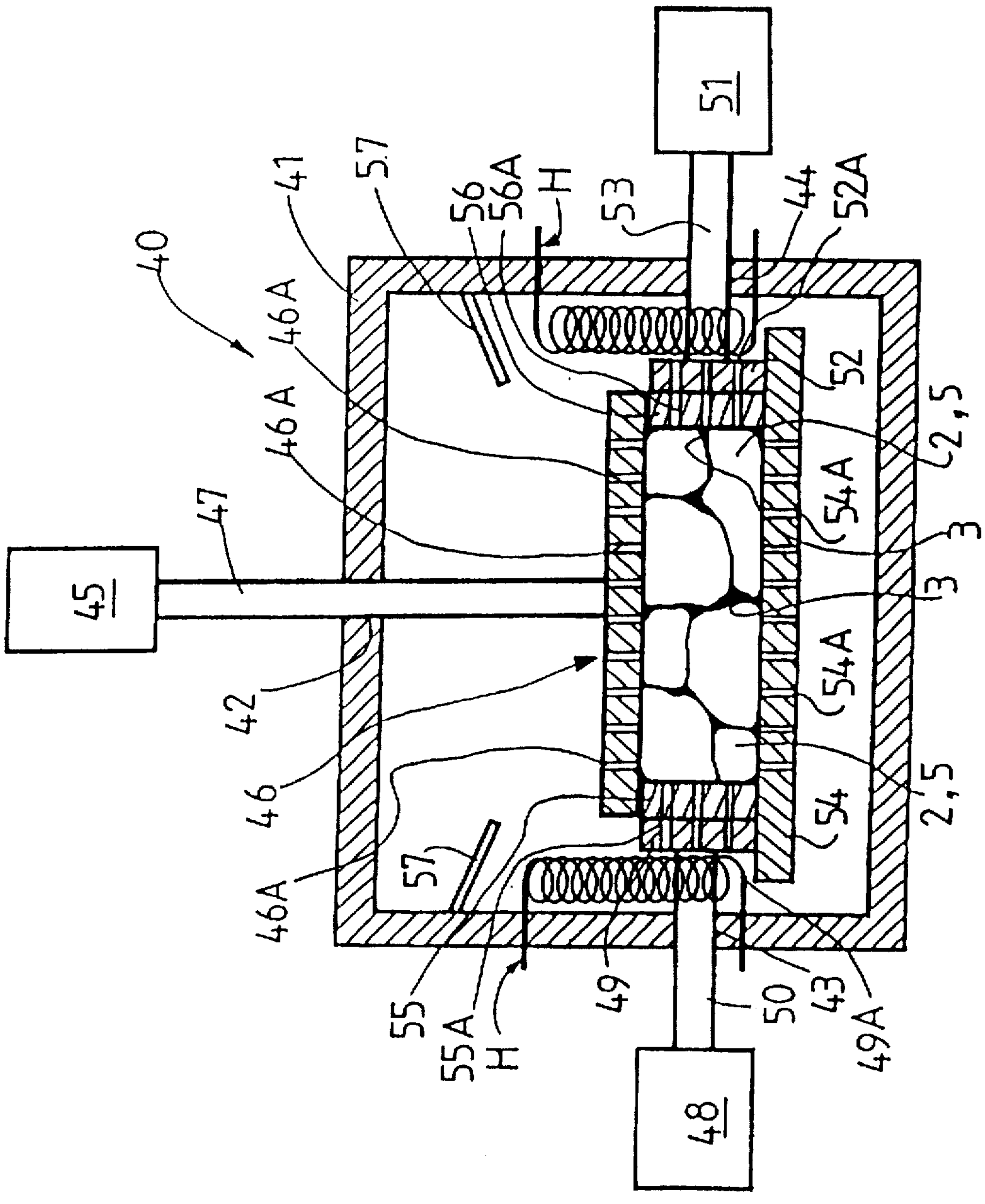

The above fixation treatment can be also carried out in such a manner that the interior of the compressively molding apparatus is heated by heaters H disposed in the vicinity of both the right and left side walls of the compressively molding apparatus 40, as shown in FIG. 8. That is, similarly to FIG. 7, the heaters H are energized, while the state collected body in the state shown in FIG. 8, to heat the interior of the compressively molding apparatus 40 to a predetermined temperature, where this is held for a predetermined time to thereby fix and treat the collected body.

In carrying out the fixation treatment, the heaters H are controlled in heating so that the internal temperature of the compressively molding apparatus 40 is kept at 180° C. The time for the fixation treatment is set to 20 hours.

Figure 2:
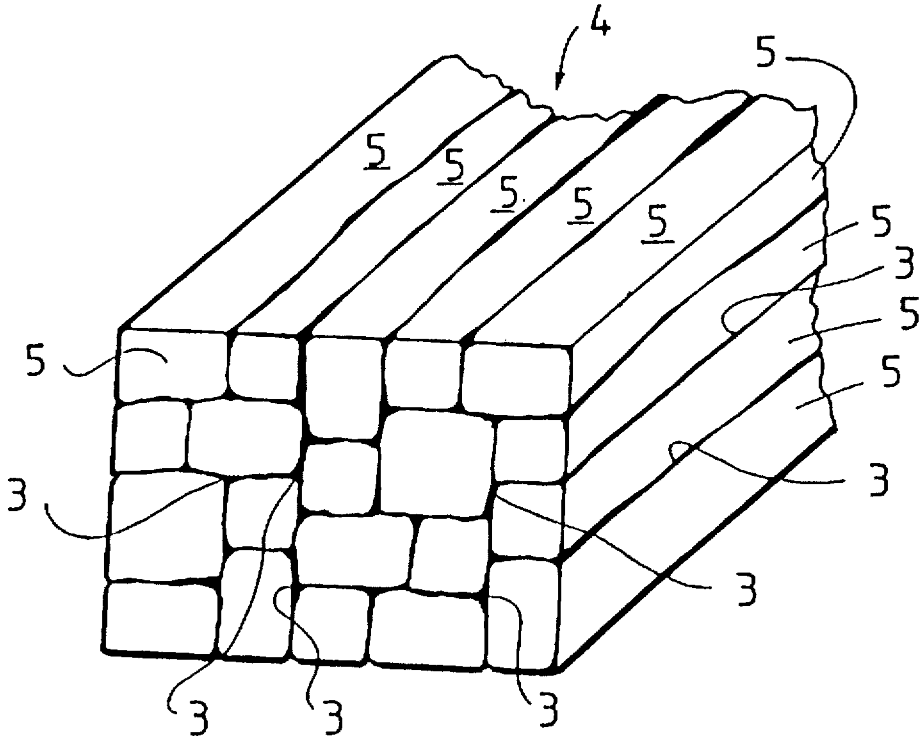

After the completion of the aforementioned fixation treatment, the collected lumbers 1 and 4 explained in reference with FIGS. 1 and 2 are obtained. In the case where the thus produced collected lumbers 1 and 4 are used as a pillar, a beam or heartwood for non-structural members, they can exhibit a design characterized in that the natural grains are collected and molded. However, decorative laminated sheets or the like may be attached to four surfaces of the collected lumbers 1 and 4 for use.

While in the production of the collected lumbers 1 and 4, a series of steps including the adhesive spreading step, and the pressing and compression step, and the fixation treatment step, if necessary, have been carried out after the softening treatment of the thinned-out woods 2 and 5 through the heating water vapor or the like to prepare the collected lumbers 1 and 4, it is to be noted that the collected lumbers 1 and 4 similar to those as described above can be also produced by first spreading the adhesive to the thinned-out woods 2 and 5, subjecting the woods to the softening treatment by the heating water vapor and thereafter carrying out the pressing and compression step, and the step of fixation treatment, if necessary. According to such a producing process, after confirmation that the adhesive has been completely spread to the thinned-out woods 2 and 5, the plasticizing process (softening process) can be carried out, and the management of the respective processing steps becomes easy.

As described above in detail, the collected lumbers 1 and 4 are obtained by carrying out a series of treatments including the softening step for subjecting the plurality of thinned-out woods 2 and 5 to the heating treatment by the water vapor heating device 10, the hot water 21 in the water tank 20 or the high-frequency heating device 30, the adhesive spreading step by the compressively molding apparatus 40, the pressing and compression step, and the fixation treatment step, if necessary. Accordingly, if the number of the thinned-out woods 2 and 5 is suitably selected, various kinds of the collected lumbers 1 and 4 can be obtained. Thereby, the collected lumbers 1 and 4 according to the present embodiment can be used over a wide range as building materials.

Further, since the collected lumbers 1 and 4 according to the first embodiment are subjected to the fixation treatment after the thinned-out woods 2 and 5 have adhered to each other through the adhesive, the shape thereof after the pressing and compression molding of the thinned-out woods 2 and 5 while adhering them to each other through the adhesive can be held permanently. Thereby, the collected lumber is excellent in dimensional stability. A curing time which has been heretofore about one week can be shortened to about one hour, whereby the productivity of the collected lumbers 1 and 4 can be remarkably improved.

Further, in the collected lumbers 1 and 4 according to the first embodiment, a series of the steps including the softening step, the adhesive spreading step by the compressively molding apparatus 40, the pressing and compression step and the fixation step can be carried out immediately after the thinned-out woods 2 and 5 have been barked, whereby it is not necessary to carry out machining such as chamfering in advance in the stage of thinned-out woods as conventional, but the collected lumbers 1 and 4 can be produced in the form of a log at a less cost.

The present invention is not limited to the above-described embodiment, but it is of course noted that various improvements and modifications can be made without departing the subject matter of the present invention. For example, while the collected lumbers 1 and 4 according to the first embodiment have been explained taking an example of the collected lumber having a rectangular parallelepiped shape, it is apparent that if a shape of the mold of press 46 and the like used for the compressively molding apparatus 40 is variously changed, collected lumbers having various shapes as desired can be obtained.

(Second Embodiment)

The process for producing a collected lumber according to the second embodiment will be described hereinafter with reference to FIGS. 3 to 5, and FIGS. 9 to 16. The second embodiment includes two producing processes: a first producing process and a second producing process. First, the first producing process will be described with reference to FIGS. 3 to 5 and FIGS. 9 to 13. The first producing process comprises a softening treatment step of softening-treating a plurality of thinned-out woods, a pressing and compression step for pressing and compressing the softened thinned-out woods to mold them into a predetermined shape, an adhesive spreading step for spreading an adhesive to surfaces of the thinned-out woods formed into a predetermined shape, and a fixation treatment step for laminating the thinned-out woods spread with the adhesive to carry out the fixation treatment by a heating device.

The softening treatment step for the thinned-out wood 2 is carried out by the water vapor heating device 10 (see FIG. 3), the hot water 21 filled in the water tank 20 (see FIG. 4) and the high-frequency heating device 30 (see FIG. 5), similarly to the first embodiment previously described. Since these softening treatments are carried out similarly to the above-described first embodiment, the detail of which is referred to the explanation of the first embodiment and the explanation thereof is omitted.

Figure 9:
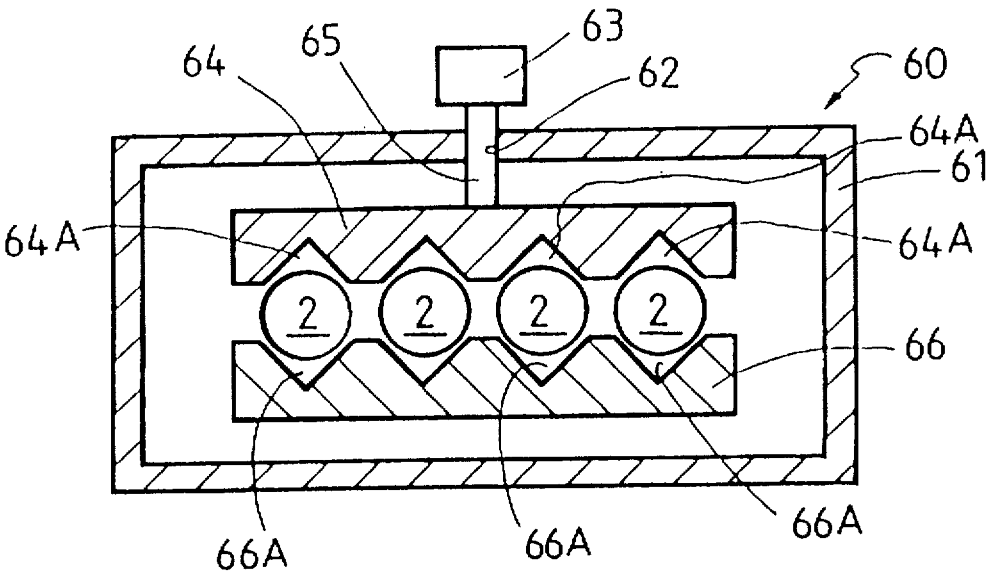
FIGS. 9 to 16 are views for illustrating the second preferred embodiment of the present invention.
Figure 10:
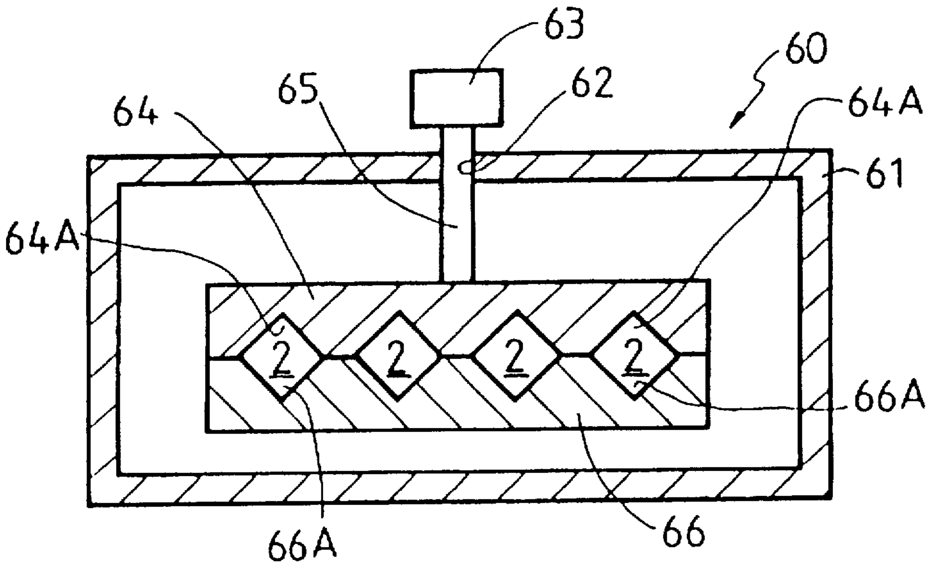
Figure 11:
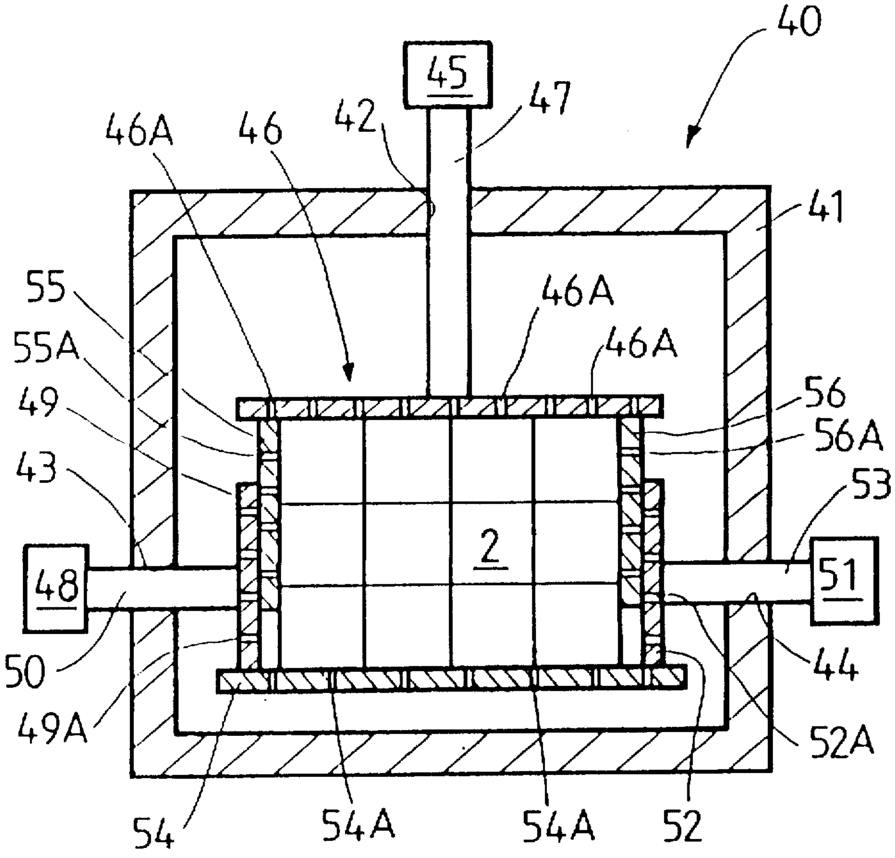

Next, the pressing and compression step for pressing and compressing the softened thinned-out woods 2 will be explained with reference to FIGS. 9 and 10. First, the construction of a pressing apparatus used for the pressing and compression step will be explained. The pressing apparatus 60 is provided with an apparatus body 61 formed to be a lengthwise tubular configuration having a rectangular section (formed to be lengthwise vertical to paper surface), the apparatus body 61 provided with a rod hole 62 bored in its upper wall. A hydraulic cylinder 63 is connected at one end to the rod hole 61 outside of the apparatus body 61, and a press rod 65 having a mold of press 64 mounted thereon is slidably inserted into the other end of the apparatus body 61. Another mold of press 66 is fixedly mounted on the mold of press 64 downwardly inside of the apparatus body 61. These molds of press 64 and 66 are provided with molding grooves 64A and 66A, which constitute, in a pair thereof, a predetermined molding shape (a square, in the present pressing apparatus 60) to mold the thinned-out wood 2 disposed between the molding groove 64A and 66A into a predetermined shape.

In the compressive molding of the thinned-out wood 2 softened via the softening treatment as described above by the pressing apparatus 60 constructed as described above, the thinned-out wood 2 is firstly disposed between the molding grooves 64A and 66A of the molds of press 64 and 66, and thereafter, the press rod 65 is pressed and moved downward through the hydraulic cylinder 63. Thereby, the mold of press 64 presses and compresses the thinned-out wood 2 from the top under a predetermined pressure. At this time, since the thinned-out wood 2 is in the softened state, it is compressively molded into a predetermined shape (square) by the cooperation of the molding groove 64A in the upper mold of press 64 with the molding groove 66A in the lower mold of press 66 (see FIG. 10). With this, the pressing and compression step is completed.

Now, the adhesive spreading step for spreading an adhesive to the surface of the thinned-out wood 2 subjected to the compressive molding as described above will be explained. After being removed from the pressing apparatus 60, the thinned-out wood 2 is transported toward the compressively molding apparatus 40 (which is not provided with an adhesive jetting nozzle 57) having the same construction as that of the apparatus used in the first embodiment through a belt conveyor, not shown. A spreader for spreading the adhesive is disposed halfway of the passage of the belt conveyor, and the adhesive spreading step is carried out by the spreader. Various kinds of spreaders can be used, construction of which is well known, and the explanation thereof is therefore omitted.

The adhesive is used to mutually bond the thinned-out woods 2, and various kinds of adhesives can be used in the present embodiment, similarly to the previously described first embodiment. Preferable adhesives include, for example, heat curing adhesives such as a phenolic resin adhesive mainly composed of a phenolic resin, a resorcinol resin adhesive mainly composed of a resorcinol resin. Further, use can be made of other heat curing adhesives such as a melamine-formaldehyde resin mainly composed of a melamine-formaldehyde resin, a urea resin adhesive mainly composed of a urea resin, and an epoxy resin adhesive mainly composed of an epoxy resin. In addition to these heat curing adhesives, a water based polymer-isocyanate adhesive mainly composed of an isocyanate and a water based polymer, and a polyvinyl acetate resin adhesive can be also used. In selecting adhesives to be used, it is preferable to select them in consideration of kinds of solvents, uses of collected lumber, and the like.

Next, the fixation treatment step for laminating the thinned-out woods 2 coated with the adhesive, as described above, to heat them by the heating water vapor to thereby effect the fixation treatment will be described hereinafter. The fixation treatment is carried out through the compressively molding apparatus 40 (see FIG. 11) having the same construction used in the previously described first embodiment. The construction of the compressively molding apparatus 40 is referred to the explanation in connection with the first embodiment, and the explanation thereof is omitted.

The process for carrying out the fixation treatment of the thinned-out wood 2 using the compressively molding apparatus 40 will be explained. First, the plurality of thinned-out woods 2 are laminated and placed within the pressure vessel 41 to hold the thinned-out woods 2 in the laminated state by cooperation of the molds of slide-press 55 and 56. Thereafter, the mold of press 46 is slightly moved downward to hold the state shown in FIG. 11. In this state, the thinned-out woods 2 are held in the state slightly pressed by the molds of press 46, 49 and 52, and the molds of slide-press 55 and 56. Thereby, the thinned-out woods 2 are in the state adhering to each other through the adhesive.

In carrying out the fixation treatment of the thinned-out woods 2, the heating water vapor is jetted against the thinned-out woods 2 from the water vapor jetting apparatus while holding the thinned-out woods 2 in the state shown in FIG. 1. The heating water vapor thus jetted out of the water vapor jetting apparatus passes through the water vapor holes 46A, 49A, 52A and 54A of the molds of press 46, 49, 52 and 54, and the water vapor holes 55A and 56A of the molds of slide-press 55 and 56 and is jetted against the thinned-out woods 2. Thereby, the fixation treatment of the thinned-out woods 2 in the collected body is carried out so that the thinned-out woods 2 are fixed so as to permanently hold their shapes.

As the conditions for carrying out the fixation treatment, an optimum temperature of the heating water vapor jetted into the pressure vessel 41 from the water vapor jetting apparatus is approximately 180° C., the water vapor pressure is set to 10 $kgf/cm^2$, and the time for the fixation treatment is set to approximately one hour.

Figure 12:
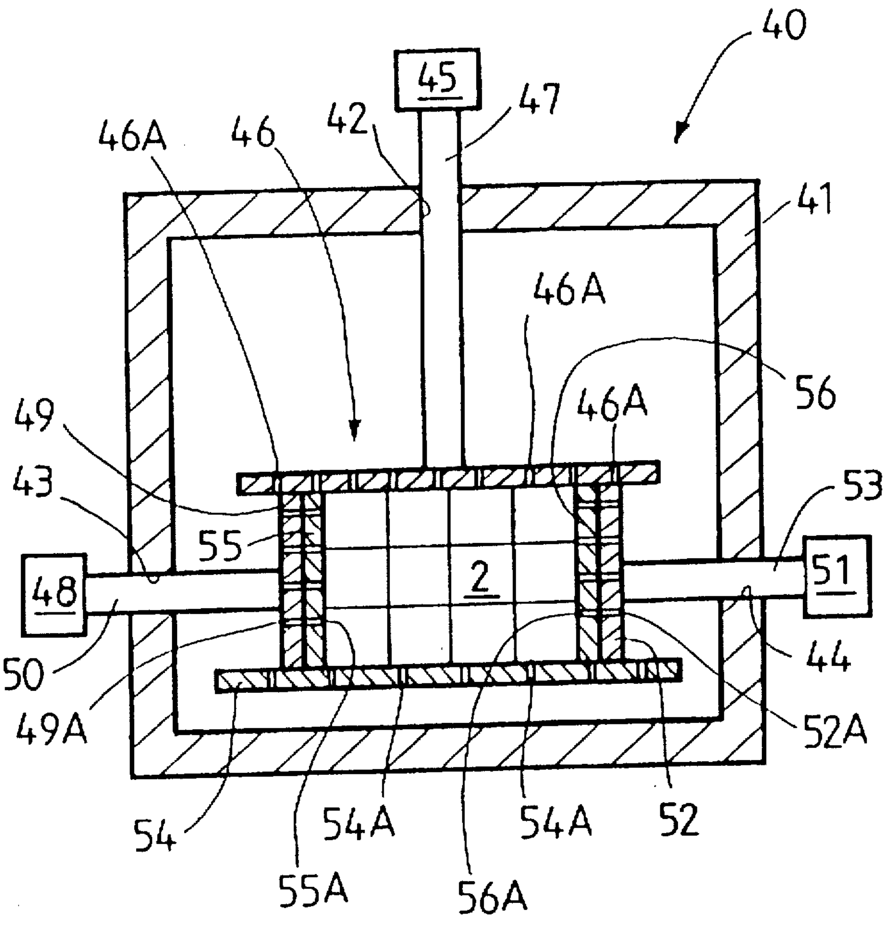

In the case where the thinned-out woods 2 are required to be further subjected to the compressive molding, the thinned-out woods 2 are further subjected to the compressive molding from the state shown in FIG. 2 through the molds of press 46, 49 and 52 and the molds of slide-press 55 and 56, after which the fixation treatment by the heating water vapor is carried out. This state is shown in FIG. 12.

This will be explained with reference to FIG. 12. First, the pressing and compression step is carried out in accordance with the percentage of compression set of the thinned-out woods 2. In the pressing and compression step, the press rod 47 is pressed and moved through the upper hydraulic cylinder 45 whereby the mold of press 46 presses and compresses the thinned-out woods 2 from the top under a predetermined pressure. Since at this time the thinned-out woods 2 are in the softened state, they are compressed through the mold of press 46 by cooperation of the molds of press 49, 52 and 54 with the molds of slide-press 55 and 56. The molds of slide-press 55 and 56 are moved downward in synchronism with the pressing state of the mold of press 46, and finally are placed in contact with the inner surfaces of the molds of press 49 and 52. The mold of press 46 completes its vertical compression when moved by a predetermined amount according to the percentage of compression set and stops.

Next, the pressing and compression of the thinned-out woods 2 in the lateral direction is carried out through the hydraulic cylinder 48 and 51, the press rods 50 and 53, the molds of press 49 and 52, and the molds of slide-press 55 and 56. By the above pressing and compression, the thinned-out woods 2 receive the pressure in the lateral direction in FIG. 12 and are subjected to the compressive molding. When the molds of press 49 and 52 are moved by a predetermined amount in accordance with the percentage of compression set, the pressing and compression step completes.

The time for the pressing and compression step depends on the kind of adhesives since the adhesion time varies with the kind of adhesives to be used. However, the pressing and compression step is carried out for about 30 minutes, whereby the thinned-out woods 2 adhere to each other through the adhesive. Thereby, the thinned-out woods 2 are compressed and collected as shown in FIG. 2. Thereafter, the fixation treatment is carried out through the heating water vapor in the same process as that described above.

Figure 13:
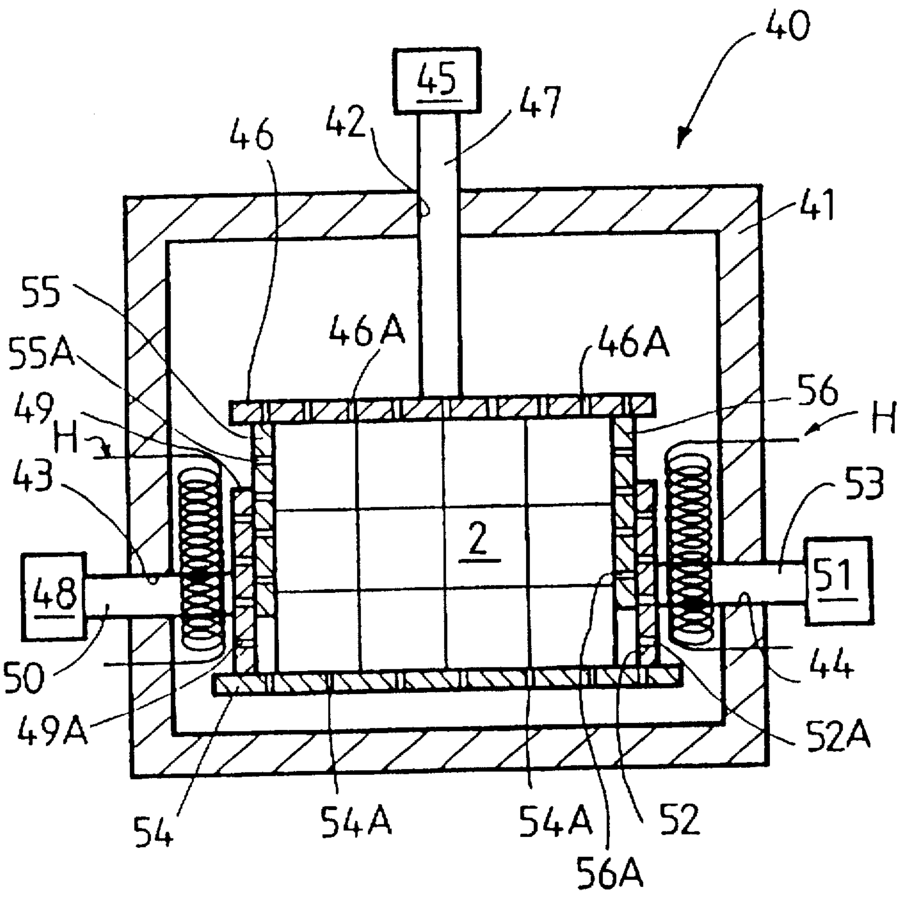

The fixation treatment as described above can be also carried out by heating the interior of the compressively molding apparatus 40 by the heaters H disposed in the vicinity of both the right and left side walls of the compressively molding apparatus 40, similar to the compressively molding apparatus 40 used in the first embodiment, as shown in FIG. 8 (see FIG. 13). That is, similarly to the case shown in FIG. 11, the heaters H are energized, while holding the collected lumber 2 in the state shown in FIG. 13, to hold the interior of the compressively molding apparatus 40 in the state heated to a predetermined temperature so that the fixation treatment of the collected lumber is carried out.

At this time, when the fixation treatment is carried out, the heaters H are controlled in heating so that the internal temperature of the compressively molding apparatus 40 is maintained at 180° C. similar to the heating water vapor, and the fixation treatment time is set to 20 hours.

After the steps including the softening treatment step for softening and treating the plurality of thinned-out woods 2, the pressing and compression step for molding the softened thinned-out woods 2 into a predetermined shape, the adhesive spreading step for spreading an adhesive to the thinned-out woods 2 molded into a predetermined shape, and the fixation treatment step for laminating the thinned-out woods 2 coated with the adhesive to carry out the fixation treatment by the heating device, a collected lumber having the thinned-out woods 2 collected is obtained.

The second producing process for the collected lumber according to the second embodiment will be explained with reference to FIGS. 14 to 16. The second producing process comprises the softening treatment step for softening and treating the plurality of thinned-out woods 2, the pressing and compression step for pressing and compressing the softened thinned-out woods 2 to mold them into a predetermined shape, the fixation treatment step for subjecting the pressed and compressed thinned-out woods 2 to the fixation treatment through heating water vapor or a heater, the adhesive spreading step for spreading the adhesive to the surfaces of the thinned-out woods 2 subjected to the fixation treatment, and the molding step for laminating the thinned-out woods coated with the adhesive to each other to mold them while curing the adhesive. The second producing process is basically similar to the aforementioned first producing process except that the fixation treatment is carried out in connection with the thinned-out woods 2 prior to the lamination and collection of the thinned-out woods 2, and the molding apparatus used in the molding step comprises a clamping device having a simple construction since the thinned-out woods 2 subjected to the fixation treatment in advance are laminated and molded.

The softening treatment step carried out in the second producing process can be also carried out by either method of the water vapor heating device 10, the hot water 21 filled in the water tank 20 or the high-frequency heating device 30, similar to the aforementioned first producing process. Accordingly, the softening treatment step is referred to the explanation in connection with the first producing process, and the explanation thereof is omitted.

Figure 14:
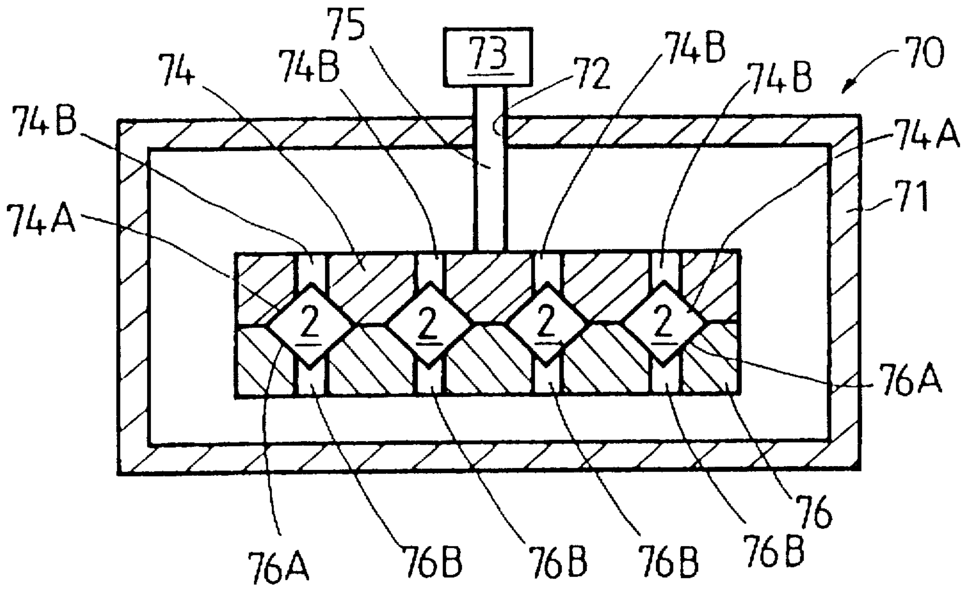
Figure 15:
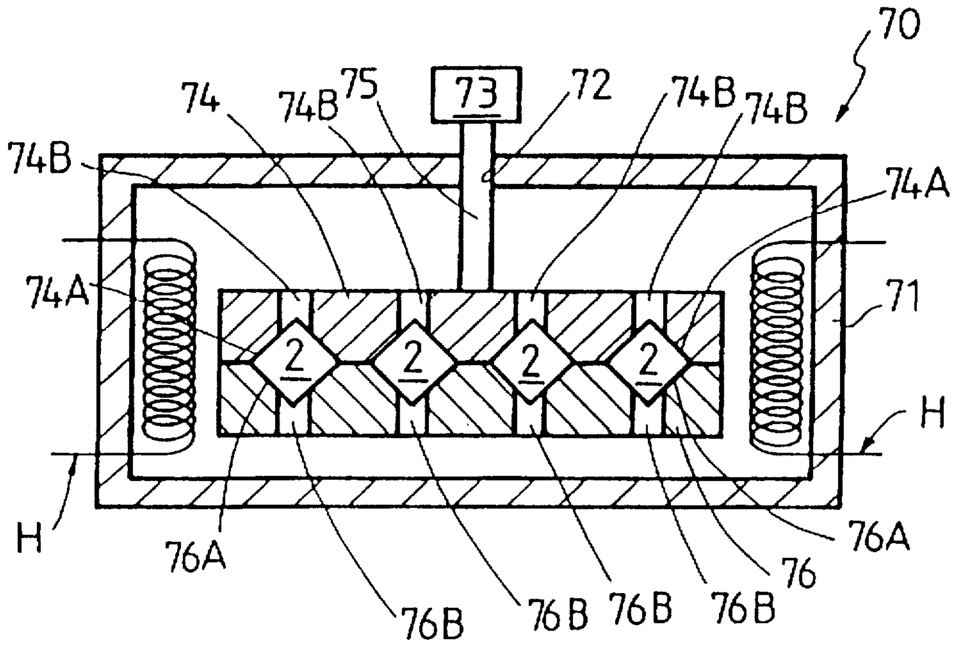
Figure 16:
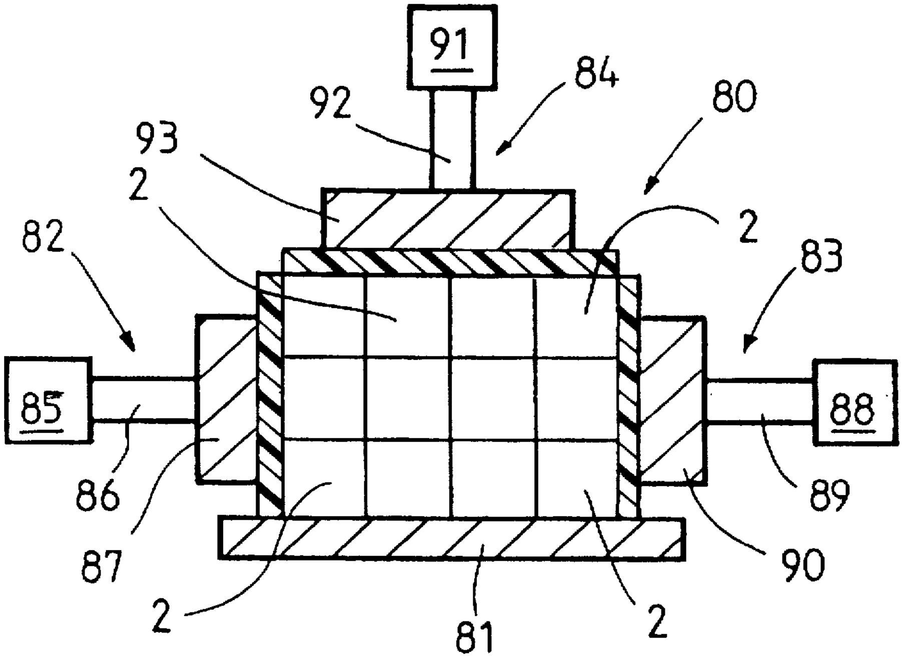

Next, the pressing and compression step and the fixation treatment step of the thinned-out woods 2 are carried out by a pressing apparatus 70 shown in FIGS. 14 and 15. The pressing apparatus 70 basically has a construction similar to that of the pressing apparatus 60 used in the first producing process except that since the pressing and compression step as well as the fixation treatment are carried out, a water vapor jetting device and a heater for the fixation treatment are installed.

In FIG. 14, the pressing apparatus 70 is provided with an apparatus body 71 formed to be a lengthwise tubular configuration having a rectangular section (formed to be long in a direction vertical to paper surface), and a rod hole 72 is bored in the upper wall of the apparatus body 71. A hydraulic cylinder 73 is connected at one end to the rod hole 72 outside of the apparatus body 71, a press rod 75 having a mold of press 74 mounted thereon is slidably inserted into the other end inside the apparatus body 71. The mold of press 74 is provided with a molding groove 74A for molding the softened thinned-out woods 2 into a predetermined shape, and a water vapor hole 74B through which heating water vapor jetted out of the water vapor jetting apparatus provided on the apparatus body 71. The water vapor jetting apparatus jets the heating water vapor from four walls of the apparatus body 71. The water vapor pressure jetted out of the water vapor jetting apparatus is set to 5–16 kgf/cm$^2$ or more, and the heating temperature is preferably set in the range of from 130° C. to 200° C., particularly preferably, 150° C. to 180° C.

At the lower part internally of the apparatus body 71, another mold of press 76 is fixedly mounted opposedly to the mold of press 74. The mold of press 76 is provided with a molding groove 76A for molding the thinned-out woods 2 in cooperation with the molding groove 74A of the upper mold of press 74 and a water vapor hole 76B similar to the water vapor hole 74B of the mold of press 74. The molding grooves 74A and 76B constitute, in a paired relation, a predetermined molding shape (square in the pressing apparatus 70), to mold the thinned-out woods 2 arranged between the molding grooves 74A and 76A into a predetermined shape.

The following procedure is taken to compressively mold the thinned-out woods 2 softened via the softening treatment step by the pressing apparatus 70 constructed as described above. First, the thinned-out woods 2 are arranged between the molding grooves 74A and 76A of the molds of press 74 and 76, after which the press rod 75 is pressed and moved downward through the hydraulic cylinder 73. Thereby, the mold of press 74 presses and compresses the thinned-out woods 2 from the top under a predetermined pressure. At this time, since the thinned-out woods 2 are in the softened state, it is compressively molded into a predetermined shape (square) by cooperation of the molding groove 74A in the upper mold of press 74 with the molding groove 76A in the lower mold of press 76 (see FIG. 14). Thereby, the pressing and compression step completes.

Subsequently, the heating water vapor from the water vapor jetting apparatus is jetted out of four walls of the apparatus body 71. The thus jetted heating water vapor passes through the water vapor holes 74B and 76B of the molds of press 74 and 76 and is jetted against the thinned-out woods 2 arranged between the molding grooves 74A and 76A. Thereby, the thinned-out woods 2 are subjected to the fixation treatment so as to permanently hold a predetermined shape after compressive molding.

The above fixation treatment can be also carried out by using a pressing apparatus 70 shown in FIG. 15. The pressing apparatus 70 shown in FIG. 15 is constructed similarly to the pressing apparatus 70 shown in FIG. 14 and has a feature in that heaters H are disposed in the vicinity of both the right and left side walls of an apparatus body 71. That is, similarly to FIG. 14, the fixation treatment for the thinned-out woods 2 is carried out in such a manner that the heaters are energized, while holding the state of FIG. 15, to heat the interior of the apparatus body 71 to a predetermined temperature, where the state is maintained for a predetermined time. In the fixation treatment as described, the heaters H are controlled in heating so as to maintain the internal temperature of the apparatus body 71 at approximately 180° C., and the time for the fixation treatment is set to 20 hours.

After the pressing and compression step and the fixation treatment step, the adhesive spreading step for spreading the adhesive to the surfaces of the thinned-out woods 2. This adhesion spreading step is the same as that in the first producing process, and it is referred to the explanation of the first producing process, explanation of which is omitted.

Next, the molding step for laminating the thinned-out woods 2 coated with the adhesive in the adhesive spreading step to each other to mold them while curing the adhesive is carried out. The molding step as described is carried out by a clamping device shown in FIG. 16. In FIG. 16, the clamping device 80 is composed of a base 81 on which the thinned-out woods 2 are placed in a state laminated with each other, and three clamps 82, 83 and 84 arranged on both the right and left sides and on the upper side of the base. The clamp 82 has a press member 87 mounted on one end of a press rod 86 which is pressed and moved by a hydraulic cylinder 85. The clamp 83 has a press member 90 mounted on one end of a press rod 89 which is pressed and moved by a hydraulic cylinder 88. The clamp 84 is composed of a hydraulic cylinder 91, a press rod 92 and a press member 93.

In carrying out the clamping of the thinned-out woods 2 by the clamping device 80 constructed as described above, the thinned-out woods 2 are clamped under a clamping pressure of approximately 10 kgf/cm$^2$ by the clamps 82, 83 and 84 at a normal temperature (approximately, 25° C.). The clamping time for holding the thinned-out woods 2 in the clamped state is set to 15 hours. Alternatively, the molding step for carrying out the clamping may be carried out in a high temperature state such as under the heating water vapor.

In clamping the thinned-out woods 2 coated with the adhesive by the clamping device 80, the thinned-out woods 2 are firstly placed on the base 81 in a laminated state, and after this, the hydraulic cylinders 85, 88 and 91 in the clamps 82, 83 and 84, respectively, are driven to press and move the press rods 86, 89 and 92. Thereby, the thinned-out woods 2 are clamped in the lateral direction and downward by clamping members 87, 90 and 93 so that the clamped state is maintained for a predetermined time of clamping. The adhesive spread on the thinned-out woods 2 are cured while carrying out the clamping, whereby a collected lumber having the thinned-out woods 2 collected is produced.

As described above in detail, in any of the first and second producing processes according to the second embodiment, the plurality of thinned-out woods 2 are subjected to the softening treatment in the softening treatment step, and after this, the thinned-out woods 2 are subjected to the pressing and compression in the pressing and compression step to thereby obtain a predetermined shape. Therefore, even in the case where the thinned-out woods 2 are molded into a curved shape, it is possible to produce a collected lumber having a good molding appearance resulting from a combination of deformations of annual rings by collecting together the thinned-out woods 2 into a predetermined shape without being affected by the shape of the thinned-out woods 2 and without formation of a clearance between the thinned-out woods 2.

Further, according to the first producing process, the plurality of thinned-out woods 2 adhere to each other through the adhesive and then fixed, whereas according to the second producing process, the plurality of thinned-out woods 2 are fixed and then adhere to each other through the adhesive. It is therefore possible to suitably select the number of thinned-out woods 2 to be used, to thereby enable the production of the collected lumber which can be used over a wide range of the building materials.

Furthermore, in any of the first producing process and the second producing process, the thinned-out woods 2 are subjected to the fixation treatment through the heating water vapor or the heater. It is therefore possible to early render the thinned-out woods usable for the building materials which is excellent in dimension stability, whereby a residual stress of the collected lumber can be removed to shorten the aging period, thus improving the productivity. Moreover, since the thinned-out woods 2 to be used for the collected lumber does not particularly require the machining such as chamfering, it is possible to make the collected lumber and the production cost thereof remarkably low.

The present invention is not limited to the above-described embodiment, but it is of course noted that various improvements and modifications can be made without departing the subject matter of the present invention. For example, while the collected lumbers according to the second embodiment have been explained taking an example of the collected lumber having a rectangular parallelepiped shape, it is apparent that if a shape of the mold of press 46 and the like to be used for the compressively molding apparatus 40 is variously changed, collected lumbers having various desired shapes can be obtained.

(Third Embodiment)

Figure 17:
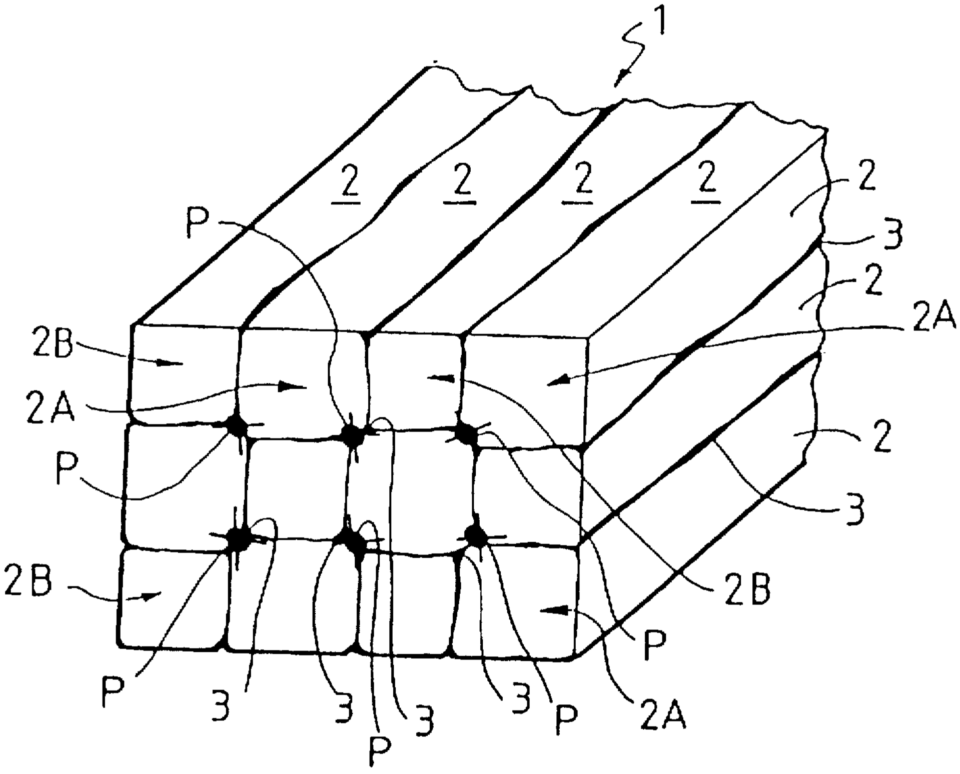
FIGS. 17 to 28 are views for illustrating the third preferred embodiment of the present invention.

Next, a collected lumber and the method of producing the collected lumber of the third embodiment will be explained with reference to FIGS. 1 to 7 and 28. First, the constitution of the collected lumber will be explained by referring to FIGS. 17 and 18. In FIG. 17, the collected lumber 1 is produced by compressing and collecting the thinned-out woods 2 with a reinforcing member P (described later) and an adhesive placed between a plurality of thinned-out woods 2 (12 pieces in the collected lumber 1 in FIG. 17), and further by performing a fixation treatment through a heating device. Here, each thinned-out wood 2 used is a thinned-out woods of Japanese red wood, Japanese cypress, etc., removed in the process of growing. Also the thinned-out wood 2 used is a thinned-out wood having a relatively uniform diameter measuring about 15 cm at the bottom end 2A and about 10 cm at the tip end 2B.

Furthermore, in the collected lumber 1, the bottom end 2A and tip end 2B of the thinned-out woods 1 2 are alternately arranged both in the vertical and horizontal rows. To take the horizontal row of the thinned-out wood 2 placed in the topmost position in the collected lumber 1 for example, when the thinned-out woods 2 are arranged (the thinned-out wood 2 in the extreme right position in the horizontal row) in such a manner that the bottom end 2A will come on the end face side, the thinned-out woods 2 in the row are so arranged that the tip end 2B will come on the end face side of the collected lumber 1. Then, the thinned-out wood 2 arranged next has its bottom end 2A on the end face side of the collected lumber 1, and furthermore the next thinned-out wood 2 is arranged with its tip end 2B on the end face side of the collected lumber 1. The correlation between these thinned-out woods 2 is maintained in both the vertical and horizontal rows of the collected lumber 1. When the thinned-out woods 2 are arranged as described above, there will hardly occur a gap between the thinned-out woods 2 and the amount of the adhesive 3 to be used can be decreased.

Furthermore, the adhesive 3 is used to bond the thinned-out woods 2 with each other; in the present embodiment various types of adhesives are usable as in the case of the first and second embodiments described above. For example, heat curing adhesives such as a phenolic adhesive composed of a phenolic resin as a main component and a resorcinol resin adhesive composed of a resorcinol resin as a main component are best suited for use. Other usable heat curing adhesives are a melamine-formaldehyde resin adhesive composed of a melamine-formaldehyde resin as a main component, a urea resin adhesive composed of a urea resin as a main component, and an epoxy resin adhesive composed of an epoxy resin as a main component. In addition to these heat curing adhesives, it is possible to use a water based polymer-isocyanate adhesive composed of isocyanate and water based high polymer molecule as main components, and a polyvinyl acetate resin adhesive. Here, in choosing an adhesive to be used, it is desirable to take into consideration the cost of the adhesive, type of solvent, and usage of the collected lumber.

The reinforcing member P is arranged in each position where corners of the thinned-out woods 2 meet each other. And a plurality of such reinforcing members P are interposed along the lengthwise direction of the collected lumber 1. Here the reinforcing member P will be explained by referring to FIG. 19. The reinforcing member P is composed of a metallic material such as aluminum, a plastic material such as nylon, and an inorganic material such as alumina and carbon fibers which are easy to mold, and is constituted of a shaft P1 having a specific length and a plurality of hooks P2 outwardly protruding at a specific spacing from around the shaft P1.

Figure 20:
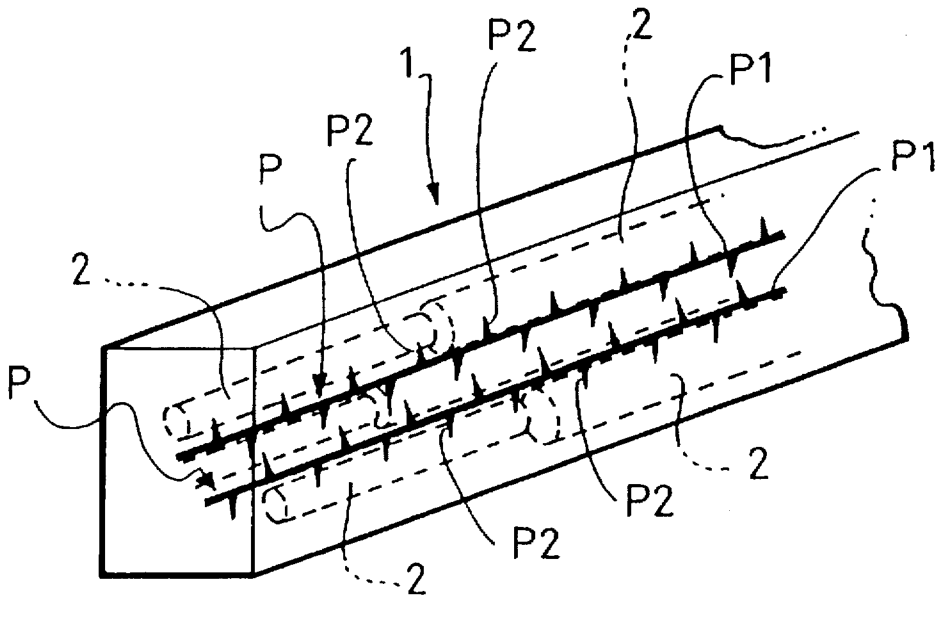

In each reinforcing member P, as shown in FIG. 7, the shaft P1 is arranged along the lengthwise direction of each thinned-out wood 2, and the hook P2 is press fitted into the thinned-out woods 2 in the compression process (described later), thus securely connecting and fixing the thinned-out woods 2 to each other not only in the radial direction but also in the lengthwise direction. The state of the thinned-out woods 2 thus connected and fixed to each other by the reinforcing member P is shown in FIG. 20. FIG. 20 is a schematic view showing the thinned-out woods 2 of the collected lumber 1 which are connected and secured to each other by the reinforcing member P. It is understood that, as shown in FIG. 20, the reinforcing member P, in the collected lumber, connects and fixes the thinned-out woods 2 to each other both in the radial direction and in the lengthwise direction.

Next, the collected lumber 4 shown in FIG. 18 will be explained. The collected lumber 4 is basically the same in constitution as the collected lumber 1 shown in FIG. 17 with the exception of varied diameters of thinned-out wood 5 in use. The collected lumber 4 is produced by using the reinforcing member P and the adhesive 3 among a plurality of thinned-out woods 5 (20 pieces in the collected lumber 4 in FIG. 18), compressing and collecting the thinned-out woods 5, and further performing the fixation treatment with heating water vapor or a heater.

Here, each thinned-out wood 5 used is a thinned-out wood measuring about 6 cm to 20 cm in mean diameter. When the thinned-out woods 5 are arranged to form a collected lumber, the thinned-out woods 5 are selected with their bottom end diameter and their tip end diameter taken into consideration to see whether or not their mean diameter comes within the above-mentioned specific range. Therefore, the thinned-out woods 5 differ from the thinned-out woods 2 of the collected lumber 1 shown in FIG. 17, and are not particularly required to be assembled with their bottom ends and tip ends alternately arranged. However, it is desirable that, with the general shape of the collected lumber 4 taken into consideration, the thinned-out woods 5 be properly arranged. In this case, the thinned-out woods of various diameters generally decrease by half in value in use, thus becoming unserviceable. In the aforesaid collected lumber 4, however, the thinned-out woods have a sufficient value in use.

The adhesive 3 is the same as one used in the collected lumber 1 shown in FIG. 17 and therefore will not be described. The reinforcing member P also is the same as the reinforcing member P used in the collected lumber 1 and will not be described.

Subsequently, a process for producing collected lumbers 1 and 4 of the above-described constitution will be explained. The collected lumbers 1 and 4 are produced through a softening process for softening the thinned-out woods 2 and 5 by heating a plurality of thinned-out woods 2 and 5, a reinforcing member arranging process for arranging the reinforcing member P between the softened thinned-out woods 2 and 5 along the lengthwise direction of the thinned-out woods 2 and 5, an adhesive spreading process for spreading the adhesive to the surface of the thinned-out woods 2 and 5, a compression process for pressing to compress the thinned-out woods 2 and 5 coated with the adhesive on the surface of the reinforcing member P arranged between the thinned-out woods 2 and 5, to form a collected lumber of a predetermined shape, and a fixation treatment process for carrying out a fixation treatment to the collected lumber through heating water vapor or a heater.

The heating treatment in the softening process is carried out by the use of a water vapor heating device 10 (see FIG. 3), hot water 21 (see FIG. 4) filled in a water tank 20, or a high-frequency heating device 30 (see FIG. 5) as in the first and second embodiments described above. Since this softening process is carried out in the same manner as the first and second embodiments, the first embodiment is to be referred to for further detailed explanation and will not be described herein.

Subsequently explained are a reinforcing member arranging process for arranging the reinforcing member P between the thinned-out woods 5 that have been softened by heating treatment by the aforementioned heating treatment process, an adhesive spreading process for spreading an adhesive to the surface of the thinned-out woods 2 and 5, a compression process for forming a collected lumber in a predetermined form by compressing the thinned-out woods reinforced with the reinforcing member P and coated with the adhesive on the surface, and a fixation treatment process for fixing the thinned-out woods 2 and 5 and the reinforcing member P into the collected lumber by heating water vapor or a heater.

After the process for arranging the reinforcing member, the adhesive spreading process, the compression process and the fixation treatment process are carried out by the use of a compressively molding apparatus 40 (see FIG. 21, etc.) having the same constitution as one used in the first and second embodiments. The first embodiment is to be referred to for the constitution of the compressively molding apparatus 40, which, therefore, will not be explained.

Next explained is a process for producing the collected lumber 1, 4 by carrying out the reinforcing member arranging process, the adhesive spreading process for spreading a plurality of thinned-out woods 2 and 5 that have been softened by the heating treatment, the compression process, and the fixation treatment process by using the compressively molding apparatus 40. Here, prior to the use of each of the above-described processes, molds of press 46, 49, 52 and 54 are to be held in a state shown in FIG. 21.

Figure 21:
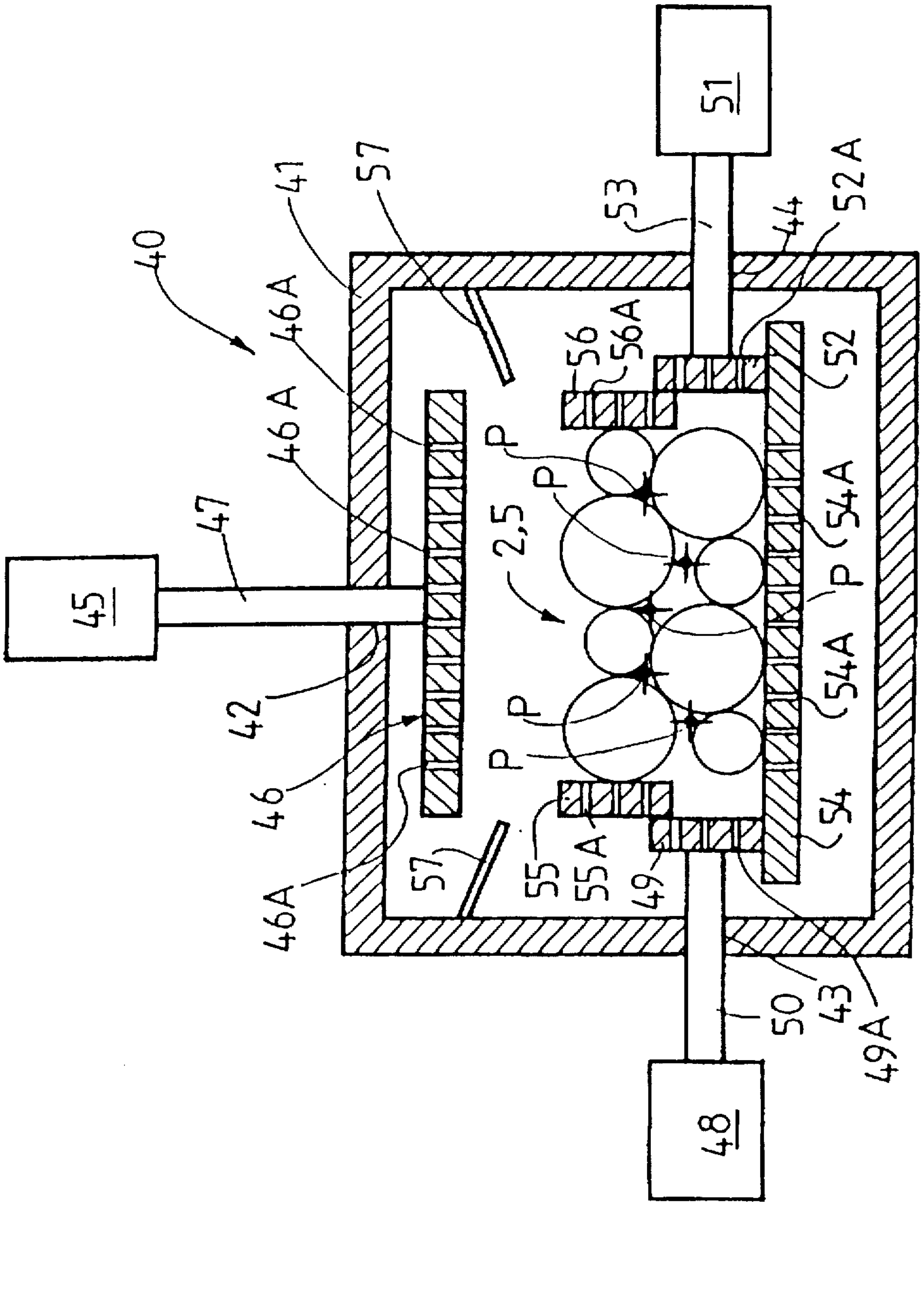

First, with a predetermined number of reinforcing members P arranged between a plurality of thinned-out woods 2 and 5 softened through the aforesaid processes, the thinned-out woods 2 and 5 are laminated and placed in a pressure vessel 41, and are held in this laminated state by cooperation with the molds of slide-press 55 and 56 (see FIG. 21). At this time, the thinned-out woods 2 having approximately the same diameter are laminated with their bottom and tip ends alternately arranged as described above. The thinned-out woods 5 having different diameters are laminated with the shape of a collected lumber taken into consideration as described above.

Thereafter the adhesive is injected out from the nozzle 57 to the surface of the thinned-out woods 2 and 5. The adhesive thus injected passes through water vapor holes 46A, 49A, 52A and 54A of the molds of press 46, 49, 52 and 54, and through the water vapor holes 55a and 56A of the molds of slide-press 55 and 56, being emitted out to the thinned-out woods 2 and 5. Then, after the predetermined quantity of adhesive is injected, the thinned-out woods 2 and 5 are left standstill for about five minutes until the adhesive is evenly spread to the entire surface of the thinned-out woods 2 and 5, thus completing the adhesive spreading process.

After the injection of the adhesive to the thinned-out woods 2 and 5 as described above, the compression process is accomplished to the percentage of compression set of the thinned-out woods 2 and 5. In this compression process, a press rod 47 is first pressed to move through a hydraulic cylinder 45 disposed above, thereby feeding the mold 46 of press downwardly to compress the thinned-out woods 2 and 5 with a specific pressure. At this time, the thinned-out woods 2 and 5, being in a softened state, are compressed through the mold of press 46 in cooperation with the molds of press 49, 52 and 54 and the molds of slide-press 55 and 56 of press. Also, the molds of slide-press 55 and 56 are moved downwardly simultaneously with the pressing of the mold 46 of press, finally coming into contact with the inside surface of the molds 49 and 52 of press. Subsequently, the mold 46 completes the vertical compression when it has moved for the specific stroke in accordance with the percentage of compression set, thus stopping operation.

Next, the thinned-out woods 2 and 5 are compressed in a horizontal direction through the hydraulic cylinders 48 and 51, the press rods 50 and 53, the molds 49 and 52, and the molds of slide-press 55 and 56. The thinned-out woods 2 and 5 receive a horizontal pressure in FIG. 21 when compressed, being compressively molded. The compression process is completed when the molds 49 and 52 have moved through the specific stroke according to the percentage of compression set.

Figure 22:
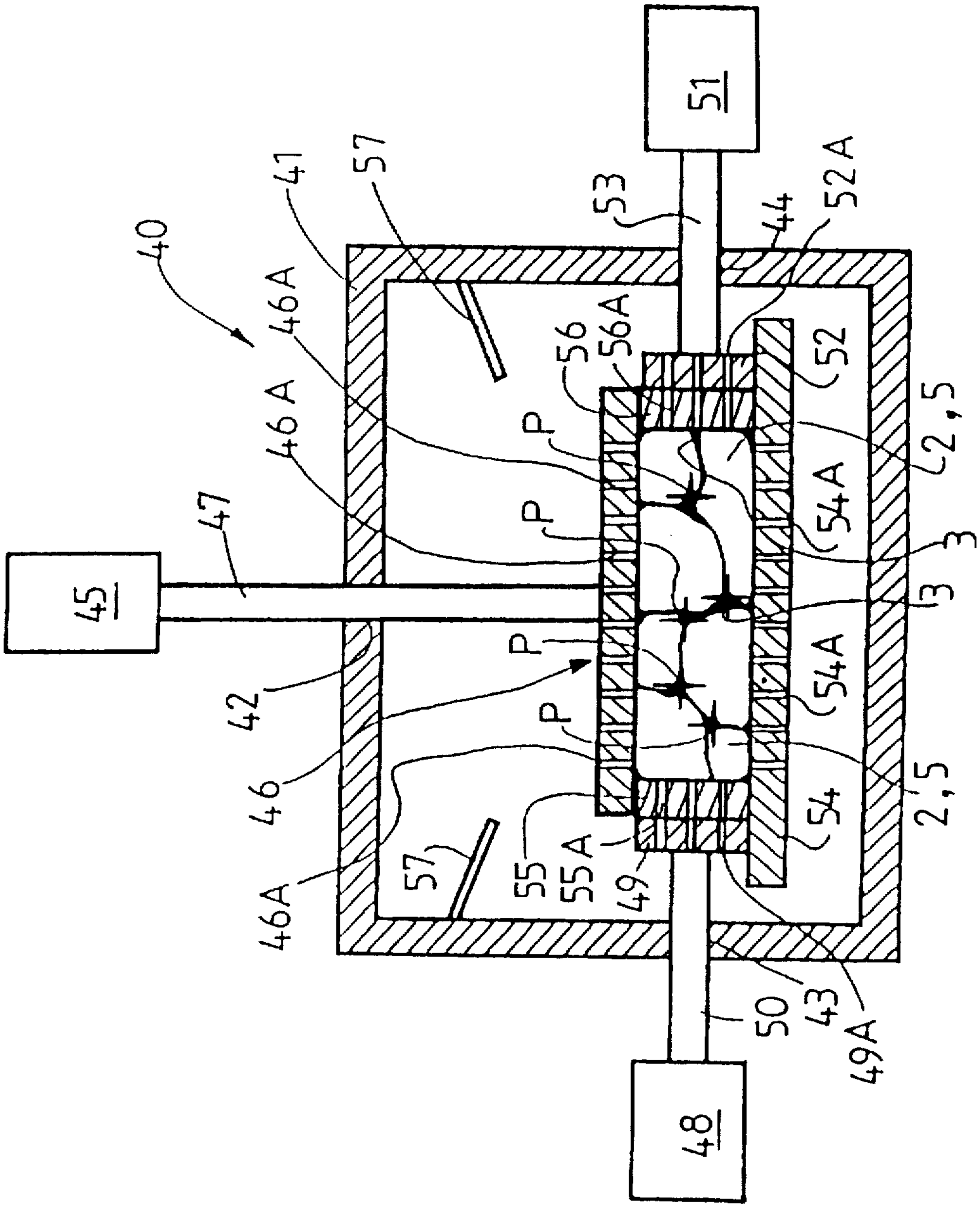

With the above-described compression, the hook P2 protruding on the shaft P1 of the reinforcing member P is pressed in from the surface of the thinned-out woods 2 and 5, which are thus fixedly connected to one another in their radial direction and lengthwise direction through the hook P2 in the reinforcing member P. Such a state of completion is shown in FIG. 22.

The time required for this compression process depends on the type of an adhesive to be used because the time required for bonding varies with the type of the adhesive; generally the compression requires about 30 minutes to bond the thinned-out woods 2 and 5 through the adhesive. Thus, the thinned-out woods 2 and 5 are compressed to be collected into a form of a collected body as shown in FIGS. 17 and 18. At this time, the adhesive 3 remains in the collected body in a solidified state (see FIGS. 1 and 2).

Next, the collected body thus produced by bonding the thinned-out woods 2 and 5 by the adhesive 3 is then subjected to a fixation treatment. The fixation treatment will be explained with reference to FIG. 22. The fixation treatment by jetting out heating water vapor to the thinned-out woods 2 and 5 from the water vapor jetting device with the collected body held in a state shown in FIG. 22. The heating water vapor jetted out from the water vapor jetting device is jetted out to the thinned-out woods 2 and 5 after passing through the water vapor holes 46A, 49A, 52A and 54A of the molds 46, 49, 52 and 54 and through the water vapor holes 55A and 56A of the molds of slide-press 55 and 56, thereby performing the fixation treatment of the thinned-out woods 2 and 5 in the collected lumber. The thinned-out woods 2 and 5 are thus fixed to permanently keep the fixed shape. The thinned-out woods 2 and 5, being mutually connected and fixed by the reinforcing member P, can hold the mutually fixed state permanently.

At this time, a preferable temperature of the heating water vapor to be jetted out into the pressure vessel 41 from the water vapor jetting device is 180° C.; the water vapor pressure is set at 10 kgf/cm$^2$ and the fixation treatment time is set at about one hour.

The fixation treatment described above can be done, as shown in FIG. 28, also by heating the interior of the compressively molding apparatus 40 by the heater H disposed in the vicinity of the right and left side walls of the compressively molding apparatus 40. That is, the fixation treatment of the collected lumber is accomplished by heating by the heater H and holding the interior of the compressively molding apparatus 40 at a predetermined temperature for a specific period of time while maintaining the collected body in the state shown in FIG. 28 as in FIG. 22.

At this time, in performing the fixation treatment, each heater H is controlled to hold the interior temperature of the compression molding apparatus 40 at 180° C., and the fixation treatment time is set at 20 hours.

Figure 18:
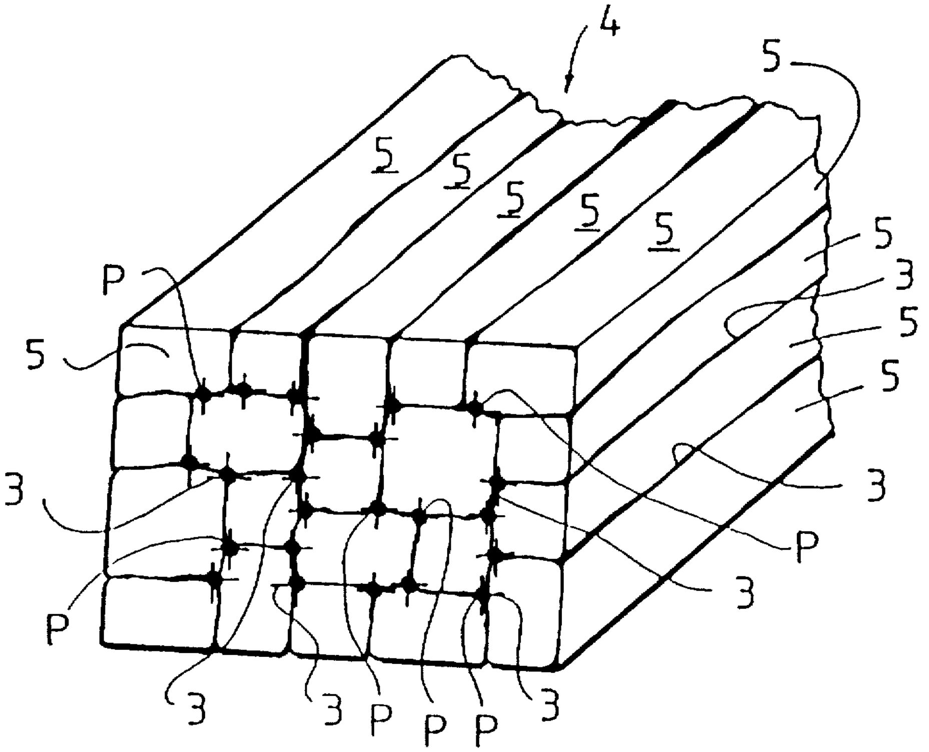

After the compression of the fixation treatment, the collected lumbers 1 and 4 explained in FIGS. 17 and 18 are obtained. The collected lumbers 1 and 4 thus produced can be provided with a characteristic design of collected and molded natural grains when used as a heartwood of pillars, beams or non-structural members in an actual house; it is also possible to use the collected lumbers 1 and 4 with decorative laminated sheets attached on four sides.

The collected lumbers 1 and 4 according to the present embodiment as explained in detail are obtainable by arranging the reinforcing member P between the thinned-out woods 2 and 5 after a plurality of thinned-out woods 2 and 5 are heat-treated for softening by the water vapor heating device 10, hot water 21 in the water tank 20, or the high-frequency heating device 30, and then by carrying out a series of treatments by the adhesive spreading process, compression process and fixation treatment process by the use of the compressively molding apparatus 40. Therefore, it is possible to firmly fix the thinned-out woods 2 and 5 to each other in either of the radial direction and the lengthwise direction. The collected lumber thus obtained, therefore, is a low-cost lumber having a great strength and usable in a wide range of applications as building materials without going through a process for obtaining laminas and veneers as in the case of conventional collected lumbers and a vertical joint process for vertically jointing the laminas and veneers.

In producing the collected lumbers 1 and 4 according to the present embodiment, the thinned-out woods 2 and 5 are mutually connected and fixed through the reinforcing member P and an adhesive and then are subjected to the fixation treatment; therefore it is possible to permanently maintain the compressively molded shape of the thinned-out woods 2 and 5 which are thus mutually connected and fixed through the reinforcing member P and the adhesive. It therefore has become possible to reduce, to about one hour, an aging period which, in conventional processes, needs about one week, thereby remarkably enhancing productivity of the collected lumbers 1 and 4.

Furthermore, for producing the collected lumbers 1 and 4 according to the present embodiment, it is possible to immediately carry out, after barking the thinned-out woods 2 and 5, a series of treating processes including the softening process, the reinforcing member arranging process, the adhesive spreading process using the compressively molding apparatus 40, the compression process, and the fixation treatment process. Thus it has become possible to dispense with such a conventional machining process as a pre-chamfering process at the stage of thinned-out wood, which realizes production of the collected lumbers 1 and 4 at an extremely low cost.

It should be noted that the present invention is not limited to the embodiment described above and various modifications and changes are possible within the scope of the invention. For example, in the present embodiment, rectangular collected lumbers 1 and 4 have been explained as shown in FIGS. 17 and 18. However, it is apparent that various types of collected lumbers of desired shapes can be obtained by changing the shape of the molds 46 to be used in the compressively molding apparatus 40.

Figure 19:
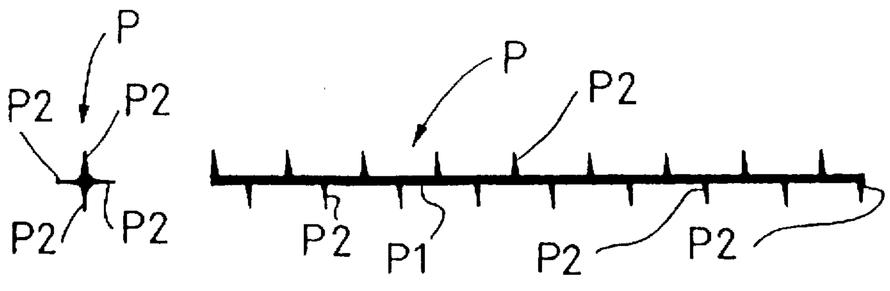
Figure 23:
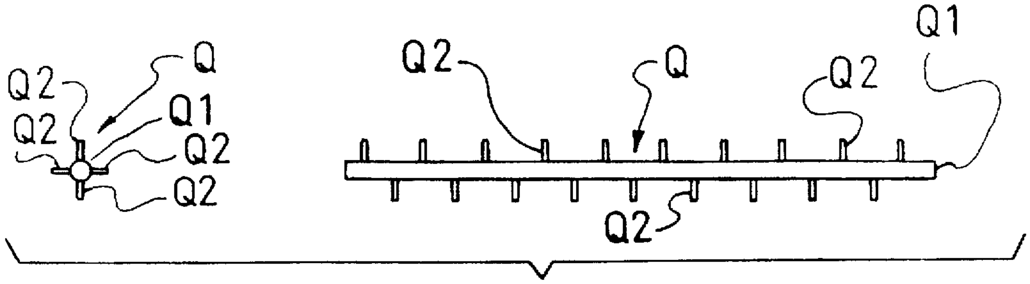
Figure 24:
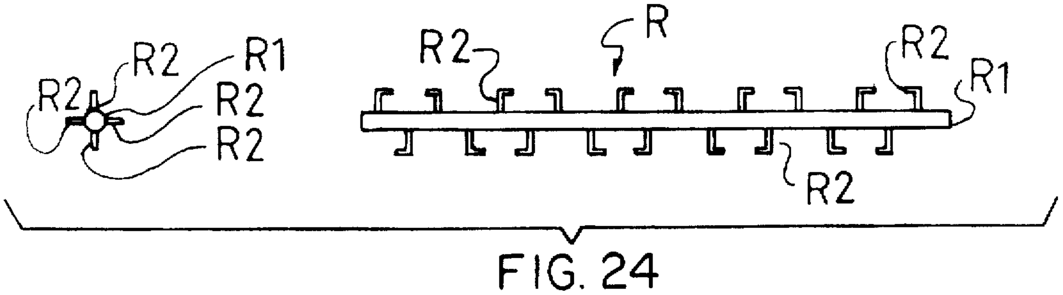
Figure 25:
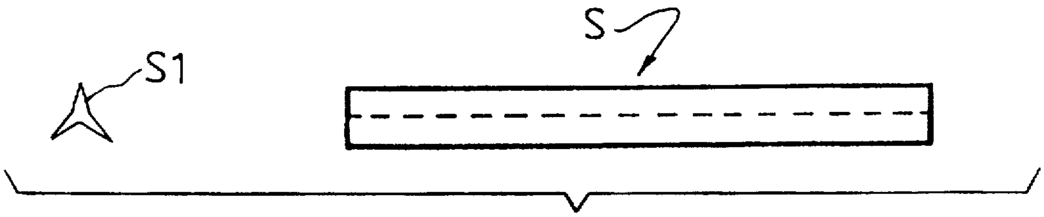
Figure 26:
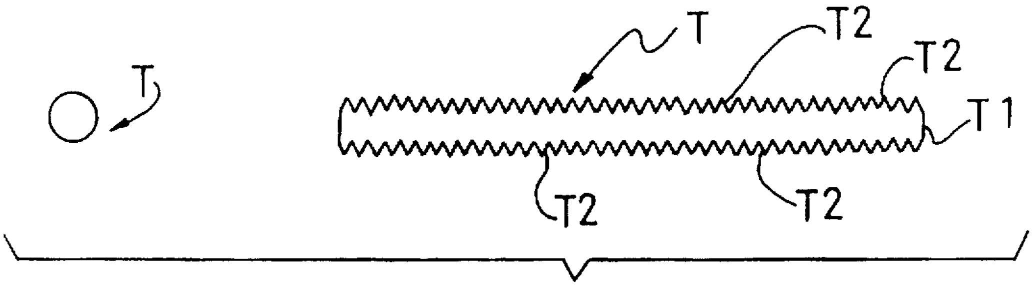

In the third embodiment, the reinforcing member shown in FIG. 19 is used as the reinforcing member P; it, however, is to be noticed that the reinforcing member P is not limited thereto and may be, for example, a reinforcing member Q having hooks Q2 protruding alternately from both sides of the shaft Q1 as in the case of the first modification shown in FIG. 23. Further, as the second modification shown in FIG. 24, it may be a reinforcing member R having L-shaped hooks R2 protruding alternately from both sides of the shaft R1; and further as the third modification shown in FIG. 25 it may be a star-shaped reinforcing member S having a hook S1 protruding in three directions from the center. Also as the fourth modification shown in FIG. 26, it may be a reinforcing member T having saw tooth-shaped hook T2 formed around the shaft T1.

Figure 27A:
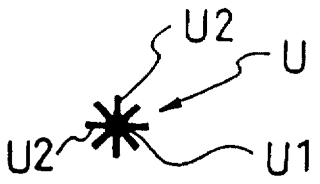
Figure 27B:
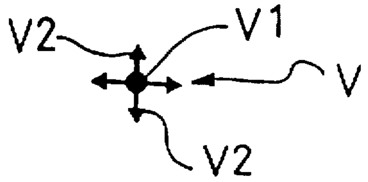
Figure 28:
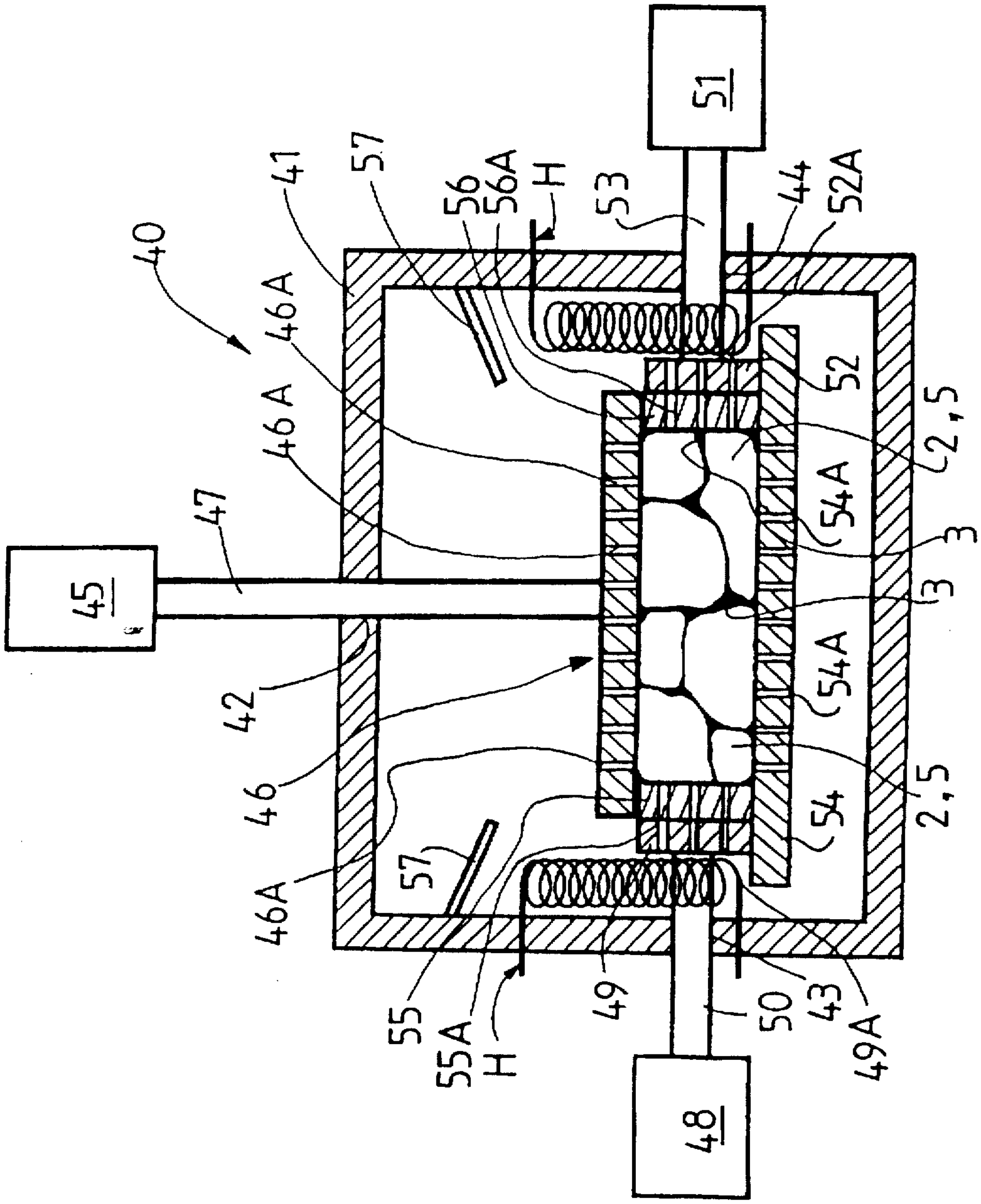

Furthermore, as the fifth and sixth modifications shown in FIGS. 27 (A) and 27 (B), the reinforcing member may be a reinforcing member U (FIG. 17 (A)) with a hook U2 formed in eight directions from the shaft U1, and also may be a reinforcing member V having four arrow-shaped hooks V2 extending from the shaft V1.

(Fourth Embodiment)

Subsequently, a wood building material and a process for producing the wood building material of the fourth embodiment will be explained with reference to FIGS. 29 to 36. First, the constitution of the wood building material and a collected wood building material will be explained by referring to FIGS. 29 to 32.

The thinned-out wood 2 used in the fourth embodiment measures about 3 to 4 m in length and 10 to 20 cm in diameter, and is classified largely into two types in size when cut to a predetermined width L for the purpose of standardization, described later.

Figure 31:
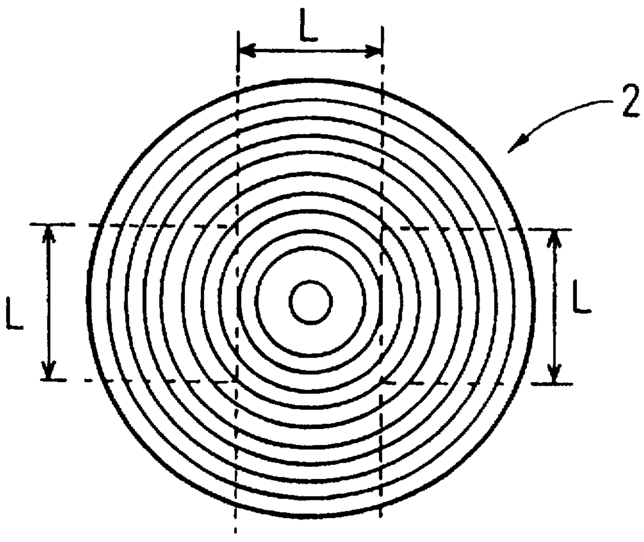
Figure 32A:
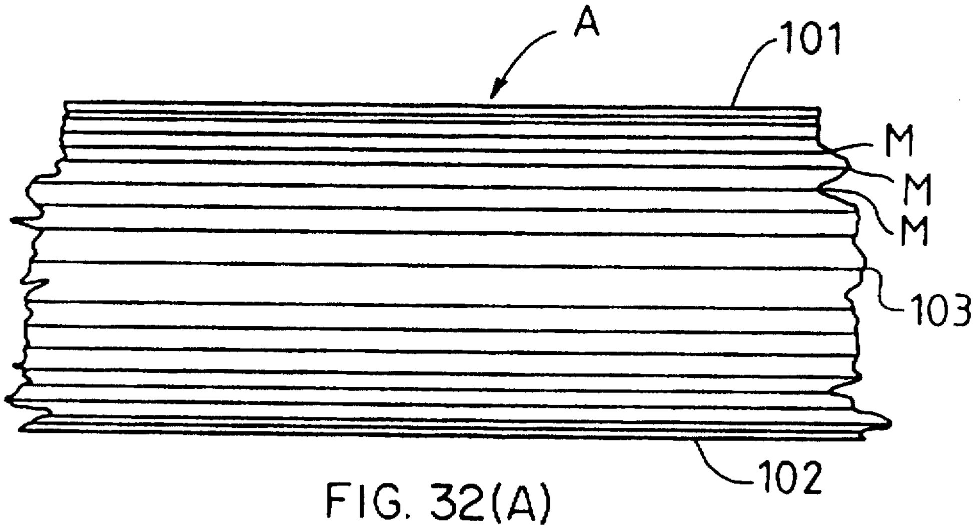
Figure 32B:
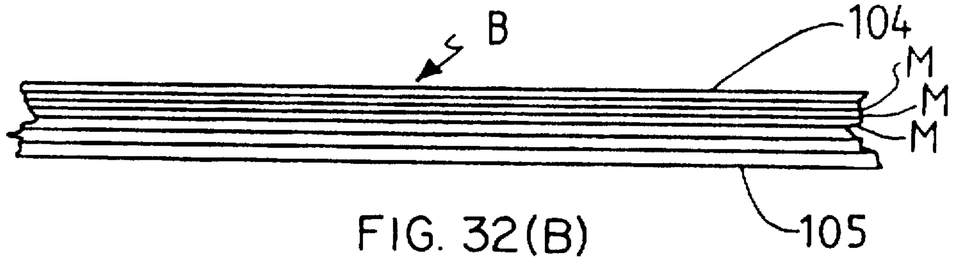

To describe concretely, as shown in FIG. 31, the thinned-out wood 2 can be classified into a cut thinned-out wood A inclusive of the maximum diameter of the thinned-out wood 2 and having as large a height as the diameter of the wood, and a cut thinned-out wood B obtained by cutting the remaining portion. FIG. 32 is a side view of the cut thinned-out wood A and the cut thinned-out wood B; the cut thinned-out wood A has a grain M which gradually becomes coarse as it goes from the upper and lower ends 101 and 102 towards the center 103; and in the cut thinned-out wood B also, the grain M gradually becomes coarse as it goes from one end 104 towards the center 105 though not so much as the cut thinned-out wood A.

Figure 29A:
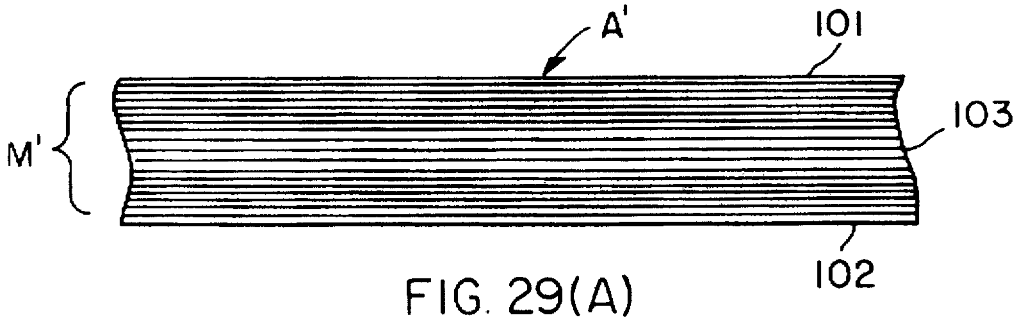
FIGS. 29 to 36 illustrate the fourth preferred embodiment of the present invention.
Figure 29B:
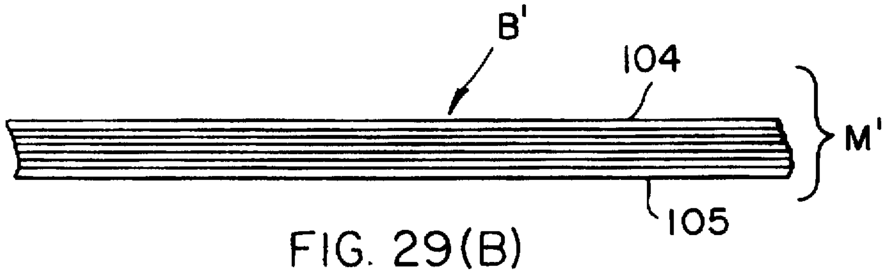

Here the constitution of the wood building materials A' and B' and the collected wood building material C of the fourth embodiment that have been subjected to compressive molding and fixation treatment, described later, will be explained. In the wood building material A', as shown in FIG. 29 (*a*), the grain M that gradually grows coarse as it goes from the upper and lower ends 101 and 102 towards the center 103 is changed to an almost uniform and fine grain M'. Similarly, even in the wood building material B', the grain M is changed to an almost uniform and fine grain M' from one end 104 to the center 105 as shown in FIG. 29 (*b*). As compared with a non-processed thinned-out wood which has little commodity value, the wood building materials A' and B' having a straight grain M' are provided with a high additional value through the compressive molding process and the fixation treatment process.

Figure 30:
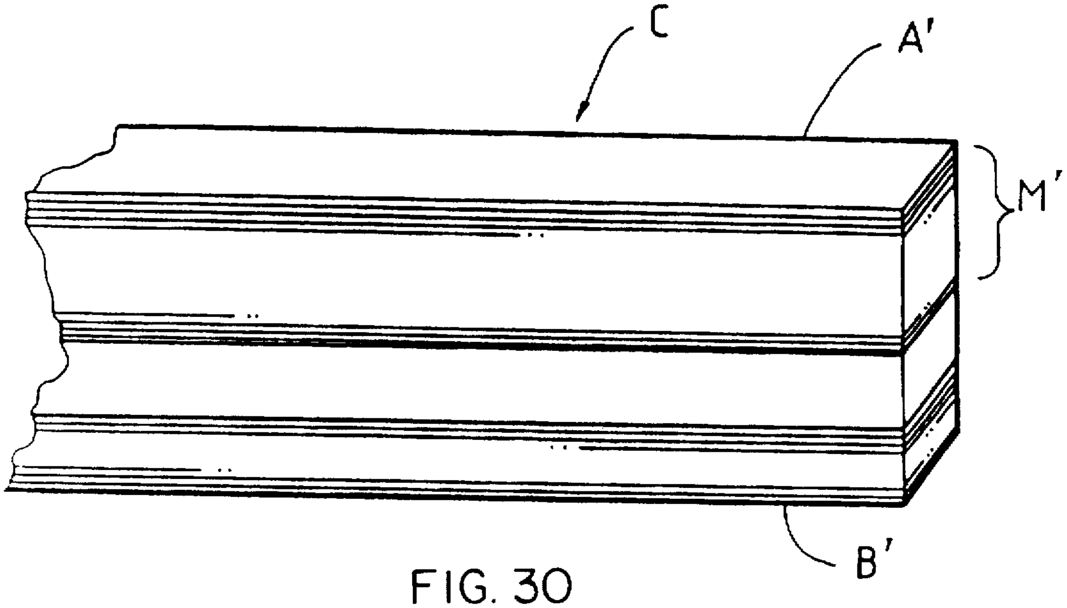

Since the thinned-out wood 2 used as a raw material is a small-diameter wood and moreover deceases in height by approximately one-half after compressive molding and fixation treatment, it sometimes lacks in a surface area depending on a place of application. In this case, a larger collected wood building material C is obtainable as shown in FIG. 30 by further collecting the wood building materials A' and B' already produced.

In the collected wood building material C shown in FIG. 30, the wood building materials A' and B' are mutually bonded by an adhesive and clamped at the time of bonding as described later, and will not easily separate. It is therefore possible to assemble the wood building materials A' and B' to a desired height suitable for use in wide applications.

Subsequently, the process for producing the wood building materials A' and B' stated above will be explained with reference to FIGS. 31, 32, 33 and 34. The wood building materials A' and B' are produced through the standardization process for standardizing the thinned-out wood 2 after barking, by cutting in the lengthwise direction (a vertical direction in the drawing) to a predetermined width L, to obtain the cut thinned-out woods A and B, the softening process for softening the cut thinned-out woods A and B by heating the plurality of thus standardized cut thinned-out woods A and B, the compression process for forming the thus softened cut thinned-out woods A and B by compressing to a predetermined shape, and the fixation treatment process for fixing the cut thinned-out woods A and B thus compressed. Furthermore, the collected wood building material C is produced by spreading the adhesive to one or two sides of each of the plurality of wood building materials A' and B' obtained, after going through the standardization process, softening process, compression process, and fixation treatment process, and further by the collecting process for collecting and clamping the materials.

First, therefore, barking and cutting to be performed in the standardization process will be explained with reference of FIGS. 31 and 32. FIG. 31 shows the cross section of the thinned-out wood 2, whose diameter is of the order of 10 to 20 cm. First, the thinned-out wood 2, after barking by a known method, is cut to a predetermined width L inclusive of the maximum diameter of the wood, thus obtaining the cut thinned-out wood A. Next, the remaining portion of the cut thinned-out wood A is similarly cut to the predetermined width L to obtain the cut thinned-out wood B. The cut thinned-out wood thus obtained, when viewed sideways, is as shown in FIG. 32, which shows that grain M of the cut thinned-out wood A becomes coarse as it goes from the upper and lower ends 101 and 102 to the center 103; and the cut thinned-out wood B also has a similar grain M growing coarse as it goes from one end 104 to the center 105.

Subsequently explained is a process for softening the wood through heat treatment using water vapor in a compressively molding apparatus D1 shown in FIG. 33. To explain the constitution of the compressively molding apparatus D1 first, the compressively molding apparatus D1 is equipped with a pressure vessel 111 (formed long in a vertical direction in the drawing) which is formed in a long cylindrical form having a square cross section. The pressure vessel 111 has a rod hole 110 in the upper wall.

Into the rod hole 110 is slidably inserted a press rod 114, which is connected at one end with a hydraulic cylinder 112 outside of the pressure vessel 111 and attached with a mold of slide-press 113 on the other end inside the pressure vessel 111. When the cut thinned-out woods A and B undergo pressing for compression, the press rod 114 is moved downwards through the hydraulic cylinder 112. With the downward movement of the press rod 114, the mold 113 presses the cut thinned-out woods A and B from above. Here, the pressure applied by the hydraulic cylinder 112 to the press rod 114 is changed according to the percentage of compression set of the cut thinned-out woods A and B, for example to 15 $kgf/cm^2$ at the percentage of compression set of 50%, and 10 $kgf/cm^2$ at the percentage of compression set of 30%.

On the mold of slide-press 113 connected to the forward end of the press rod 114 are formed a plurality of independent press sections 113*a*, which, in cooperation with a mold of press 115 described later, produce the cut thinned-out woods A and B of a predetermined shape. Furthermore, the mold of slide-press 113 is provided with a multitude of water vapor holes 113*b*, from which water vapor is jetted out to the cut thinned-out woods A and B arranged below, in the heat treatment and fixation treatment described later.

Also, in the pressure vessel 111 is fixedly installed a mold of press 115 in the lower position. On the mold 115 are formed a plurality of partition walls 115a. A plurality of cut thinned-out woods A and B to be compressed are placed one by one between these partition walls 115a. Here, since the cut thinned-out wood B is low as compared with the cut thinned-out wood A, a spacer SP is used in order to compensate for lack of height to obtain a uniform compression pressure. Furthermore, the mold of press 115 is provided with a number of water vapor holes 115b, from which water vapor passes to be jetted out to the cut thinned-out woods A and B.

The compressively molding apparatus D1 has a water vapor jetting device 116 which jets heating water vapor from the four walls in the pressure vessel 111 against the cut thinned-out woods A and B held separately by the mold of press 115. Here, the water vapor jetting device 116 is preferably set to jet the water vapor at a pressure of 5 to 16 kgf/cm$^2$ and more and at a heating temperature ranging from 130° C. to 200° C., particularly within the range of from 150° C. to 180° C.

Hereafter the process for heating treatment to be carried out in the compressively molding apparatus D1 will be explained.

First, the thinned-out woods A and B thus barked and cut are placed one by one among the plurality of partition walls 115a on the mold of press 115, then the heating water vapor intermittently jetted out from the water vapor jetting device 116. During the emission of the heating water vapor, the cut thinned-out woods A and B are softened uniformly; and the interior of the compressively molding apparatus D1 is heated up to 70° to 160° C. by the heating water vapor being jetted from the water vapor jetting device 116 into the compressively molding apparatus D1. Here, the water vapor jetted intermittently is preferred to raise the temperature in the compressively molding apparatus D1 to about 150° C. and to maintain the water vapor pressure in the compressively molding apparatus D1 at 5 kgf/cm$^2$. Also, the heating time is set at about 1 to 2 hours.

Subsequently, an explanation will be given of the compression process for forming the cut thinned-out woods A and B heated for softening by the heat treatment process and the fixation treatment process for fixing through the heating water vapor or the heater.

The compression process and the fixation treatment process are carried out through the compressively molding apparatus D1 previously explained. Prior to performing these processes, the mold of slide-press 113 is held in a state shown in FIG. 33.

Figure 33:
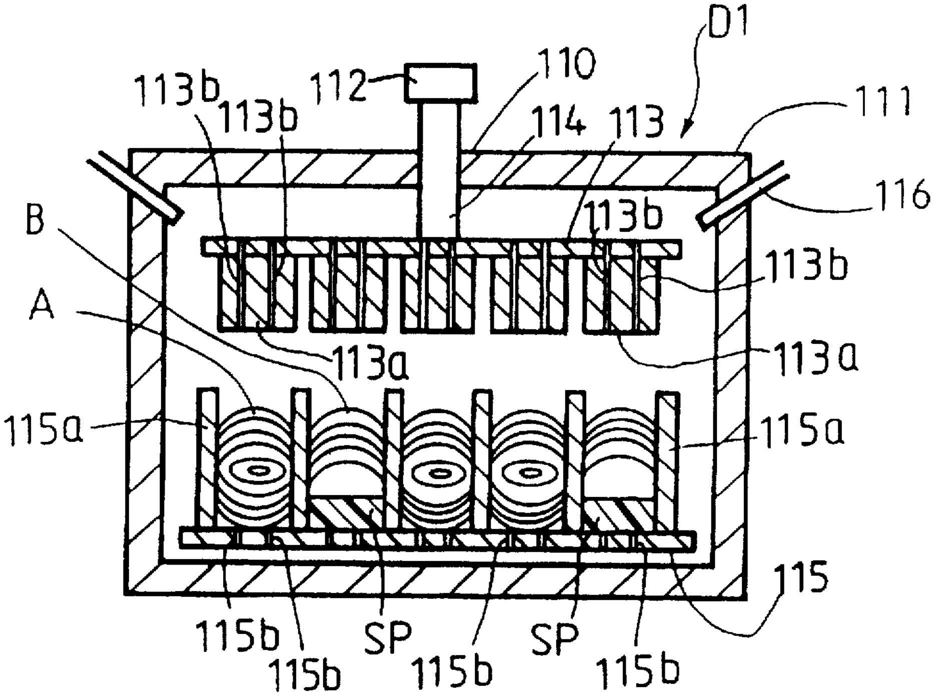

The plurality of cut thinned-out woods A and B thus softened as described above are held by the partition wall 115a formed on the mold of press 115 positioned in the lower part of the pressure vessel 111 (see FIG. 33). At this time, it is taken into consideration that the cut thinned-out wood B under which the spacer SP is inserted, and the cut thinned-out wood A are uniformly compressed with the same pressure.

Thereafter, the press rod 114 is forced to move downwards through the hydraulic cylinder 112, thus compressing the cut thinned-out wood A and B from above with a specific pressure. At this time, the cut thinned-out woods A and B heated are in a softened state and therefore the mold 113a formed independently on the upper mold of slide-press 113 and the mold of press 115 cooperate to compress the woods one by one easily into a predetermined shape, thus completing the compression process.

Next, the cut thinned-out woods A and B that have been compressed as described above undergo the fixation treatment. The fixation treatment will be explained by referring to FIG. 34. With the cut thinned-out woods A and B held in a state shown in FIG. 34, the fixation treatment is carried out by jetting out the heating water vapor to the thinned-out woods from the water vapor jetting device 116.

The heating water vapor jetted from the water vapor jetting device 116 is jetted to the cut thinned-out woods A and B from the water vapor hole 115b of the mold of press 115 and the water vapor hole 113b of the mold of slide-press 113, thereby performing the fixation treatment of the cut thinned-out woods A and B. The cut thinned-out woods A and B are thus fixed in the shape permanently.

In this case, as fixation treatment conditions, the optimum heating temperature in the compressively molding apparatus D1 is set at around 180° C. which is higher than that for compression treatment; the water vapor pressure in the compressively molding apparatus D1, at 10 kgf/cm$^2$; and the fixation treatment time, to one hour.

Figure 34:
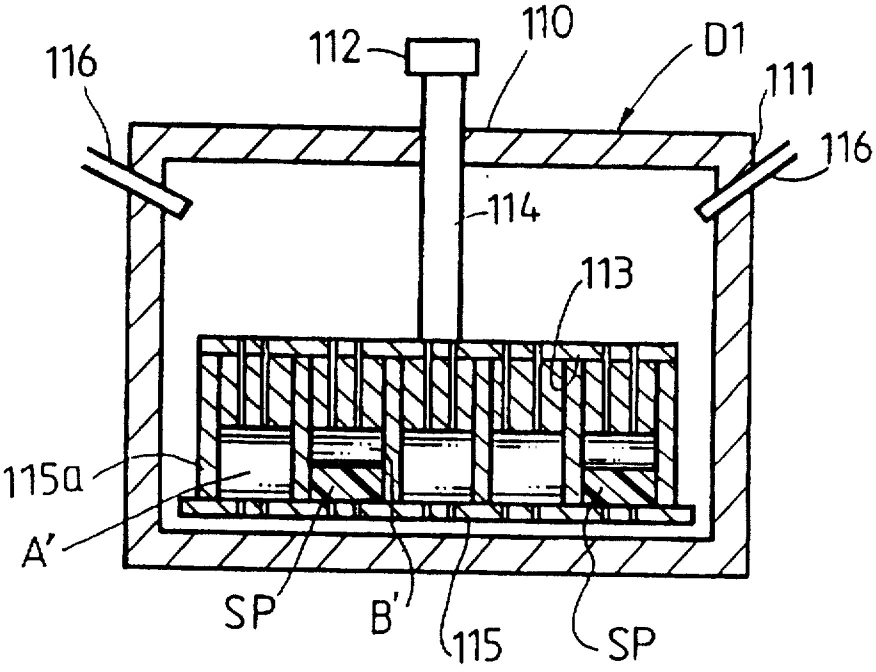
Figure 35:
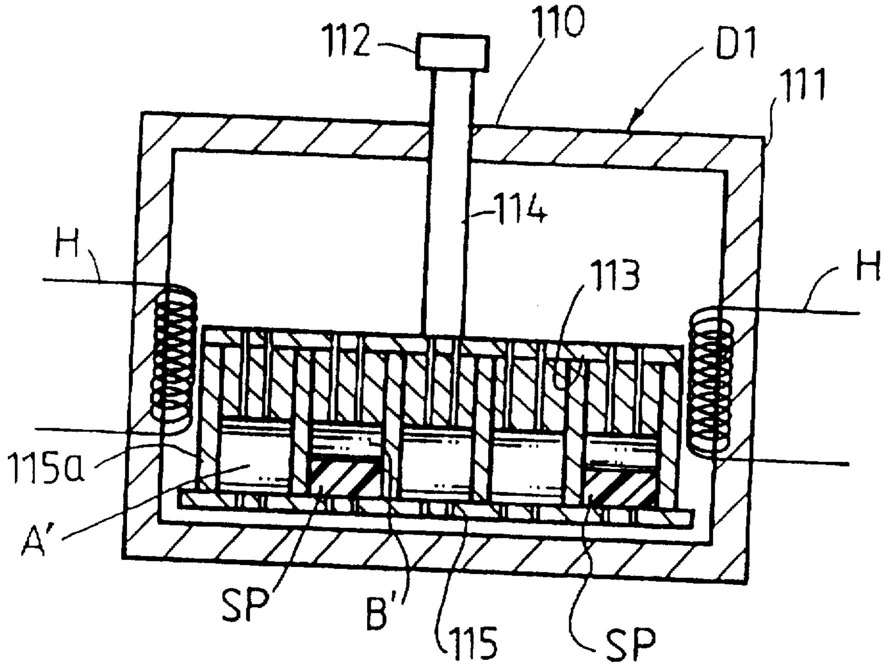

The fixation treatment described above can be done also by heating the interior of the compressively molding apparatus D1 by the heater H disposed near both the right and left side walls of the compressively molding apparatus D1 as shown in FIG. 35. That is, with the cut thinned-out woods A and B held in a state shown in FIG. 34, the heater H is operated to heat the interior of the compressively molding apparatus D1 up to a predetermined temperature; and by holding this heated state for a specific period of time, the fixation treatment of the cut thinned-out woods A and B is accomplished.

At this time, when the fixation treatment is carried out, each heater H is so controlled as to hold the interior temperature of the compressively molding apparatus D1 at 180° C.; and the time required for the fixation treatment is set to 20 hours.

After the completion of the fixation treatment, the wood building materials A' and B' shown in FIG. 29 are obtained. The wood building materials A' and B' thus obtained are usable as various non-structural members and also may be further forwarded to the collecting process for collecting the wood building materials A' and B' to form a larger-size collected wood building material C for wider applications.

Figure 36:
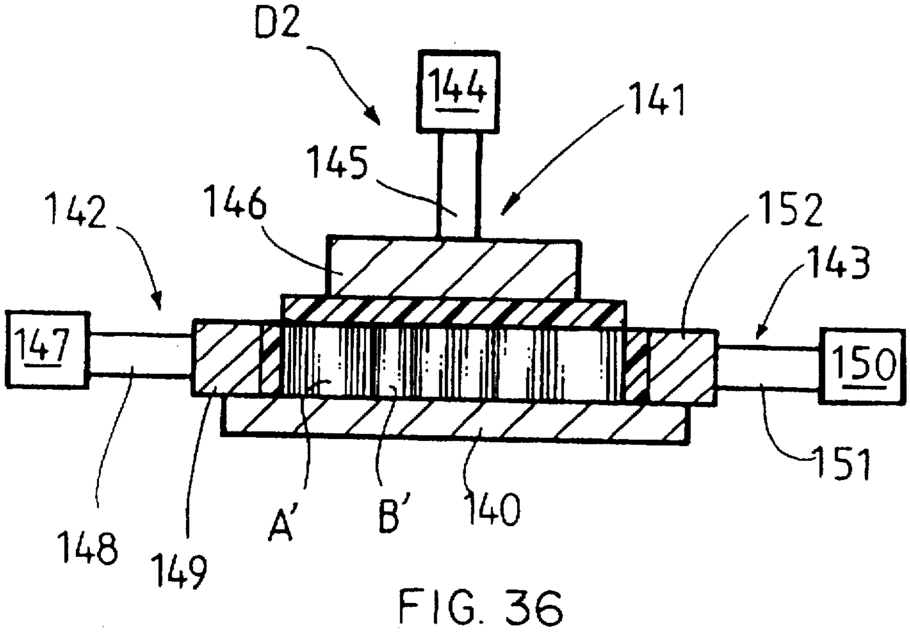

The collecting process is performed by the use of a clamping device D2 shown in FIG. 36. In FIG. 36, the clamping device D2 comprises a base 140 on which the wood building materials A' and B' are arranged in one row with their straight grain patterns directed in the vertical direction, and three clamps 141, 142 and 143 disposed on the right and left sides and on the upper side of the base 140. The clamp 141 has a press member 146 mounted on one end of a press rod 145 which is forced to move by a hydraulic cylinder 144. Similarly the clamp 142 has a press member 149 mounted on one end of a press rod 148 which is forced to move by a hydraulic cylinder 147. Further the clamp 143 comprises a hydraulic cylinder 150, press rod 151, and press member 152.

When the wood building materials A' and B' are clamped by the use of the clamping device D2 of the above-described constitution, the wood building materials A' and B' are clamped to a clamping pressure of about 10 kgf/cm$^2$ with the clamps 141, 142 and 143 at normal temperatures (about 25° C.) or lower. A clamping time during which the wood building materials A' and B' are held in the clamped stated is set to 15 hours. The compressively molding process may be carried out at high temperatures using heated steam.

To clamp the wood building materials A' and B' coated with the adhesive, by the use of the clamping device D2, first the wood building materials A' and B' are placed in one row with their straight grain patterns directed vertically on the base 140, and then the hydraulic cylinders 144, 145 and 150 in the clamps 141, 142 and 143 are driven to move the press rods 145, 148 and 151. Thus the wood building materials A' and B' are clamped horizontally and downwardly by the press members 146, 149 and 152, and are held in this clamped state for a specific period of time. During this clamping operation, the adhesive spread on one side or two sides of the wood building materials A' and B' sets, thus producing the collected wood building material C composed of the wood building materials A' and B'.

The adhesive is used to attach the wood building materials A' and B' to each other; in the present invention various kinds of adhesives are used. For example, adhesives best suited for use are heat curing adhesives such as a phenolic resin adhesive composed of a phenolic resin as a main component and a resorcinol resin adhesive composed of a resorcinol resin as a main component. Also usable heat curing adhesives are a melamine-formaldehyde resin adhesive composed of a melamine-formaldehyde resin, a urea resin adhesive composed of a urea resin as a main component, and an epoxy resin adhesive composed of an epoxy resin as a main component. In addition to these heat curing adhesives, also usable are water based polymer-isocyanate adhesives composed of isocyanate and water based polymer molecule, and polyvinyl acetate resin adhesives. Here, in selecting an adhesive to be used, it is desirable to select a proper adhesive with the cost of the adhesive, type of solvent, and usage of the collected lumber taken into account.

The wood building materials A' and B' are compressed and collected into the collected wood building material through the above-described processes as shown in FIG. 36. At this time, the adhesive remains in a solidified state within the collected body.

The wood building materials A' and B' and the collected wood building material C thus produced have a fine grain pattern, and are usable as building materials, particularly, as high-grade interior finishing materials, for example as wood materials for floors, walls, ceilings, and furniture, and furthermore as face materials of fixtures.

The wood building materials A' and B' of the present embodiment particularly explained above are obtained through a series of treatments including the softening process for softening the cut thinned-out woods A and B obtained by cutting the thinned-out wood 2, a compression process by using the compressively molding apparatus D1, and subsequently the fixation treatment process. The collected wood building material C is obtainable through the collecting process by clamping the wood building materials A' and B' by the clamping device D2.

In the wood building materials A' and B and the collected wood building material C thus obtained, a fine grain pattern is seen. According to the present embodiment, it is possible to obtain, from naturally low-utility value thinned-out wood 2, the wood building materials A' and B' having a straight grain pattern and the collected wood building material C which are low-cost materials usable as varieties of high-grade building materials, while enabling the effective utilization of valuable forest resources.

It is to be noted that the present invention is not limited to the present embodiment and various improvements and modifications can be made within the true spirit and scope of the present invention. For example, the process for producing the wood building materials A' and B' of the fourth embodiment, as shown in FIGS. 33 and 34, uses the compressively molding apparatus D1 in which one mold of press moves; the present invention is not limited to the apparatus and any apparatus capable of properly performing compressive molding may be used.

Furthermore, in the clamping process using the clamping device D2, the wood building materials A' and B' may be placed longitudinally, not horizontally, on the base 140.

(Fifth Embodiment)

The fifth embodiment according to the present invention will be described in detail with reference to FIGS. 37 to 40 and 43. First, the construction of a collected lumber according to the fifth embodiment will be described with reference to FIG. 37. A collected lumber 1 comprises a plurality of thinned-out woods 2 (e.g., 5 in the collected lumber 1 shown in FIG. 37) and an adhesive 3 interposed between the thinned-out woods 2, which woods 2 are then mutually compressed and collected and are also subjected to a fixation treatment through heating water vapor or a heater. The thinned-out woods 2 used herein are those removed during the process of growing of Sugi (Cryptmeria japonica D. Don), a Japanese Cypress, and the like. As the thinned-out wood 2, a log is used of which diameter is relatively arranged in order having a bottom end 2A of approximately 15 cm and a tip end 2B of approximately 10 cm.

Figure 37:
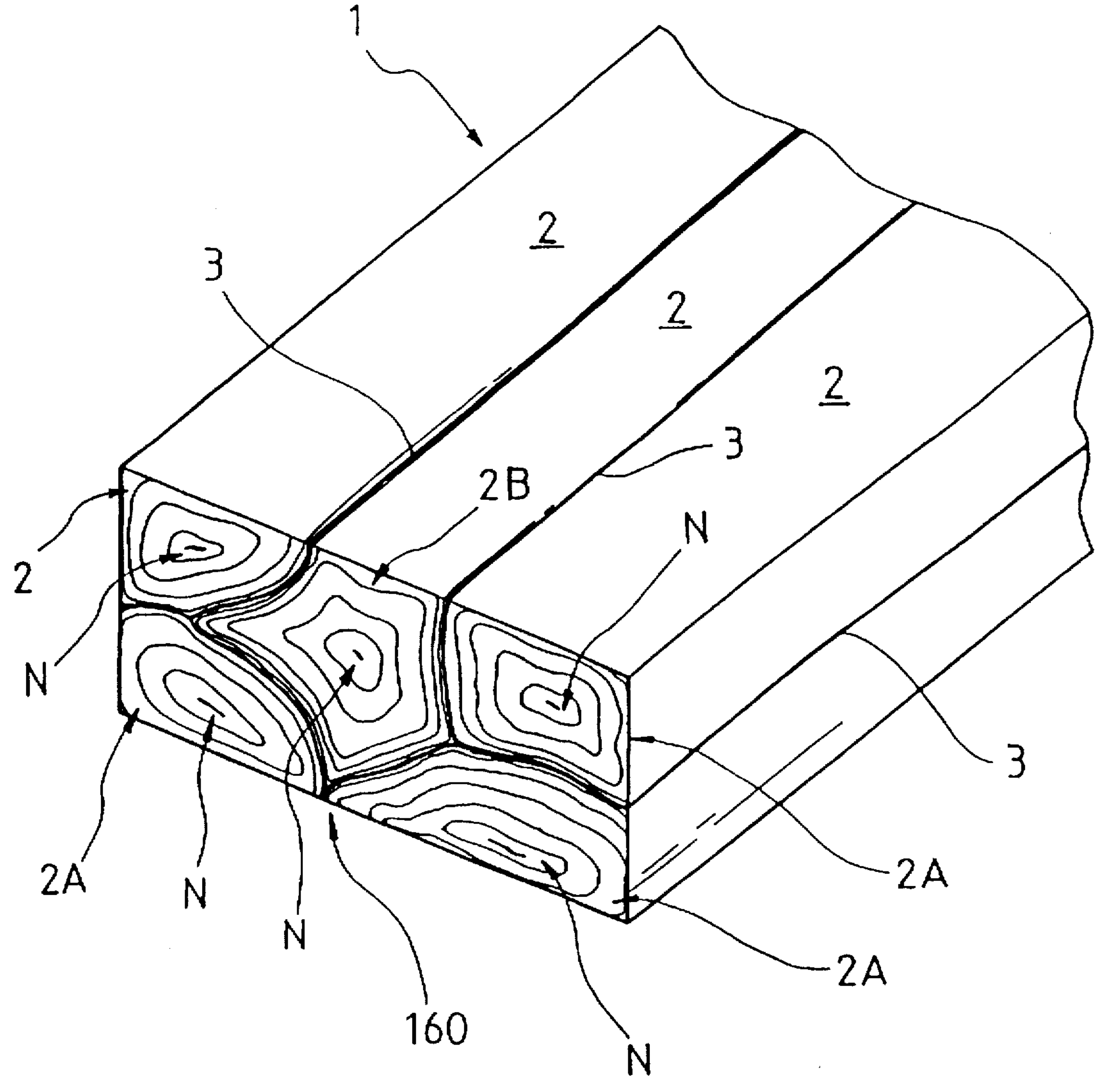
FIG. 37 is a perspective view for schematically showing the collected lumber.

As shown in FIG. 37, when the thinned-out wood 2 is exposed with the bottom end 2A located on the end side, the thinned-out wood 2 adjacent to the first mentioned thinned-out wood 2 is exposed so that the tip end 2B is located on the end side of the collected lumber 1. When the thinned-out woods 2 are exposed as described above, it is hard to form a clearance between the thinned-out woods when carrying out the compressive molding and fixation treatment which will be described later, and in addition, the quantity of using the adhesive 3 can be saved.

The adhesive 3 is used to mutually bond the thinned-out woods 2, and various kinds of adhesives can be used in the present embodiment. Preferable adhesives include, for example, thermosetting adhesives such as, a phenol adhesive mainly composed of phenol resin, a resorcinol adhesive mainly composed of resorcinol resin. Further, use can be made of other thermosetting adhesives such as a melamine-formaldehyde resin mainly composed of melamine-formaldehyde resin, a urea resin adhesive mainly composed of urea resin, and an epoxy resin adhesive mainly composed of epoxy resin. In addition to these thermosetting adhesives, a water-based polymer-isocyanate adhesive mainly composed of an isocyanate and a water-based polymer, and a polyvinyl acetate resin adhesive can be also used. In selecting adhesives to be used, it is preferable to consider kinds of solvents, uses of collected lumber, and the like.

Annual ring patterns N on bottom ends 2A and tip ends 2B of thinned-out woods 2 are compressively molded as described hereinafter, and then fixed by fixation treatment while the molded shapes are kept on the end face 160 of the collected lumber 1 (In FIG. 1, only one end face is shown). Various kinds of annual ring patterns N can be formed by changing the compressively molding conditions applied to the thinned-out wood 2, and the combination of type of trees, or by using thinned-out woods 2 with different diameters. When a collected lumber 1 is cut in the radial direction of thinned-out woods 2 to make boards, and when the boards are used as surfacing material of various products the collected lumber 1 exhibits the unique decorative effect, therefore the collected lumber 1 can thus be used for wide range applications usefully.

Next, the process for producing the collected lumbers 1 constructed as above will be explained. The collected lumbers 1 are produced via the steps of softening the thinned-out woods 2 by subjecting a plurality of thinned-out woods 2 to heat treatment, coating an adhesive on the surface of the softened thinned-out woods 2, pressing and compressing the thinned-out woods having their surfaces coated with the adhesive to form a collected lumber 1 having a predetermined shape, and applying a fixation treatment to the collected lumber 1 through heating water vapor and a heater as necessary.

The heat treatment carried out in the softening treatment step is carried out by the water vapor heating device 10 (see FIG. 3), the hot water 21 filled in the water tank 20 (see FIG. 4) and the high-frequency heating device 30 (see FIG. 5), similarly to the first embodiment, second embodiment, and third embodiment previously described. Since these softening treatments are carried out similarly to the above-described first embodiment, the detail of which is referred to the explanation of the first embodiment and the explanation thereof is omitted.

The adhesive spreading step for applying an adhesive to the surfaces of the thinned-out woods 2 subjected to heating treatment and softened by the above-described heating treatment processes, the pressing and compressing step for pressing and compressing the thinned-out woods 2 applied in the surfaces with the adhesive to form a collected lumber having a predetermined shape, and the fixation treatment step for subjecting the collected lumber to fixation treatment through heating water vapor or a heater will be explained hereinafter.

The above mentioned adhesive spreading step and pressing and compressing step and fixation treatment step are carried out through the compressively molding apparatus 40 (see FIG. 21) having the same structure as used in the first embodiment, the second embodiment and the third embodiment described hereinbefore. The structure of the compressively molding apparatus 40 is described in the first embodiment for reference, and the explanation is omitted herein.

Next, the process for producing collected lumbers 1 by carrying out the adhesive spreading step, pressing and compressing step and fixation treatment step of a plurality of thinned-out woods 2 softened by the above-described heating treatment using the compressively molding apparatus 40 will be explained. It is assumed that prior to carrying out the aforementioned steps, the molds of press 46, 49, 52 and 54 are held in the state shown in FIG. 38.

Figure 38:
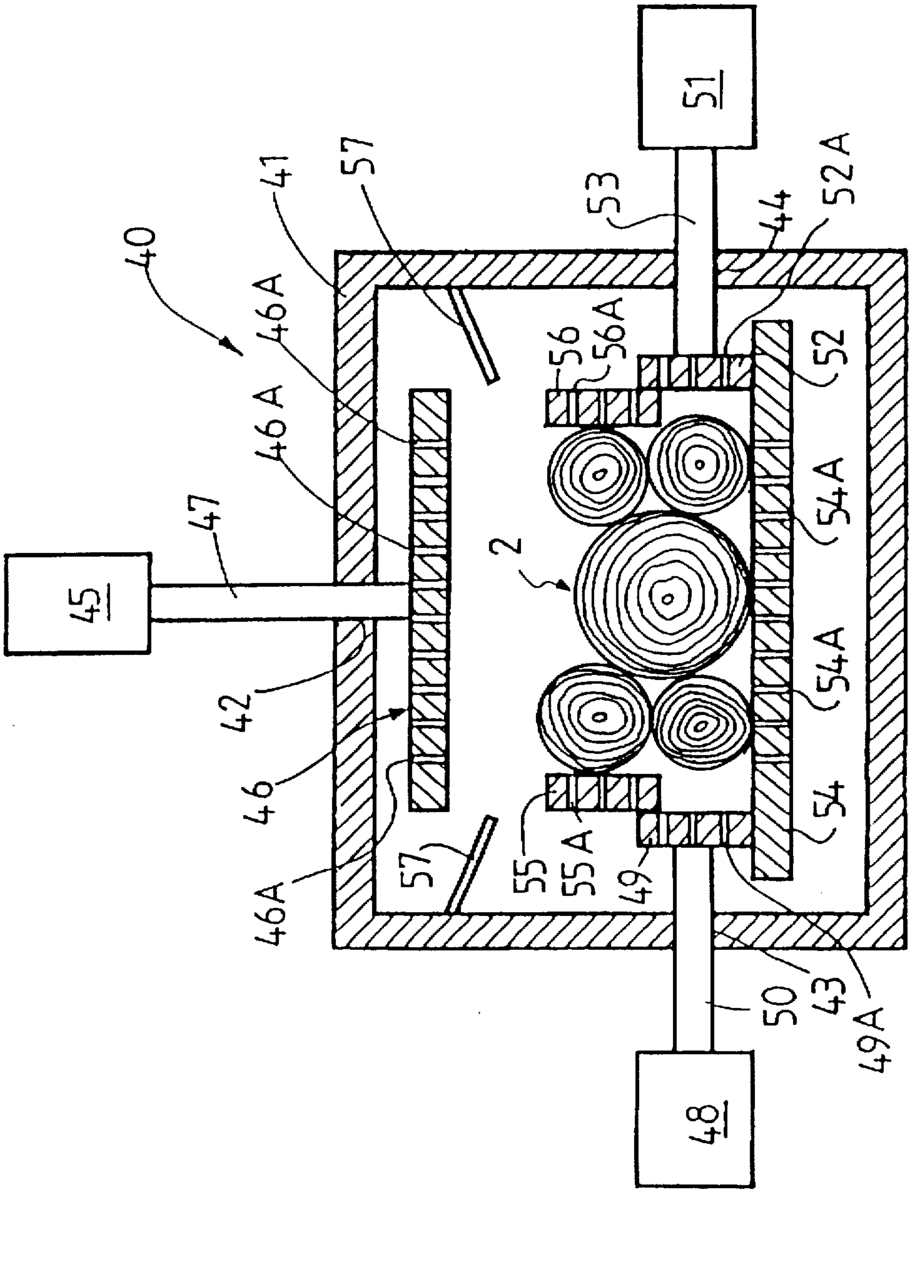
FIG. 38 is a sectional view for schematically showing the compressively molding apparatus.

First, a plurality of thinned-out woods 2 softened through the above-described steps are laminated and placed within the pressure vessel 41 to keep the laminated state of the thinned-out woods 2 by cooperation with the molds of slide-press 55 and 56 (see FIG. 38). When thinned-out woods 2 are laminated, thinned-out woods 2 with even diameter are used or thinned-out woods 2 with different diameters are used as described hereinbefore depending on what annual ring pattern N on the end face 160 of the collected lumber 1 is expected. It is possible to vary the annual ring pattern N on the end face 160 of the collected lumber 1 to exhibit unique decorative effect by selecting the diameter of lumbers 1.

Thereafter, the adhesive is jetted against the surfaces of the thinned-out woods 2 from each of the nozzles 57. The jetted adhesive passes through the water vapor holes 46A, 49A, 52A and 54A of the molds of press 46, 49, 52, and 54, and the water vapor holes 55A and 56A of the molds of slide-press 55 and 56, and are jetted against the thinned-out woods 2. After the adhesive in a fixed amount is jetted, it is left for about 5 minutes in order that it is evenly spread over the surfaces of the thinned-out woods 2. Then, the adhesive spreading step is terminated.

After the adhesive was jetted against the thinned-out woods 2, the compressively molding step is carried out in accordance with the percentage of compression set. In this compressively molding step, a press rod 47 is first pressed and moved through an upper hydraulic cylinder 45 whereby the mold of press 46 presses and compresses the thinned-out woods 2 from the top under a predetermined pressure. Since at this time, the thinned-out woods 2 are in the softened state, they are compressed through the mold of press 46 by cooperation between the molds of press 49, 52 and 54 and the molds of slide-press 55 and 56. The molds of slide-press 55 and 56 are moved downward in synchronism with the pressing state of the mold of press 46 and finally placed in contact with the inner surface of the molds of press 49 and 52. The mold of press 46 completes its vertical compression and stops when moved a predetermined amount in accordance with the percentage of compression set.

Figure 39:
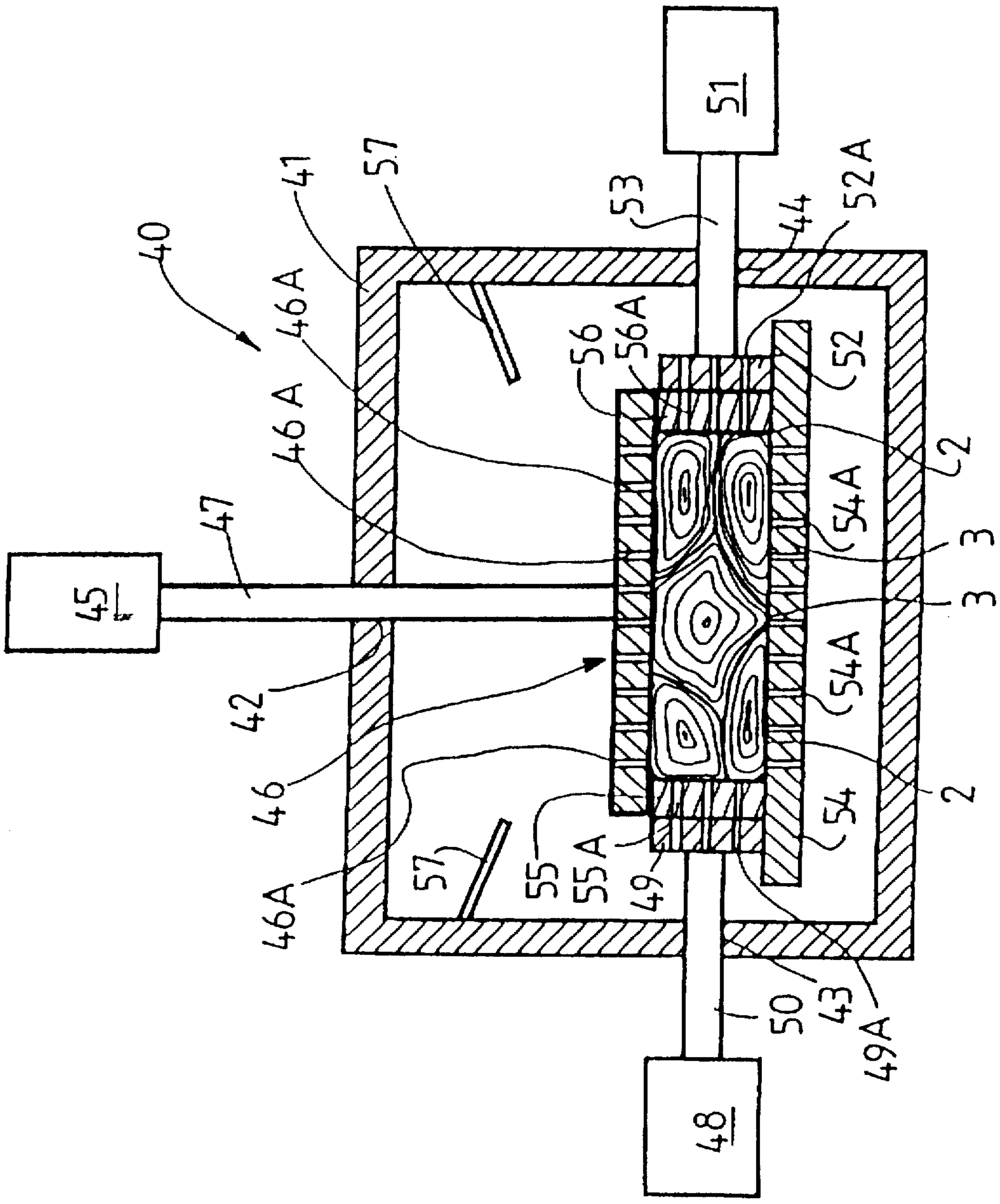
FIG. 39 is a sectional view for schematically showing the state of the compressively molding apparatus at the time of completion of the pressing step.

Next, compressive molding of the thinned-out woods 2 in the lateral direction is carried out through hydraulic cylinders 48 and 51, the press rods 50 and 53, molds of press 49 and 52, and the molds of slide-press 55 and 56. By the compressive molding, the thinned-out woods 2 receive the pressure in the lateral direction in FIG. 38 and are being compressed and molded. The compressively molding step terminates when the molds of press 49 and 52 have been moved a predetermined amount in accordance with the percentage of compression set. This termination state is shown in FIG. 39.

The time of the compressively molding step depends on the kind of adhesives since the adhesion time varies with the kind of adhesives used. The thinned-out woods 2 are adhered to each other by carrying out the compressively molding step for about 30 minutes. The thinned-out woods 2 are thereby compressed and collected as shown in FIG. 37 to form a integral body. At this time, the adhesive remains in the integral body as a solidified adhesive 3 (see FIG. 37)

Next, the integral body having the thinned-out woods 2 thus obtained adhered to each other through the adhesive 3 is subjected to the fixation treatment. The fixation treatment will be described with reference to FIG. 39. The fixation treatment is carried out by jetting the heating water vapor against the thinned-out woods 2 from the water vapor jetting apparatus while holding the integral body in the state as shown in FIG. 39. The heating water vapor jetted out of the water vapor jetting apparatus passes through the water vapor holes 46A, 49A, 52A and 54A of the molds of press 46, 49, 52 and 54, and the water vapor holes 55A and 56A of the molds of slide-press 55 and 56, and are jetted against the thinned-out woods 2. The fixation treatment of the thinned-out woods 2 in the integral body is thereby carried out so that the thinned-out woods 2 are fixed so as to permanently hold their shapes.

As the conditions for carrying out the fixation treatment, a temperature of the heating water vapor jetted into the pressure vessel 41 from the water vapor jetting apparatus is preferably 180° C., a water vapor pressure is set to 10 $kgf/cm^2$ and a time for fixation treatment is set to about one hour.

Figure 40:
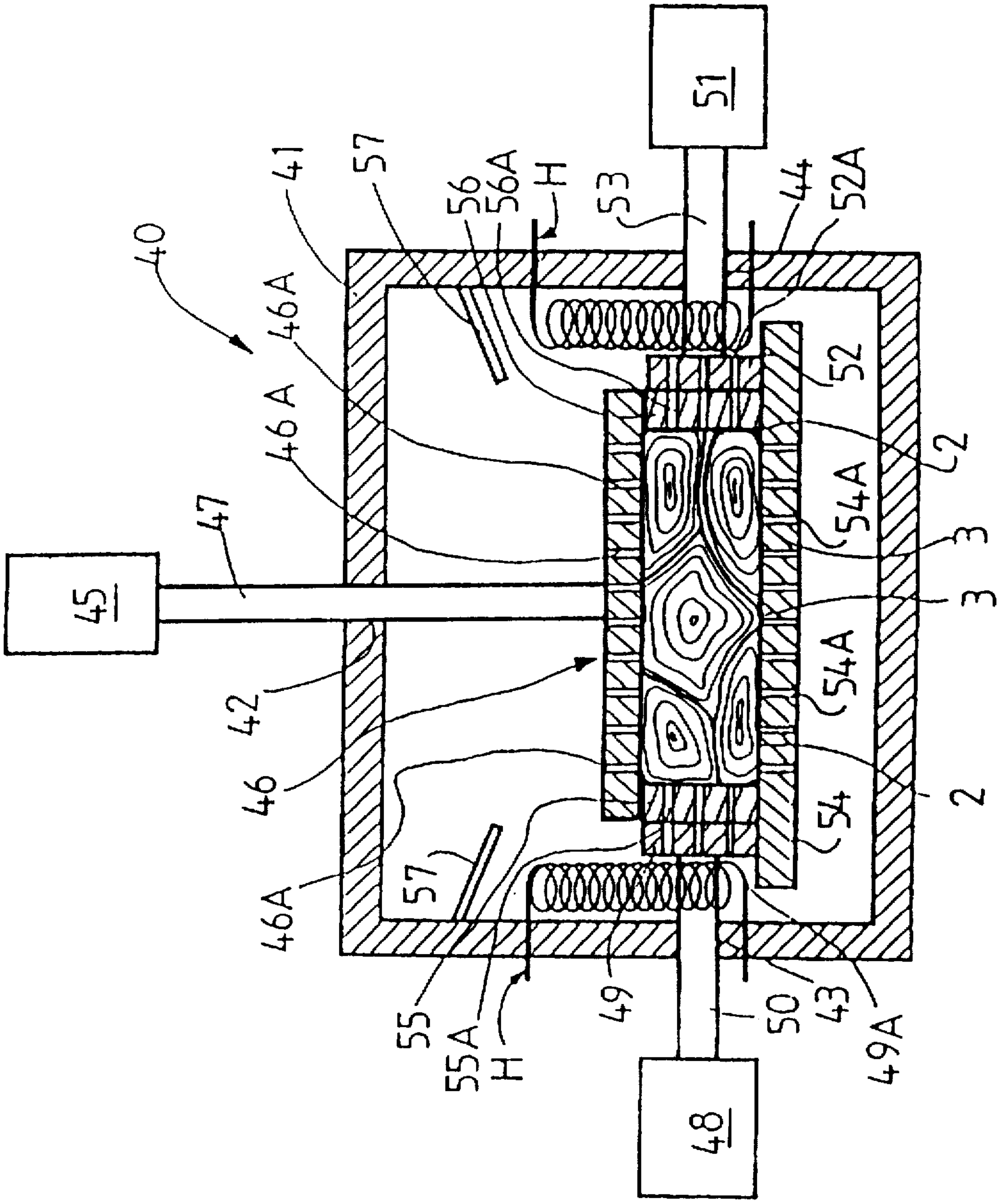
FIG. 40 is a sectional view for showing the state in which the fixation treatment is carried out through the heater arranged at the compressively molding apparatus.

The above fixation treatment can be also carried out in a manner such that the interior of the compressively molding apparatus is heated by heaters H exposed of the compressively molding apparatus 40, as shown in FIG. 40. That is, similarly to FIG. 39, the heaters H are energized, while holding the integral body in the state shown in FIG. 40 to heat the interior of the compressively molding apparatus 40 to a predetermined temperature, which state is held for a predetermined time to thereby fix and treat the integral body.

In carrying out the fixation treatment, the heaters H are controlled in heating so that the internal temperature of the compressively molding apparatus 40 is kept at 180° C. The time for fixation treatment is set to 20 hours.

After the completion of the aforementioned fixation treatment, the collected lumbers 1 explained in connection with FIG. 37 are obtained. The collected lumber 1 manufactured as described herein above has inherent unique annual ring pattern N, which exhibits an excellent decorative effect, at the end face 160, and hardness according to JIS Z 2117 of end of lumber (end face 160) of collected lumber 1 manufactured by treating thinned-out woods 2 of Japanese red wood with a percentage of compression set of 40% using phenol and resorcinol resin adhesive is 4.8 kgf/mm$^2$, and the hardness of end of lumber manufactured with a percentage of compression set of 60% is 8.0 kgf/mm$^2$.

A collected lumber 1 is manufactured by treating thinned-out woods 2 of Japanese pine with a percentage of compression set of 20% using phenol and resorcinol resin adhesive, and the collected lumber is cut in the longitudinal direction to reveal cross grain pattern or straight grain pattern on the cut surface. An abrasion test A is carried out on the surface according to JAS (flooring) to obtain the result 150 μm of depth of abrasion for the collected lumber 1 with a percentage of compression set of 20%, and 63 μm for the collected lumber 1 with a percentage of compression of 70%.

Figure 43A:
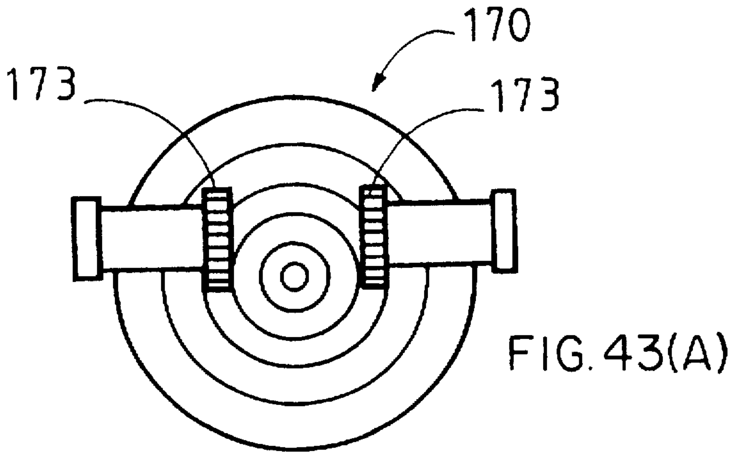
Figure 43B:
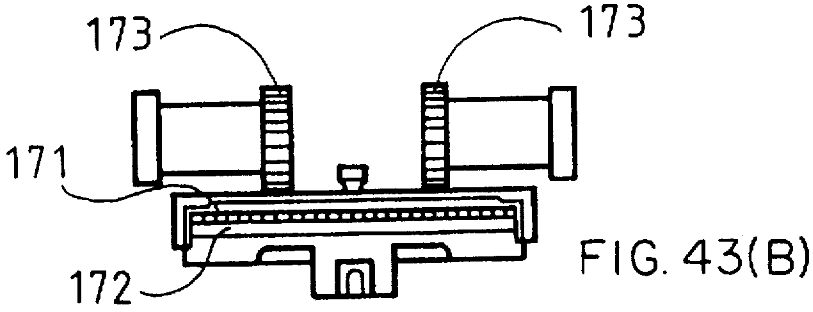

The abrasion test A according to JAS (flooring) is carried out using the test equipment 170 illustrated in FIG. 43. Two disk samples with a diameter of about 20 mm are prepared and a hole with a diameter of 10 mm are provided at the center. A specimen 171 prepared as described above is fixed horizontally on a rotatable disk 172 of the test equipment 170, abrasive paper described in an abrasion test of building material and building constituent in an abrasion paper method which satisfies the standard stipulated in JIS A 1453 is wrapped on a rubber disk 173 described in the abrasion test. Two rubber roll wrapped with the abrasive paper as described above are provided on the sample surface, and rotated 500 revolutions. After 500 revolutions, the change of the surface of a specimen 171 is measured. The total weight loaded on one half of the specimen 171 is 1000 g including the rubber disk 173. The depth of abrasion on the surface of the specimen 171 is measured using a surface roughness meter.

The collected lumber 1 is cut in the radial direction of thinned-out woods 2 to form boards, the board is used as surfacing material on wide variety of products. The collected lumber 1 is cut in the longitudinal direction of thinned-out woods 2 to form boards with cross grain pattern, straight grain pattern, or mixed pattern exposed on the board surface, these patterns also exhibits excellent decorative effect, and the board are used for wide variety of products.

The collected lumber as it is and board such as veneer manufactured by processing collected lumber 1 are used for various products described herein under.

For example, the collected lumber 1 are used as building materials such as pillars, girders, beams, sills, baseboards, treadborads, and fascia boards. The collected lumber and board are also used as building material and fitting of opening for building such as doors, upper rails for doors, lower rails for doors, stiles for doors, upper rails for glass doors, lower rails for glass doors, stiles for glass doors, glazing bars for glass doors, beads for glass doors, louver doors, upper rails for netted doors, lower rails for netted doors, stiles for netted doors, netting bars for netted doors, frames for doors, door stops for doors, frame for double sliding windows, frame for fixed windows, rain shutter doors, boards for rain shutter doors, upper rails for rain shutter doors, lower rails for rain shutter doors, stiles for rain shutter doors, upper frames for rain shutter doors, and door cases.

The collected lumber 1 is used for exterior material for buildings such as tiles, mosaic tiles, floor boards, ceiling boards, and wall boards. The collected lumber 1 is used for balustrades for windows of pre-fabricated houses, stairs, stair balustrades, supports for balustrades, balconies, veranda, gates, gate posts, gate doors, fences, and coping for walls. The collected lumber is used for furniture such as beds, chairs, swinging chairs, benches, foot of chairs, desks, tables, conference tables, foot of tables, counters, TV boards, planters, service wagons, chests, side boards, cupboards, drawer chests, shoes racks, dressers, and shelf boards, and also for indoor small organizing tools such as garment hungers, magazine racks, news paper racks, umbrella stands, and slipper stands.

In addition, the collected lumber 1 is used for umbrella sticks, walking sticks, smoking pipes, and make-up and hair-cut tools such as combs, button of garments, indoor decoration tools such as flower pots and picture frames, cooking tools and eating tools such as containers for eating, wooden ladles, dippers, chopping boards, grip handle of cooking knives, and handle of eating spoons, sanitary tools such as bath tabs and bath tab covers, playing tools such as combination woods, fabricating playing tools, and playing wood blocks, sporting goods such as frame of tennis rackets, table tennis rackets, frame of-badminton rackets, and golf club heads, instruments such as guitars, mandolins, violins, pianos, and organs, stationery such as drawing boards and drawing stands, pallets for transportation, railroad ties, handle of saws, and temporary materials such as frames for scaffolding, poles for scaffolding, handle poles for scaffolding, step boards for scaffolding, and shuttering.

As described above in detail, the collected lumber 1 described in the fifth embodiment has annual ring patterns N, cross grain patterns, or straight grain patterns on the end face 160 or longitudinal side because thinned-out woods 2 are pressed and compressed for molding the annual ring of thinned-out woods, the collected lumber 1 exhibits the unique decorative effect, and therefore, the collective lumber 1 is used for wide range products in the form of as it is or boards manufactured by cutting the collected lumber 1.

The collected lumbers 1 are obtained by carrying out a series of treatments including the softening step for subjecting the plurality of thinned-out woods 2 to the heating treatment by the water vapor heating device 10, the hot water 21 in the water tank 20 or the high frequency heating device 30, the adhesive spreading step by the compressively molding apparatus 40, the compressively molding step, and the fixation treatment step, if necessary. Accordingly, if the number of the thinned-out woods 2 is suitably selected, various kinds of the collected lumbers 1 can be obtained.

Further, since the collected lumbers 1 to the fifth embodiment are subjected to the fixation treatment after the thinned-out woods 2 have been adhered to each other through the adhesive, the shape thereof affects the compressive molding of the thinned-out woods 2 while adhering them to each other through the adhesive can be held permanently. Thereby, the collected lumber is excellent in its mechanical and thermal characteristics, abrasion resistance, chemical resistance and dimensional stability. A curing time which has been heretofore about one week can be shortened to about one hour, whereby the productivity of the collected lumbers 1 can be remarkably improved.

Further, in the collected lumbers 1 according to the fifth embodiment, a series of the steps including the softening step, the adhesive spreading step by the compressively molding apparatus 40, the compressively molding step and the step of fixation treatment can be carried out immediately after the thinned-out woods 2 have been barked, whereby it is not necessary to carry out machining such as chamfering in advance in the stage of thinned-out woods as has been done, but the collected lumbers 1 with less cost can be produced. The series of treatments are applied to the thinned-out woods 2 with bark to produce the collected lumber 1, whereby more cost saving is achieved.

The present invention is not limited to the above-described embodiment, but it is of course noted that various improvements and modifications can be made without departing the subject matter of the present invention. For example as shown in FIG. 37, while the collected lumbers 1 according to the fifth embodiment have been explained taking an example of collected lumber having a rectangular parallepiped shape, it is apparent that if a shape of the mold of press 46 and the like used for the compressively molding apparatus 40 is variously changed, collected lumber having various shapes as desired can be obtained. Bamboo material is the equivalent of wood material described in the present invention, similarly to wood, molded trachea pattern or fibrovascular bundle pattern is maintained similarly to annual ring of wood.

(Sixth Embodiment)

Figure 41:
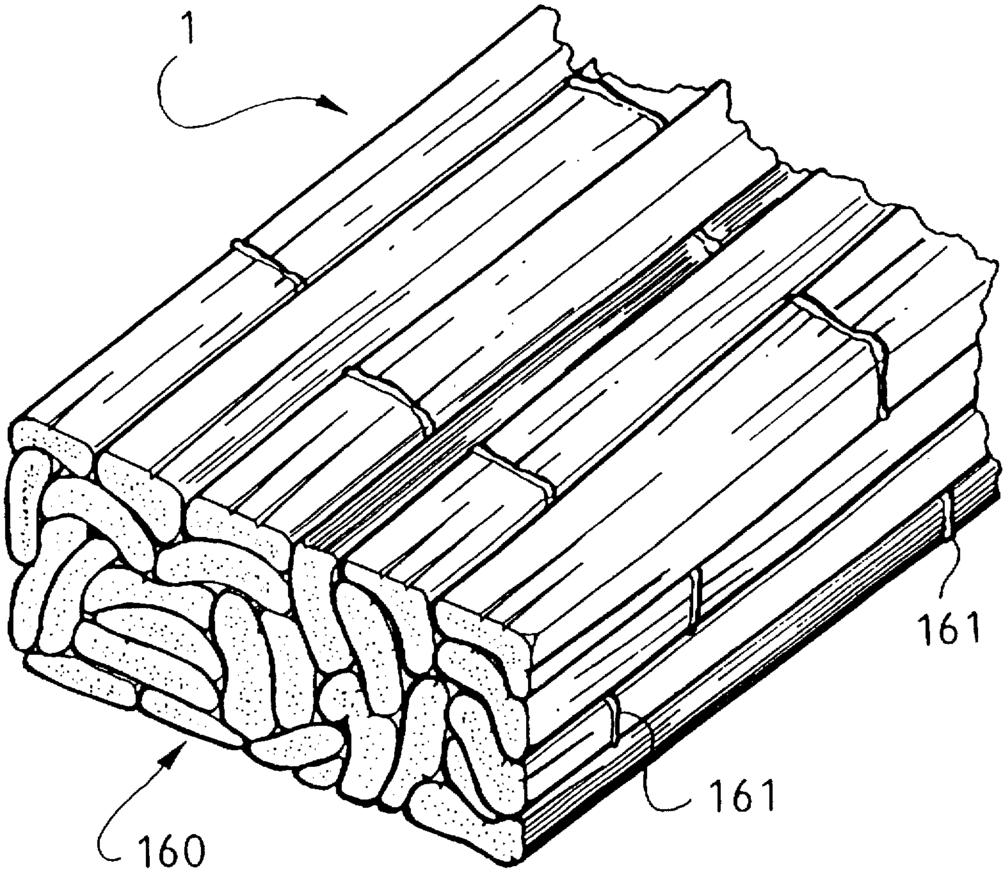
FIGS. 41 to 43 are views for illustrating the sixth and seventh preferred embodiments of the present invention.

A collected lumber 1 according to the sixth embodiment will be described referring to FIG. 41. This collected lumber 1 is manufactured by compression molding of bamboo material of longitudinal cut Phyllostachys Pubescens Mazel instead of thinned-out wood 2 of conifer trees, and manufactured with different percentage of compression set for compressively molding process. In FIG. 41 of the collected lumber 1, bamboo materials 161 which are molded variously are bonded together with adhesive 3 to form a prescribed shape, on the end of lumber of the collected lumber 1 the ends of the bamboo materials is exposed to exhibits the decorative effect.

The collected lumber 1 is manufactured by the same series of successive processes as used in the fifth embodiment, that is, the softening step, adhesive spreading step, compressively molding step and fixing step. Since these steps are carried out in the same manner as described in the fifth embodiment, detailed explanation of these steps are omitted herein.

For the collected lumber 1, the hardness according to JIS Z 2117 of end of lumber 160 of the collected lumber 1 treated with a percentage of compression set of 35% is 5.3 kgf/mm$^2$, and the hardness according to JIS Z 2117 of end of lumber 160 of the collected lumber 1 treated with a percentage of compression set of 40% is 6.8 kgf/mm$^2$.

The abrasion test A is carried out on the collected lumber 1 in the same manner as described above, and the test resulted in the depth of abrasion of 130 μm for the collected lumber 1 treated with a percentage of compression set of 25% and 45 μm for the collected lumber 1 treated with a percentage of compression set of 65%, in the abrasion test A on the side surface of the collected lumber 1 in the longitudinal direction of bamboo materials 161 according to JAS (flooring).

Accordingly, the collected lumber 1 is cut in the radius direction of the thinned-out wood 2 to form boards, and the board is used as facing material for various products. The collected lumber 1 is cut in the longitudinal direction, when, the fibrovascular bundle pattern or pattern brought about from texture of bamboo exposed on the side surface of the lumber 1 exhibits excellent decorative effect, and the material is used for wide variety of products (see FIG. 41).

(Seventh Embodiment)

Figure 42:
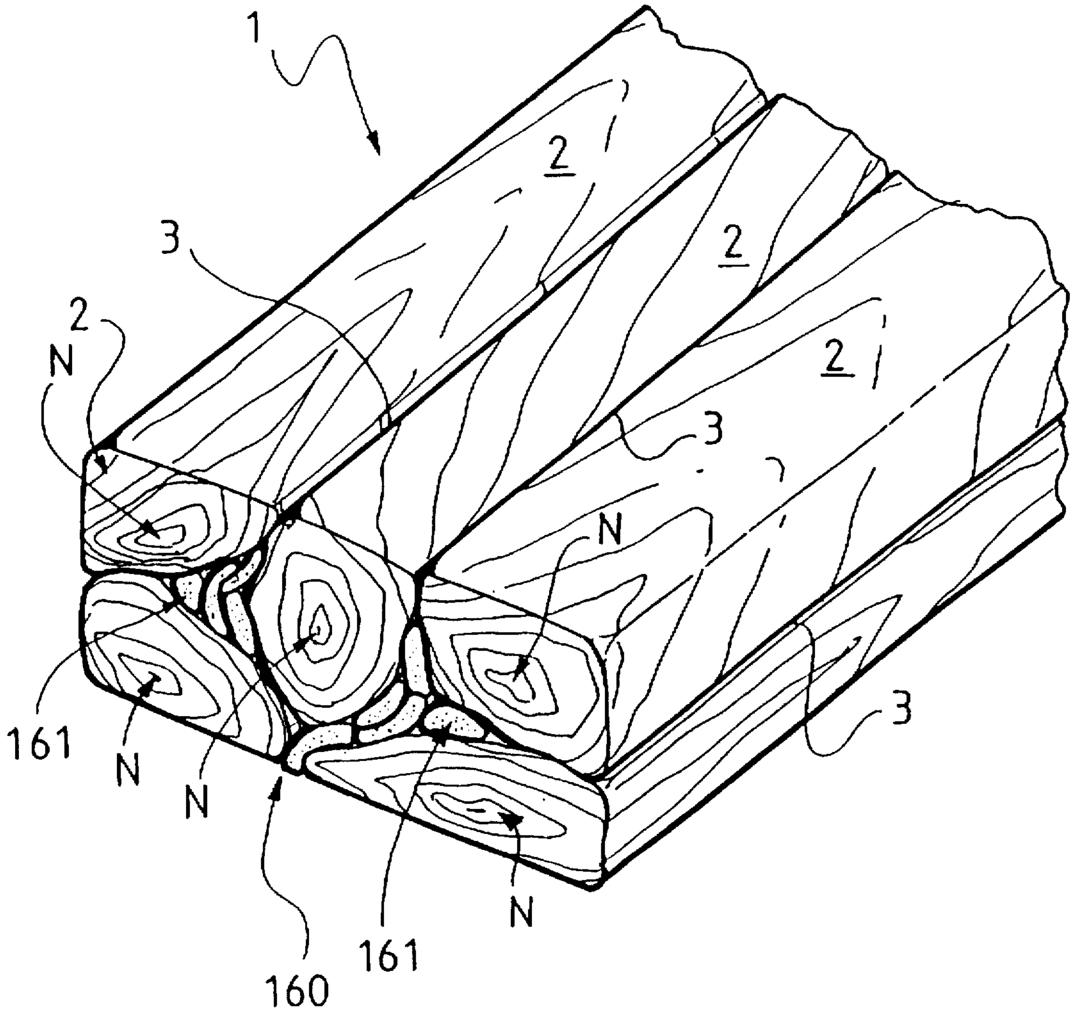

Next, a collected lumber 1 according to the seventh embodiment will be described referring to FIG. 42. The collected lumber 1 is manufactured by compression molding of thinned-out woods 2 of conifer trees and bamboo materials of longitudinally cut Phyllostachys Pubescens Mazel together as shown in FIG. 42. In this process different percentage of compression set is used for the compressively molding step.

In FIG. 42 of the collected lumber 1, the thinned-out woods 2 molded to various shape and bamboo materials 161 are bonded each other with the adhesive 3 in a prescribed shape, on the end of lumber 160 of the collected lumber 1 the annual ring pattern N of the thinned-out woods 2 and the end face of the bamboo materials 161 are exposed in mosaic pattern to exhibits decorative effect.

The collected lumber 1 is manufactured by the same series of successive processes as used in the fifth embodiment, that is, softening step, adhesive spreading step, compressively molding step and fixation step, since these softening step, adhesion applying step, compressively molding step, and fixation treatment step are carried out in the same manner as described in the fifth embodiment, detailed explanation of these steps are omitted herein.

For the collected lumber 1, the hardness on the lumber end 160 of the collected lumber 1 treated with a percentage of compression set of 35% is 4.6 kgf/mm$^2$ at the thinned-out wood 2 area and 5.4 kgf/mm$^2$ at the bamboo material 161 area, and in the case of the percentage of compression set of 50%, the hardness on the lumber end 160 is 6.2 kgf/mm$^2$ at the thinned-out woods area and 7.0 kgf/mm$^2$ at the bamboo material 161 area. When the collected lumber 1 is cut in the radius direction of the thinned-out woods to form boards, the board can be used as the facing material of various products. The collected lumber 1 is cut in the longitudinal direction, the cross grain pattern, straight grain pattern, fibrovascular bundle pattern, texture pattern, and mixed pattern thereof are also exhibits excellent decorative effects, and the collected lumber 1 is used for wide variety of products (see FIG. 42).

(Eighth Embodiment)

Figure 44:
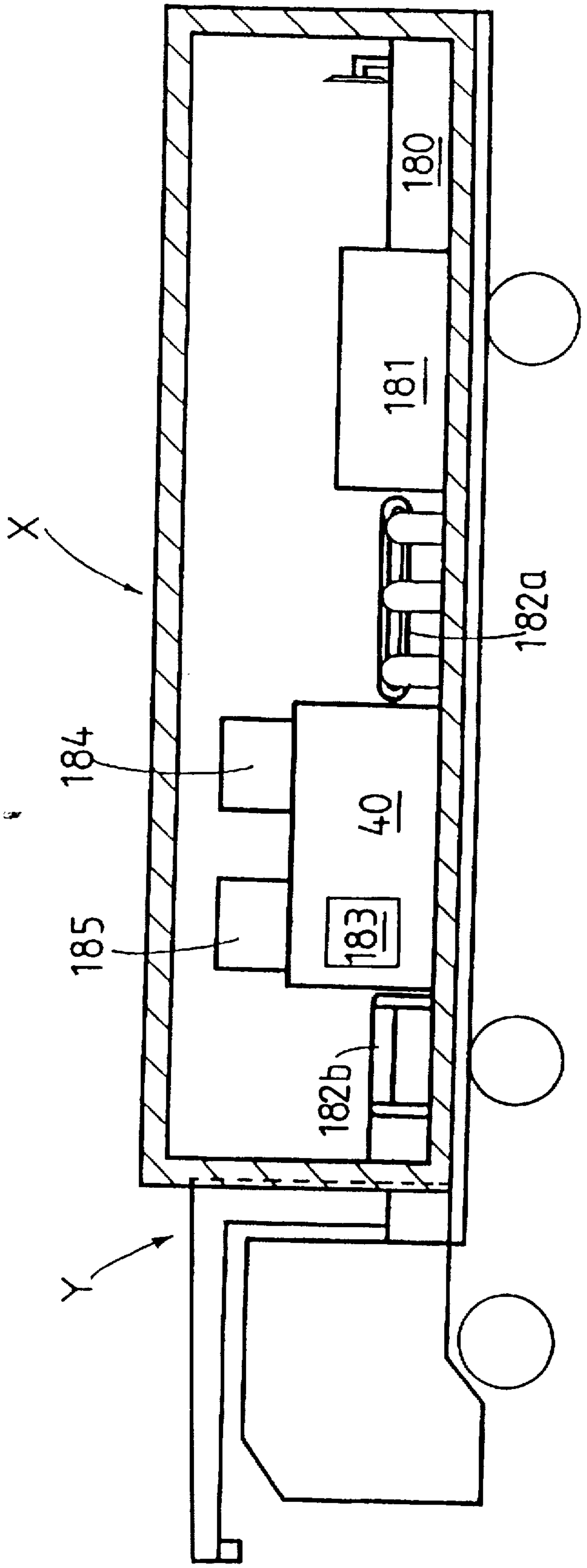
FIG. 44 is a side sectional view for schematically illustrating a vehicle-carried type apparatus for manufacturing a collected lumber of the eighth preferred embodiment according to the present invention.

A producing device X for producing collected lumbers according to embodiments described herein before will be described referring to FIG. 44. The producing device X is comprises an automotive vehicle and a set of equipment required to manufacture the collected lumber 1 starting from raw material of a plurality of cut down thinned-out woods 2 which set of equipment is equipped on the vehicle.

The collected lumber producing device X according to the eighth embodiment will be described referring to FIG. 44. In FIG. 44, a saw 180 to cut the thinned-out woods 2 to prescribed length is installed on the rear area of the vehicle Y, and adjacent to the saw 180 a barker 181 to scrape off bark on the periphery of the thinned-out woods 2 is installed. One end of the conveyer 182a is provided in contact with the barker 181, another end of the conveyer 182b is provided in contact with the compressively molding apparatus 40 which is an equipment for softening the thinned-out woods 2, compression molding the collected softened thinned-out woods 2, and then fixing to form the collected lumber 1.

The compressively molding apparatus 40 has the same structure as used in each embodiment described herein before. Equipment required for softening treatment, compressively molding treatment, and fixation treatment such as a controller 183, boiler 184, and fuel tank 185 is provided in the compressively molding apparatus 40, and on another end of the compressively molding apparatus 40 a conveyer 182b for delivering manufactured collected lumbers 1.

The saw 180 comprises a sensor for detecting the length of raw material thinned-out woods, a movable rotary saw for cut raw material thinned-out woods to prescribed length, and a conveyer for conveying cut raw material thinned-out woods to the barker 181.

The barker 181 comprises scraping blades for scraping off bark of cut raw material thinned-out woods, and rotating-moving equipment for rotating and moving the raw material thinned-out woods.

The compressively molding apparatus 40 is an equipment for forming collected lumber 1 from a plurality of preliminarily treated thinned-out woods 2.

Next, Operation for manufacturing collected lumbers 1 using the vehicle-carried type collected lumber producing device X constituted as described above.

Since thinned-out woods 2 cut down in the forest and collected are different in length, it is required to cut thinned-out woods 2 to the same length and to obtain collected lumbers with prescribed length.

First, the rear door of the vehicle Y is opened, raw material thinned-out woods 2 are fed successively to the saw 180. In the saw 180, the sensor detects the length of raw material thinned-out woods 2 fed therein, and the rotary saw is moved to the position so as to cut the raw material thinned-out woods 2 to a prescribed length. The thinned-out wood 2 cut down in the forest may be cut simultaneously in that place to a prescribed length, in this case, the saw 180 is not required for the vehicle-carried type collected lumber producing device X in accordance with the present invention.

The thinned-out woods 2 cut to even length by the saw 180 is fed to the barker 181. In the barker 181, bark is scraped off with the scraping blades provided at the prescribed position of the baker with revolution of cut raw material thinned-out woods 2. The scraping treatment of thinned-out woods is preferable for enhancing the adhesion between the thinned-out woods 2, but by using a suitable adhesive for bonding it is possible to obtain a certain adhesion strength using thinned-out woods with bark. In this case, the baker 181 is not required.

The thinned-out woods 2 barked by the barker 181 is transferred to the compressively molding apparatus 40 by the conveyer 182a. Before the compressively molding apparatus 40, thinned-out woods are treated individually, but from this process a plurality of thinned-out woods are collected, and each treatment is carried out on a plurality of collected thinned-out woods 2 to manufacture collected lumbers 1.

The collected lumber 1 is obtained through the successive treatments of softening treatment for softening the thinned-out woods 2 by heating a plurality of the thinned-out woods 2, adhesion applying treatment for applying adhesive on the surface of the softened thinned-out woods 2 or setting prepreg-like film adhesive or tube adhesive, compressively molding treatment for pressing and compressing the thinned-out woods 2 applied with the adhesive 3 on the surface to form a collected lumber with a prescribed shape, and fixation treatment for fixing the collected lumber using heating water vapor or heaters in the compressively molding apparatus 40. The detailed description of treatment processes carried out in the compressively molding apparatus 40 is omitted herein, because it is understood referring to the description in embodiments described hereinbefore.

When the treatment processes in the compressively molding apparatus 40 is completed by finishing the fixation treatment, the collected lumber 1 is obtained. On the end face of the collected lumber 1, variously molded annual ring of the thinned-out woods 2 is remained. The collected lumber 1 is delivered to the outside of the vehicle by the conveyer 182b, and loaded on tracks using a crane provided in front of the vehicle, and shipped out.

As described hereinabove in detail, the vehicle-carried type collected lumber producing device X in accordance with this embodiment is provided with the saw 180, barker 181, compressively molding apparatus 40 on the automobile vehicle Y, and thus, the producing device X is moved to the producing center of wood where raw material thinned-out woods are stocked, and collected lumbers 1 can be produced from thinned-out woods 2. The producing device X can be moved to the producing center of wood where collected lumbers are produced, whereby transportation cost for transportation of thinned-out wood 2 is greatly reduced, and also collected lumbers 1 with high added value can be shipped directly from the producing center of wood. Further, the collected lumber is produced only by moving and fixing the vehicle Y, and the installation cost of equipment is eliminated thereby. The series of treatment of the softening treatment for heating and softening a plurality of thinned-out woods 2 with water vapor, adhesive spreading treatment, compressively molding treatment, and fixation treatment are all carried out in one integrated compressively molding apparatus 40, thereby greatly improving the working efficiency, and one compressively molding apparatus 40 can treat all the treatments, resulting in that the equipment is easily installed on an automotive vehicle.

Further, the vehicle-carried type collected lumber producing device X in accordance with this embodiment, when producing collected lumber 1, the thinned-out woods 2 are bonded together with the adhesive 3 and then subjected to fixation treatment, whereby the shape, which is formed by bonding the thinned-out woods 2 with the adhesive and by compressive molding, is maintained permanently. By applying the present invention, conventional curing time of one week can be shortened to one hour, and the productivity of collected lumber 1 is greatly enhanced.

The present invention is not limited to the above-described embodiment, but it is of course noted that various improvements and modifications can be made without departing the subject matter of the present invention. For example in the collected lumber 1 in accordance with this embodiment, it is obvious that collected lumber with desired various shapes can be obtained by using molds of press 46 with various shapes for the above-described compressively molding apparatus 40.

APPLICABLE FIELD IN THE INDUSTRY

As described herein above, the collected lumber in accordance with the present invention is a collected and unified thinned-out wood manufactured through a series of processes of the softening a plurality of thinned-out woods which is not worth using, adhesive spreading treatment, compression molding treatment, and fixation treatment. Accordingly, the collected lumber exhibits unique decorative effect on its surface, and excellent surface hardness and abrasion resistance. Therefore, the collected lumber of the present invention is useful for various products for building constituents.

We claim:

1. A collected lumber produced by heating a plurality of woods to soften said woods, compressing said softened woods in the presence therebetween of a reinforcing member for interconnection of said woods and an adhesive to thereby form said woods into a predetermined shape, and subjecting the formed wood body to a fixation treatment using a heating device.

2. A process for producing a collected lumber, comprising:
 - a first step of heating a plurality of woods to soften said woods;
 - a second step of placing a reinforcing member for interconnection of said woods between said woods and spreading an adhesive on surfaces of said woods;
 - a third step of compressing said adhesive-spread woods together with said reinforcing member for interconnection to form said woods into a predetermined shape; and
 - a fourth step of subjecting said compressed woods to a fixation treatment using a heating device.

3. The process according to claim 2, wherein said heating device for fixation treatment uses heating water vapor for heating said woods.

4. The process according to claim 2, wherein said heating device for fixation treatment uses a heater for heating said woods.

5. A wood building material comprising a piece of wood, wherein a straight grain in a compressively molded shape is exposed on at least one face of said piece of wood.

6. The wood building material according to claim 5, produced by laminating a plurality of said pieces of wood in the presence of an adhesive after a fixation treatment, and clamping said laminated woods under pressing.

7. A process for producing a wood building material, comprising:
 - a first step of cutting a wood longitudinally at a plurality of positions to obtain a piece of wood;
 - a second step of heating said piece of wood to soften said piece of wood;
 - a third step of compressively molding said softened piece of wood into a predetermined shape; and
 - a fourth step of subjecting said compressively molded piece of wood to a fixation treatment, with a straight grain exposed on at least one face of said piece of wood.

8. The process according to claim 7, further comprising the step of laminating said plurality of pieces of wood after fixation treatment in the presence of an adhesive, and clamping said laminated pieces of wood under pressing.

9. The process according to claim 7, wherein said heating treatment is carried out by heating with water vapor.

10. The process according to claim 7, wherein said heating treatment is carried out in heating water.

11. The process according to claim 7, said heating treatment is carried out by high-frequency heating.

12. The process according to claim 7, wherein said fixation treatment is carried out by heating said pieces of wood with heating water vapor.

13. The process according to claim 7, wherein said fixation treatment is carried out by using a heater to heat said pieces of wood.

14. A collected lumber comprising a collected body formed from a plurality of woods with an adhesive between said woods, said collected body having annual rings of said woods left in variously molded-state on its end faces.

15. The collected lumber according to claim 14, wherein the collected body is produced by heating said plurality of woods to soften said woods and compressing said woods.

16. The collected lumber according to claim 14, wherein the collected body is produced by heating said plurality of woods to soften said woods, and compressing said woods, and subjecting said woods to a fixation treatment.

17. A collected lumber comprising a collected body formed from a plurality of conifer woods with an adhesive between said woods, said collected body having annular rings of said woods left in complicatedly molded state at its ends, and said ends having a hardness of 4.6 to 9.0 $kgf/mm^2$, as measured according to JIS Z 2117.

18. The collected lumber according to claim 17, wherein said plurality of woods are softened by heating and are formed by compressing.

19. The collected lumber according to claim 17, wherein said plurality of woods are softened by heating and are compressed with a fixation treatment.

20. A collected lumber comprising a collected body formed from a plurality of bamboos with an adhesive therebetween, said collected lumber at its ends having a hardness of 5.2 to 8.5 $kgf/mm^2$, as measured according to JIS Z 2117.

21. A collected lumber comprising a collected body formed from a plurality of conifer woods and bamboos with an adhesive therebetween, said collected body having annual rings of said conifer woods left in complicatedly molded state at its ends, and said bamboos being incorporated between said conifer woods.

22. A collected lumber comprising a collected body formed from a plurality of woods with an adhesive therebetween, said collected body having annular rings of said woods left in complicatedly molded state at its ends, and said collected body having a depth of abrasion of 25 to 170 μm after 500 revolutions, as measured for side faces having a longitudinal straight grain or cross grain of wood according to the Abrasion Test A of JAS.

23. The collected lumber according to claim 22, wherein said adhesive comprises at least one kind of member selected from the group consisting of phenolic resins, resorcinol resins and copolymers thereof.

24. The collected lumber according to claim 22, wherein said adhesive comprises a mixed resin containing 15 to 98% by weight of a phenolic resin and 2 to 85% by weight of a resorcinol resin.

25. The collected lumber according to claim 22, wherein said wood is at least one kind of wood selected from pine, Japanese red wood, Japanese cypress, Zelkova, Quercus acutissima Carruthers, white oak and Siebold's beech.

26. The collected lumber according to claim 22, wherein said collected body has at its ends a hardness of 4.6 to 9.0 $kgf/mm^2$, as measured according to JIS Z 2117.

27. A collected lumber comprising a collected body formed from a plurality of bamboos with an adhesive therebetween, said collected body having a depth of abrasion of 30 to 145 μm after 500 revolutions, as measured for its side face having a longitudinal fiber pattern of bamboo according to the Abrasion Test A of JAS.

28. The collected lumber according to claim 27, wherein said adhesive comprises at least one kind of member selected from the group consisting of phenolic resins, resorcinol resins and copolymers thereof.

29. The collected lumber according to claim 27, wherein said adhesive comprises a mixed resin containing 35 to 98% by weight of a phenolic resin and 2 to 65% by weight of a resorcinol resin.

30. The collected lumber according to claims 27, wherein said bamboo is at least one kind of bamboo selected from the group consisting of Phyllostachys pubescens Mazel, Phyllostachys reticulata Koch and Phyllostachys nigra Munro.

31. The collected lumber according to claim 27, wherein said collected body has at its ends a hardness of 5.2 to 8.5 $kgf/mm^2$, as measured according to JIS Z 2117.

32. A vehicle-carried type apparatus for manufacturing a collected lumber, comprising on a self-running vehicle one or more devices for heating a plurality of woods to soften said woods, compressing said softened woods with an adhesive therebetween to form a collected body, and subjecting said collected body to a fixation treatment.

33. The apparatus according to claim 32, wherein said heating treatment is carried out by heating with water vapor.

34. The apparatus according to claim 32, wherein said fixation treatment is carried out by using heating water vapor.

35. The apparatus according to claim 32, wherein said fixation treatment is carried out by using a heater to heat said collected body.

36. The apparatus according to claim 32, comprising a saw for cutting woods to a predetermined length.

37. The apparatus according to claim 32, comprising a barker for barking said woods.

* * * * *